United States Patent
Isaac

(10) Patent No.: US 10,934,056 B2
(45) Date of Patent: Mar. 2, 2021

(54) HOLDER FOR TRANSPORTING AND DISPLAYING EDIBLES

(71) Applicant: Shannon C. Isaac, Fawn Grove, PA (US)

(72) Inventor: Shannon C. Isaac, Fawn Grove, PA (US)

( * ) Notice: Subject to any disclaimer, the term of this patent is extended or adjusted under 35 U.S.C. 154(b) by 0 days.

(21) Appl. No.: 14/950,695

(22) Filed: Nov. 24, 2015

(65) Prior Publication Data

US 2017/0158375 A1    Jun. 8, 2017

(51) Int. Cl.
  *B65D 25/24* (2006.01)
  *A47J 47/14* (2006.01)
  *B65D 85/60* (2006.01)

(52) U.S. Cl.
  CPC .............. *B65D 25/24* (2013.01); *A47J 47/14* (2013.01); *B65D 85/60* (2013.01)

(58) Field of Classification Search
  CPC . B65D 85/36; A23P 1/10; A23P 1/105; A47G 19/32
  USPC .......... 221/260; 220/475; D7/558, 559, 560, D7/561, 563, 576, 577, 610; 206/551
  See application file for complete search history.

(56) References Cited

U.S. PATENT DOCUMENTS

| | | | |
|---|---|---|---|
| 1,547,903 A * | 7/1925 | Cole | A23G 9/283 206/223 |
| 3,483,908 A * | 12/1969 | Donovan | B65D 1/34 206/526 |
| 3,580,484 A * | 5/1971 | Schneider | A21B 3/131 206/551 |
| 4,583,955 A | 4/1986 | Toloczko | |
| 5,413,801 A | 5/1995 | McIlwain | |
| D403,558 S * | 1/1999 | Martinez | D7/610 |
| 5,858,428 A * | 1/1999 | Truscello | A23G 1/502 426/103 |
| 5,912,033 A | 6/1999 | Ferguson | |
| 6,146,673 A | 11/2000 | Ferguson | |

(Continued)

OTHER PUBLICATIONS

Article entitled "How to Make a Cupcake Bouquet" at http://www.52kitchenadventures.com/2012/04/29/how-to-make-a-cupcake-bouquet/ and dated Apr. 29, 2012. Printed on Nov. 19, 2015.

(Continued)

*Primary Examiner* — J. Gregory Pickett
*Assistant Examiner* — Niki M Eloshway
(74) *Attorney, Agent, or Firm* — Larry J. Guffey, Esq.; Oliver & Grimsley, LLC

(57) ABSTRACT

A holder for pre-assembling, transporting, and displaying edibles, and comprising, a cup having a bottom surface, a sidewall surface and an open top, and a cup centerline that extends perpendicularly from the bottom surface, and wherein the sidewall has a defined height, a dowel pin, and a rod having top and bottom ends and a centerline therebetween, wherein the rod top end contacts the cup bottom surface, and wherein the rod having a configuration adapted to enable the rod to support the cup when the rod and cup centerlines intersect with an angle ranging from 0-90 degrees, and wherein sidewall height and surface supports the edible in a pre-assembled specified shape having a desired initial appearance at an initial location, and then the transport of the pre-assembled edible to a final destination such that the initial appearance of the edible is not changed during transport.

8 Claims, 38 Drawing Sheets

(56) References Cited

U.S. PATENT DOCUMENTS

| | | | |
|---|---|---|---|
| 6,153,237 A | | 11/2000 | Ferguson |
| 6,896,140 B1 | | 5/2005 | Perry |
| 7,387,283 B2 | | 6/2008 | Franczyk |
| D604,106 S | * | 11/2009 | Gold ............................ D7/518 |
| D625,151 S | * | 10/2010 | Matthews ..................... D7/610 |
| D629,641 S | * | 12/2010 | Kuan ............................. D7/354 |
| 8,167,128 B2 | * | 5/2012 | McGinnis .............. A45C 11/20 |
| | | | 206/551 |
| 8,469,222 B1 | | 6/2013 | Stavitzski et al. |
| 8,545,914 B1 | * | 10/2013 | Mastroianni ............ B65D 1/36 |
| | | | 206/508 |
| 8,708,166 B1 | | 4/2014 | Crouch |
| 9,145,234 B1 | * | 9/2015 | Dalmolin ............... B65D 25/22 |
| 2005/0279747 A1 | | 12/2005 | Madagan |
| 2007/0102437 A1 | * | 5/2007 | Griswold ............... A21B 3/132 |
| | | | 220/772 |
| 2011/0048997 A1 | * | 3/2011 | Vandervliet ............. B65D 1/26 |
| | | | 206/493 |
| 2012/0118841 A1 | | 5/2012 | West |
| 2013/0189410 A1 | * | 7/2013 | Braden .................. A21B 3/132 |
| | | | 426/280 |
| 2014/0091087 A1 | | 4/2014 | Voliano |

OTHER PUBLICATIONS

Article entitled "Sweet Treats for Prom" at http://www.sewcakemake.com/2011/04/sweet-treats-for-prom.html and dated Apr. 11, 2011. Printed on Nov. 19, 2015.
Product called "The Cupcake Rack" described at http://thecupcakerack.com, website printed on Nov. 25, 2014.
Cupcake Bouquet Centerpiece product for sale at www.4showers.com/Store/CupcakeBouquetCenterpiece.html, website printed on Nov. 25, 2014.

* cited by examiner

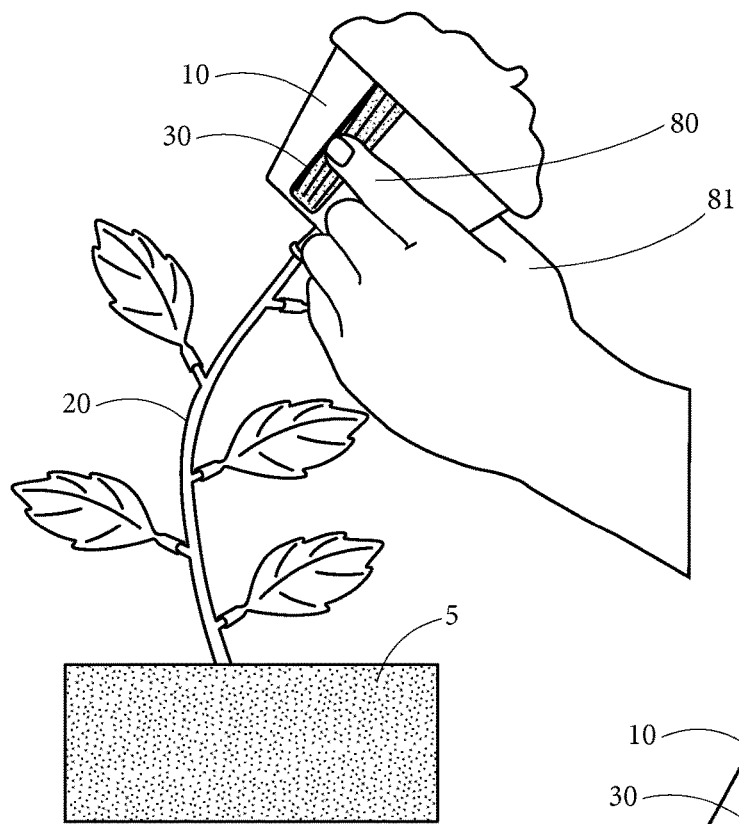
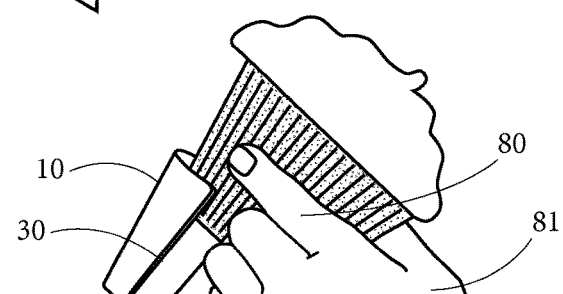
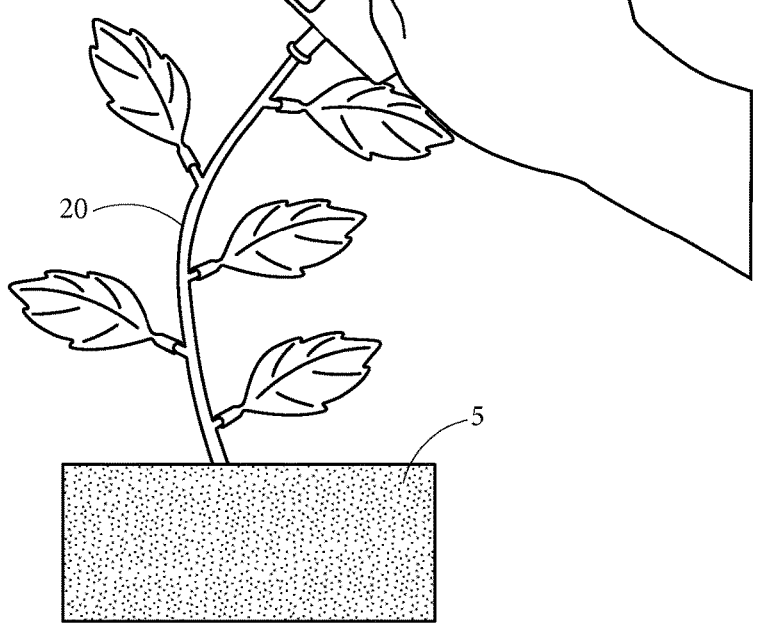
Fig. 1A
Fig. 1B

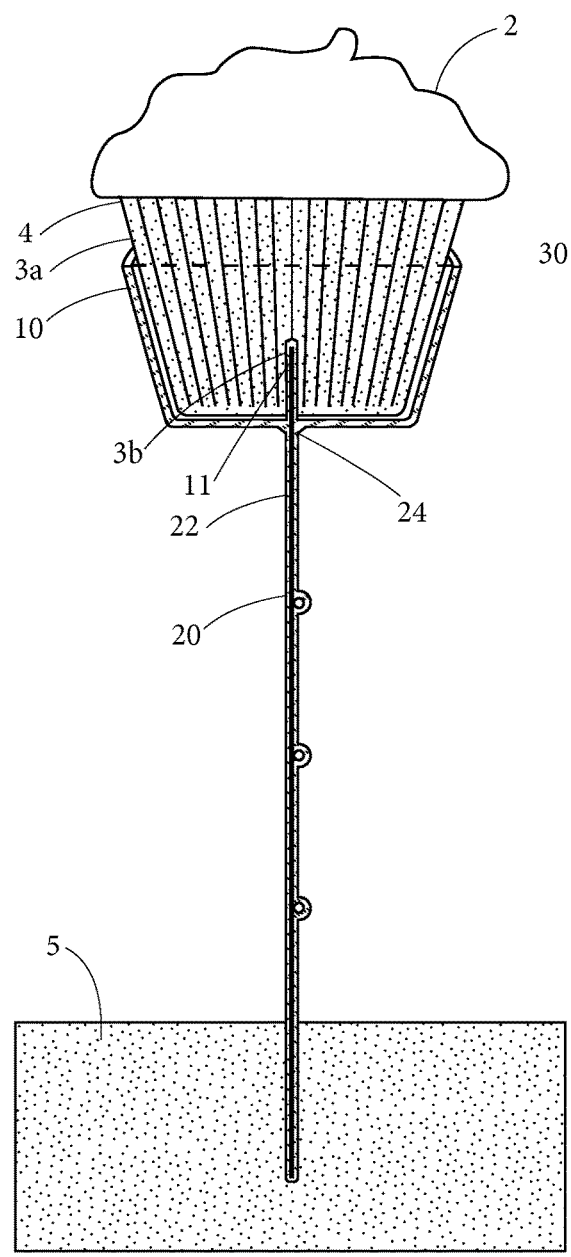
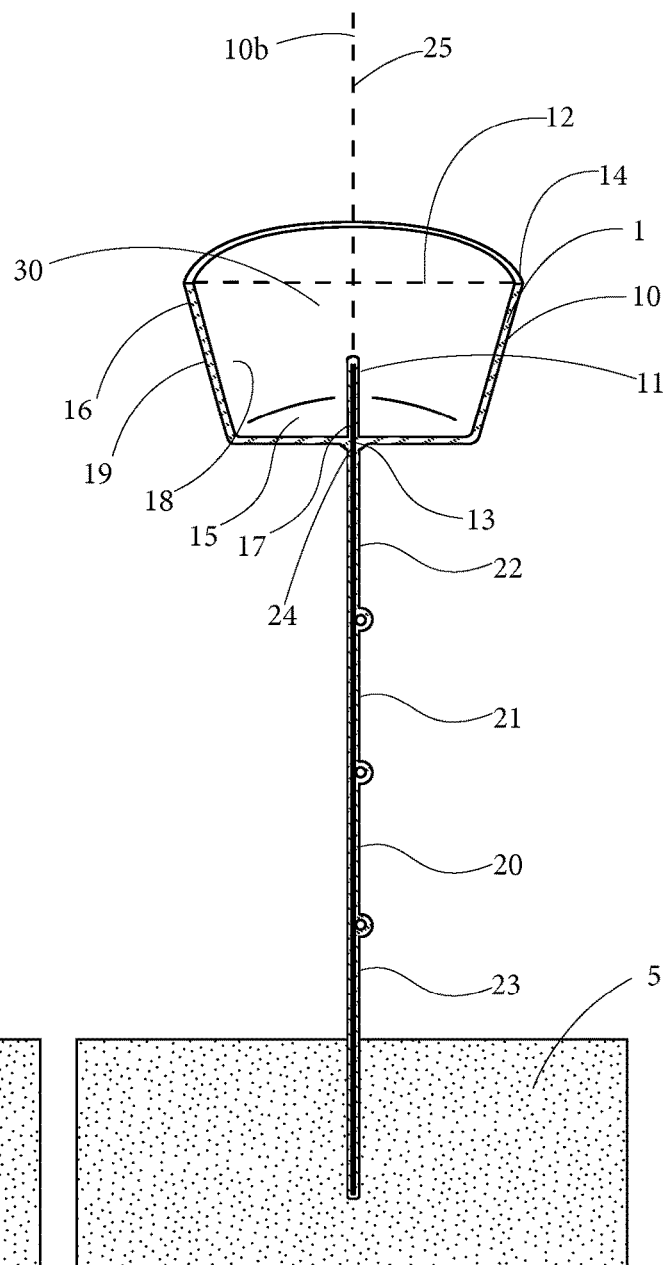
Fig. 3A
Fig. 3B

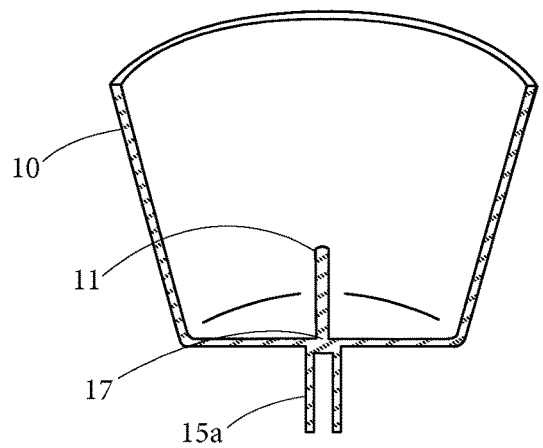
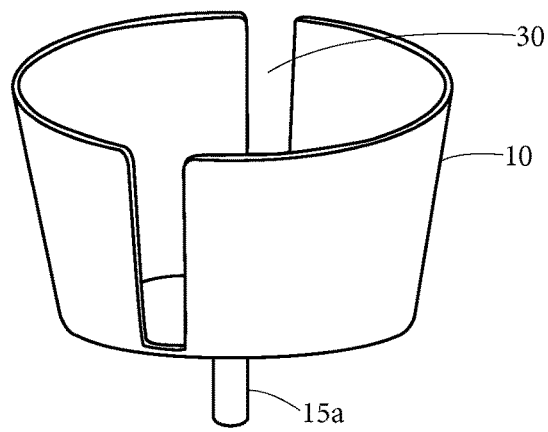
Fig. 9A          Fig. 9B
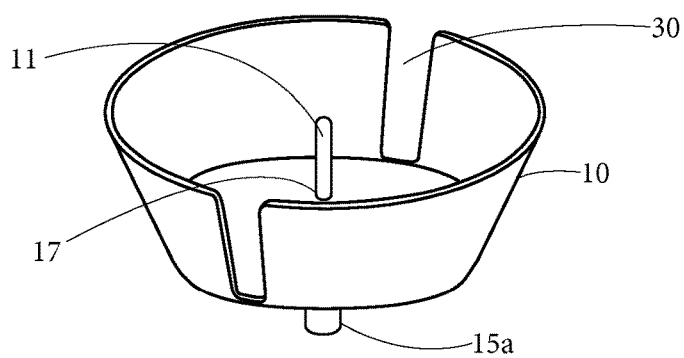
Fig. 9C

HOLDER FOR TRANSPORTING AND DISPLAYING EDIBLES

BACKGROUND OF THE INVENTION

Field of the Invention

The present invention relates generally to a holder for the pre-assembly, transportation and display of pre-arranged edibles at a final destination. The pre-arranged edibles generally consist of baked goods. More particularly, the invention disclosed herein relates to a holder that supports pre-assembled edibles in a specific shape and desired initial appearance at an initial location, which pre-assembled edibles can then be transported to a final destination in such manner that the initial appearance of the edible is not changed during transport. Thus, the invention allows for pre-assembled edibles to be transported and delivered "as is" and ready for display.

Description of the Related Art

The present invention is particularly applicable to the edibles and novelty industry, including the pre-assembly, transporting, delivering and final display of edibles, and the present invention will be described further with particular reference thereto.

The continuing concern among those in these industries and among individuals who make, arrange, transport, or display edibles, is that while transporting, delivering and displaying edibles, the integrity of the edible construction is compromised (i.e., the edible has an already established and fixed boundary structure whose construction integrity needs to be preserved during the edible's transport). Often, edibles cannot be pre-arranged, transported and delivered in the pre-assembled final presentation form "as is" upon arrival at the end point destination. The individual user is limited in the creative expression of arranging and displaying the edible in a formal display for travel purposes. Thus, there is ever growing concern to look for an invention that allows for the pre-assembly of an edible having a specific shape and initial appearance at an initial location, which can then be transported to a final destination in such a manner that the initial appearance of the edible is not changed during transport. Traditional apparatuses cannot sustain the integrity of a pre-assembled edible in final presentation form during travel. For example, one existing display structure features an edible that is elevated above a display base, however, the prior art requires the assembly and arrangement of the edibles and display form as separate elements at the final destination, not a pre-assembled form at the initial location for travel in the pre-assembled appearance, such that the appearance remains unchanged during transport. Further, the prior art does not provide a user with a selection of angles and positions in which an edible could be positioned and are usually of a preformed, fabricated and of a non-organic nature. More specifically, the pre-fabricated nature of traditional display apparatuses are stiff and rigid in nature, and do not allow an edible to take on a more natural and organic form for purposes of positioning the edible for presentation display in the overall arrangement. Thus, it is readily apparent that the prior art display, for example, in the context of an edible arrangement, does not appear to be a real-life flower arrangement.

In addition, the final pre-arranged form of the edible arrangement is not suited for the prolonged transport of the goods to the final display destination. These display holder arrangements fail to provide the support needed while an edible is being carried and transported in a pre-arranged presentation form in order to sustain the construction integrity of the edible (i.e., the edible has an already established and fixed boundary structure whose construction integrity needs to be preserved during the edible's transport), and do not, maintain the pre-desired positioning and arrangement of the edible to be able to deliver the pre-formed arrangement "as is" for final presentation without additional assembly at the display destination. If this type of pre-formed arrangement delivery is attempted, it often results in the destruction and compromise of the edible due to the edible falling from the display arrangement platform while in transit due to the weight load of the edible combined with the external forces due to human capacity, travel time, road and driving conditions. This problem affects the individual's ability to save time by creating pre-assembled edibles in a positioned display arrangement, and transporting such edibles to a final destination. Thus, the user is limited in the selection, pre-determined positioning, and pre-assembly of edibles using certain traditional display apparatuses prior to delivery of the separate display components for final assembly at the destination.

Existing pre-formed prior art arrangements for transporting edibles are not suited for all types of edibles, such as baked goods, items having the propensity to crumble, or items extending beyond a certain set of dimensions. For example, some edibles are comprised of certain textures and have a propensity for crumbling or compromising the integrity of the edible. In addition, when using specific dimensionally shaped baked goods, or existing pre-formed structures, often these holders do not allow an edible to exceed a certain dimension.

The prior art teaches many types of pre-formed rigid display arrangement forms offering various supports and positioning for an edible arrangement of baked goods at a final display destination. These display arrangements are adequate for final display in a formed position, however, they are not adapted to pre-arrangement presentation prior to transport and delivery, nor do they have a configuration adapted to enable a free form and natural positioning of the edible for final display.

A quick survey of the prior art in this area reveals that it is replete with myriad and diverse edible display arrangement apparatuses for final assembly and placement of edibles at a final destination. See for example, U.S. Pat. Nos. 7,387,283; 8,708,166; 5,912,033; 4,583,955; 5,413,801; 6,896,140; and U.S. Patent Application Nos. 2012/0118841; 2014/0091087; and 2005/0279747.

Various types of other edible display holders are also available in a pre-fabricated form structure for a cohesive and uniform display arrangement of the edible baked goods. Most, if not all, of these display arrangements are limited to types of edibles that may be displayed on these forms. In addition, some of these arrangements are for a plurality of edibles in one compilation and express the edibles in a uniform, and cohesive unit. Therefore, these arrangements lack the free form and selective positioning of an edible set in a natural and free flowing form, and these structures fail to feature the natural representation of organic elements in existence. For example, the prior art shows an arrangement of cupcakes delicately placed on toothpicks to cover a Styrofoam ball, and also shows an arrangement of cupcakes placed in a wire configuration of uniform circular rings situated side by side in a square or circular-shaped sheet to hold edibles over top a planter pot to resemble formed structure flowers. These examples in the prior art feature edibles in a uniform display arrangement and do not attempt to mimic or deceive an individual into believing that the cupcakes are in fact a natural and organic looking floral arrangement.

In some instances, certain display arrangements feature a platform with tines and a rigid rod to temporarily hold edibles above a foundation base. This type of edible holder, for example, is functional for a final arrangement, having the separate cupcake and display components assembled at the end point location. This type of assembly, however, would fail to be pre-arranged and displayed, and be sustained in that form during travel and arrival at a final location for display use. Moreover, the rigid rod and pre-conformed nature of the display lacks a free flowing and organic feel and arrangement, thus depriving the on-looker from appreciating a life-like novelty, such as a bouquet of flowers. Likewise, certain display arrangements feature a disc-shaped curvature to retain the lower portion of a rounded fruit for display. This configuration also is for final display arrangement as well, as it lacks the ability for the user to pre-arrange and display the rounded fruit in a design that would be sustained during travel and arrival prior to set up at a final location for display. This display arrangement, however, is not suited to accommodate baked good edibles for pre-assembly, travel and delivery "as is" in final presentation form upon arrival to a destination.

None of these solutions have addressed or resolved the problems faced by individuals and creative food providers. One example of prior art for fruit edible arrangements is suited for pre-assembly and transport, however, with the use of this structure, the assembled fruit form is generally wrapped in cellophane or plastic wrap in the form's entirety in order to maintain the edible's initial appearance during transport. Note, for a fruit form, the structure is generally composed of plastic sticks speared into large pieces of fruit, including whole strawberries, pineapple and melon. This assembly, however, would fail to work with cupcakes or baked goods, as the integrity of a baked good edible construction is soft and would not be sustained on a spear-like structure. Thus, the established and fixed boundary structure of the edible is unable to be preserved during the edible's transport. Moreover, the prior art also fails to meld the concept of edibles in the form of a natural looking floral arrangement.

The goal of any edible display apparatus is to promote arranged edibles in a desired presentation. The present invention goes further and actually facilitates this goal and in fact allows the user to pre-assemble the edible arrangement in a select and desired positioning at an initial point, which can then be carried and transported over a distance, and delivered "as is" in the final presentation form intact and unchanged during transport for arrival at the end point display location.

Conventional display arrangements feature a wide-range base and a series of elevated display platforms, such as a cupcake stands or multi-tiered towers. Some arrangements feature a plurality of cups to hold a plurality of edibles at one time, such as cupcakes or muffins. This type of platform arrangement fails to address the issues with the carrying, transport and display of a single edible that is elevated above the base with a rod to support an individual cupcake or edible. Moreover, this arrangement is unable to be electively positioned to feature a variety of display positions featuring, for example, the positioning of edibles in a bouquet type of arrangement in a realistic fashion such that the edibles may be positioned at a variety of heights, and featured in a variety of directions as a life-like floral arrangement as a real floral arrangement would be conceived.

Another existing arrangement features a rod with a plurality of tines to engage the edible. One such drawback is that multi-tine rods compromise the integrity of the edible. Edibles have a set and fixed boundary surface whose construction integrity needs to be preserved; for example, the edible would receive a plurality of entry marks and disturbances such that upon transport the construction integrity would not be preserved or upon eating the edible would crumble into pieces. In addition, even with a rod having a plurality of tines, this arrangement is limited. While the arrangement is able to suspend an edible above a base with a rod, it is not able to adequately carry and transport such edibles and sustain the forces incurred with transporting, delivering and displaying such items in a pre-assembled form and without damaging the integrity of the baked good edible. The forces experienced in connection with suspending the weight of a baked good in combination with the forces incurred during transport and travel would negatively impact the initial set and fixed boundary surface of the edible and thus, change the construction integrity of the baked good such that it would not be preserved during transport. In addition, this existing display offers a fabricated rigid arrangement stacked platform. The "cupcake" edible is seated to rest perpendicular to the platform. The platform is unable to be positioned or angled at the leisure of the individual's preference for an arrangement in a desired fashion to aesthetically feature the edibles in natural and organic positions such as a flower. The prior art features a fabricated, rigid platform for placement and display of a cupcake edible to be set up and displayed at the final destination. Thus, the individual presentation components are separate and then set up for assembly in the final presentation form to occur at the display location and not prior to transportation and delivery.

Moreover, when an individual removes an edible from this type of holder, the individual generally applies a force to the sidewall of the edible via the individual's hand, in order to grasp and take hold of the edible so as to remove it from the plurality of tines within the edible. In doing so, the individual may apply a force stronger than the sidewall of the edible, thereby denting or crushing the sides of the edible and diminishing the aesthetic appeal and quality of the featured edible, and in some instances even crushing the sidewall so much that the edible crumbles or soils the individual's hand.

More recently, a cupcake display structure has been introduced to the edible and novelty industry. This structure features a cup elevated from a rod held in a base foundation. An edible is placed inside of the cup for display; however, this structure is not suitable for travel of a pre-assembled cupcake structure displayed in a specified formation having a desired appearance at an initial location, and then the transported to a final destination such that the initial appearance of the edible is not changed during transport. This prior art fails to provide an internal structural support for the edible. In addition, the cup sidewalls of this structure prevent an individual from seamlessly removing the edible from the cup, and ultimately, the individual compromises the integrity of the edible construction and also disturbs the cupcake topping. In order to remove the edible, the individual user is required to insert his or her fingers around the edible top and pull the edible from a seated position within the cup. Often the user digs his or her fingers into the top portion of the cupcake for removal, thus disturbing the integrity of the cupcake construction and topping, and dirtying the user's fingers. Moreover, this prior art does not have the ability for the rod to intersect with the cup at an angle while supporting the cupcake for pre-assembled position, transport and delivery of the cupcake arrangement in the pre-assembled form such that the edible remains unchanged during delivery.

Therefore, the use of conventional prefabricated edible display arrangements are not conducive for the pre-assembled edibles having a specified shape and initial appearance at an initial location, and the transport of the pre-assembled edible to a final destination in such a manner that the initial appearance of the edible is not changed during transport. Thus, conventional, prior art edible display arrangements do not alleviate the assembly and travel problems typically encountered in this arena.

Despite the existence of many types of edible holders using pre-fabricated structural elements, individual users continue to be limited to transporting the separate elements, the structure and the edibles to a final destination first and then conducting the final set up and arrangement of the edibles and display structure for final presentation. The existing art fails to allow the individual user to pre-assemble, transport, and display the edibles with confidence such that the edibles are positioned in a pre-selected and fashioned arrangement at an initial location and arrive to a final destination having maintained the initial appearance of the arrangement during transport. As a result, users continue to experience inconvenience in the assembly of edibles prior to transport and final set up for the display at the end point destination.

Accordingly, a need exists for a new and improved edible holder that specifically allows for the pre-assembly, carrying and transporting, delivery and display of edibles in a pre-determined arrangement such that the edible may be arranged and positioned in a specified shape having a desired initial appearance at an initial location, and then the transport of the edible to a final destination in such a manner that the initial appearance of the edible is not changed during transport. In addition, there exists a need for a display and transport apparatus that has a configuration adapted to allow the edible holder to be temporarily and variably oriented with the supporting display elements for elevation such that a variety of angles and positions may be achieved in a desired display form. Thus, there is a need for an edible holder that provides better and more advantageous overall results in terms of these goals. It is a general object of the present invention to provide such an edible holder. Such an apparatus provides versatility and addresses the shortcomings discussed earlier, and this is highly desirable.

SUMMARY OF THE INVENTION

Recognizing the need for the development of new and improved methods and products for the pre-assembly, carrying, transporting and displaying of edibles, the present invention is generally directed to the needs set forth above and overcoming the problems with and the disadvantages exhibited by the prior art.

The present invention relates to a holder for pre-assembling, transporting and displaying edibles, the holder comprising: (a) a cup having a bottom surface, a sidewall surface and an open top and top rim, with the bottom surface having a center point and a cup perimeter where the surfaces are joined, the cup also having a cup centerline that extends perpendicularly upward from and proximate said bottom surface center point, and wherein the vertical distance up the sidewall surface between the perimeter and the open top defines the height of the sidewall, (b) a dowel pin that extends upward into the cup and along the cup centerline, and (c) a rod having top and bottom ends and a centerline therebetween, wherein the top end is in contact with the cup bottom surface at a point proximate the bottom surface center point, (d) wherein the rod having a configuration adapted to enable the rod to support the cup when the centerline of the rod and the centerline of the cup intersect with an included angle that is in the range of 0-90 degrees, (e) wherein the height of the sidewall surface being such as to enable the cup sidewall to support the edible for the pre-assembly of the edible into a specified shape having a desired initial appearance at an initial location, and then the transport of the pre-assembled edible to a final destination in such a manner that the initial appearance of the edible is not changed during said transport.

In other possible embodiments of the present invention: (f) the cup sidewall surface having a slit that extends downward from proximate the cup top rim, wherein the slit having a configuration adapted to allow the fingertips of an individual to access the edible and remove it from the cup, and (g) a movable plate having a plate center point and a plate perimeter and a configuration adapted to allow the plate to be temporarily placed within the cup and adjacent said cup bottom surface, (h) wherein the cup sidewall surface having a slit that extends downward from proximate the cup top rim, (i) wherein the plate having a finger that extends radially outward from the plate perimeter, and (j) wherein the finger having a configuration adapted to allow the finger to move upwardly and downwardly within the slit.

In other possible embodiments of the present invention: (k) wherein the rod having a rod centerline that extends between the ends, the holder further comprising, a connector that connects the rod top end and the cup bottom surface and has a configuration adapted to allow said cup to be oriented with respect to the rod so that the cup centerline intersects the rod centerline at an angle that is within a desired range of intersection angles, (l) wherein the rod having a rod centerline that extends between the ends, the holder further comprising, a connector that connects the rod top end and the cup bottom surface and has a configuration adapted to allow said cup to be temporarily and variably oriented with respect to the rod so that the cup centerline intersects the rod centerline at an angle that is within a desired range of intersection angles, (m) further comprising an attachment having a configuration adapted to be seated proximate the cup sidewall surface to enable the cup to display the edibles having a decorative collar.

In addition, the present invention also relates to a method of fabricating a holder for pre-assembling, transporting and displaying edibles, the holder comprising: (a) a cup having a bottom surface, a sidewall surface and an open top and top rim, with the bottom surface having a center point and a cup perimeter where the surfaces are joined, the cup also having a cup centerline that extends perpendicularly upward from and proximate said bottom surface center point, and wherein the vertical distance up the sidewall surface between the perimeter and the open top defines the height of the sidewall, (b) a dowel pin that extends upward into the cup and along the cup centerline, and (c) a rod having top and bottom ends and a centerline therebetween, wherein the top end is in contact with the cup bottom surface at a point proximate the bottom surface center point, (d) wherein the rod having a configuration adapted to enable the rod to support the cup when the centerline of the rod and the centerline of the cup intersect with an included angle that is in the range of 0-90 degrees, (e) wherein the height of the sidewall surface being such as to enable the cup sidewall to support the edible for the pre-assembly of the edible into a specified shape having a desired initial appearance at an initial location, and then the transport of the pre-assembled edible to a final destination in such a manner that the initial appearance of the edible is not changed during said transport.

Thus, there has been summarized above (rather broadly and understanding that there are other preferred embodiments which have not been summarized above) the present invention in order that the detailed description that follows may be better understood and appreciated.

BRIEF DESCRIPTION OF THE DRAWINGS

FIG. 1A is a side view that illustrates a preferred embodiment of the present invention, with an individual using the individual's fingers to make contact with the edible side surface through the slit in the cup of the holder in order to remove the edible from the holder.

FIG. 1B is side view that illustrates a preferred embodiment of the present invention, with an individual continuing to remove the edible from the holder.

FIG. 3A is a sectional side view that illustrates a preferred embodiment of the present invention, the holder for edibles shown in use, with the desired edible in place, where the cup sidewall extends upward from proximate the cup bottom surface and the sidewall height is approximately midway up the edible side surface, and also features the dowel pin and rod, and having a configuration in an upright and vertical position.

FIG. 3B is a sectional side view that illustrates a preferred embodiment of the present invention, the holder for edibles shown prior to use, without the desired edible in place, where the cup sidewall extends upward from proximate the cup bottom surface and the sidewall height is approximately midway up the edible side surface, and also features the dowel pin and rod, and having a configuration an the upright and vertical position.

FIG. 9A is a sectional side view that illustrates another preferred embodiment of the present invention, the holder cup being shown prior to use without the edible, and featuring the cup, dowel pin, and connector element, where the cup sidewall also features a slit that extends downward from proximate the cup top rim.

FIG. 9B is a perspective, side view that illustrates another preferred embodiment of the present invention, the holder cup being shown prior to use without the edible in place, and featuring the cup, dowel pin, and connector element, where the cup sidewall also features a slit that extends downward from proximate the cup top rim.

FIG. 9C is a perspective, elevational view that illustrates another preferred embodiment of the present invention, the holder cup being shown prior to use without the edible in place, and featuring the cup, dowel pin, and connector element, where the cup sidewall also features a first and second slit that extend downward from proximate the cup top rim.

DESCRIPTION OF THE PREFERRED EMBODIMENT

Figure 1:
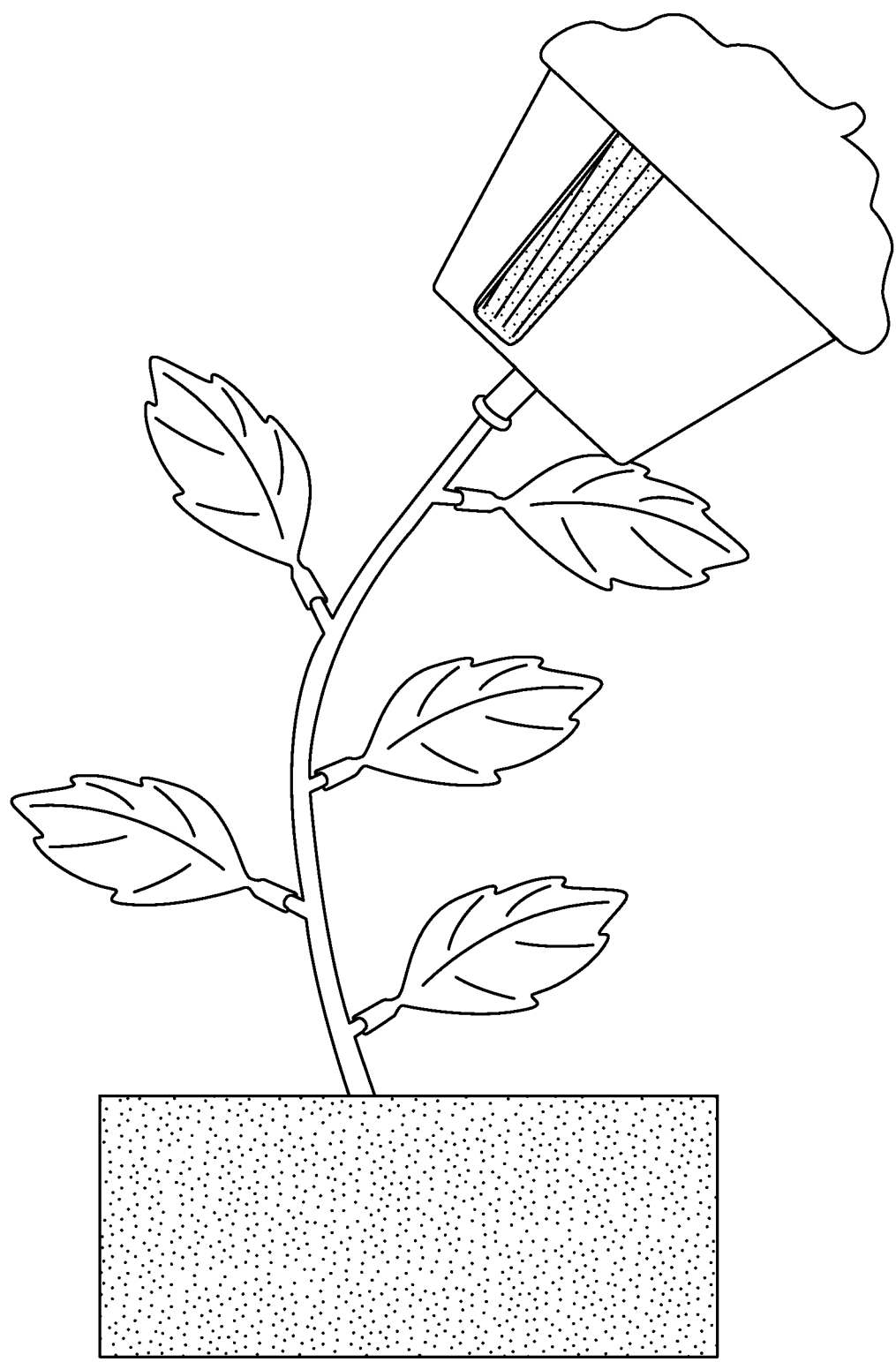
FIG. 1 is a side view that illustrates a preferred embodiment of the present invention, the holder for edibles shown in use, with the desired edible in place, and the rod having a configuration adapted to be flexible and support the cup.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. For lexicon purposes, the terminology "edible", "cupcake", "confection", and "baked good", references to "destination" and "location", references to "base" or "foundation", and references to "carrying" and "transporting" or variations thereof are used interchangeably and should not be regarded as limiting to the present invention. Also, references to singular and plural elements are used interchangeably and should not be regarded as limiting to the present invention.

The present invention 1 is directed to an apparatus that provides a holder for pre-assembled edibles having a specific shape and desired initial appearance at an initial location, which can then be transported to a final destination in such a manner that the initial appearance is not changed during transport. The holder apparatus is able to maintain the edible presentation in the pre-arranged final display form during carrying and transport, such that the pre-assembled arrangement arrives "as is" at the final destination without substantive set up or adjustment required by an individual upon arrival of the edible 2 to the destination. The present invention 1 overcomes the limitations of the prior art, such as fabricated structure display platforms or apparatuses, which require manual assembly and set up of the presentation separate components—the edibles 2 and the display stand—at a final destination. Instead, the present invention 1 transforms the presentation of edibles into a natural and free flowing organic looking arrangement that may be pre-assembled, arranged and transported "as is", to be delivered and ready in the same initial appearance for final presentation display upon arrival at the end point destination.

The apparatus allows an individual forming the pre-assembled edible arrangement to set the edibles in a specific shape and desired appearance at an initial location point. The apparatus transports the pre-assembled edibles 2 is such a manner so as to maintain the pre-assembled positioning of the edibles during carrying, transport and delivery to the end point destination for final display "as is" upon arrival. This pre-arranged positioning of the edibles in a final form prior to transport allows for a convenient and time saving opportunity for individuals who are traditionally required to pack a number of display components—including the display stand and edibles—to each be carried and transported separately. In addition, an individual is required to further accompany the components to the final location and spend additional time in assembling the edible form upon arrival. Moreover, the final assembled edible shape and appearance is generally a structural looking display such that an onlooker would be able to readily identify the structure as a display of edibles.

The present invention 1 provides the user with the opportunity to pre-assemble, arrange and set multiple display arrangements, one right after another, in a more automated manner. Therefore, the end product is a pre-assembled edible display in a specified shape composed at an initial location, carried and loaded for transport, and is delivery ready for set up and display "as is" in final form at the final destination. The transport of the pre-assembled edible to a final destination is done in such a manner that the initial appearance of said edible is not changed during transport. Thus, the present invention for a pre-assembled "as is" edible display arrangement upon delivery reduces time at the final destination, reduces interferences with the event, and accounts for time discrepancies between travel times for delivery, arrival, set up delays, and event start times. Therefore, the final pre-assembled edible is ready "as is" for formal display and presentation.

In one embodiment, the invention 1 transforms the display of edibles into an array of natural looking and organically flowing flowers, thus deceiving an onlooker into believing that the arrangement is composed of flowers, and are not in fact edibles, such as cupcakes. The invention 1 enables the edibles 2 to be positioned in an array of free flowing positions. In one embodiment, the rod 20 supporting the cup 10 acts as the "stem" of the flower that may be curved and the cup 10 holding the edible "flower" may be angled or positioned to take the form of a natural organic flower. In one embodiment, the apparatus is configured such that the final display of edibles 2 is so life-like that the apparatus deceives an onlooker into believing the display is actually a floral arrangement, as opposed to a display of edibles. See FIGS. 1, 1A-B, 2B, 3A, 3C, 8, 11A, 12, 16A, 20, 24A-B, 25A-B, 26, and 27.

Referring to FIG. 1, there is illustrated a preferred embodiment of the present invention in the form of an edible holder 1. This edible holder 1 is suited for the pre-assembly, transport, delivery and display of an edible 2 in a pre-assembled shape and desired appearance that remains unchanged during transport. Typically, an individual user will use the edible holder 1 as a novelty item for presenting and displaying edibles 2 in a pre-arranged display form, such that the edibles 2 are pre-assembled at an initial location, and featuring an edible 2 in a variety of positions and often modeling the natural state floral arrangements. These edibles 2 may be fashioned in a desired position at an initial location, with the pre-assembled edibles 2 then being transported to a final destination in such a manner that the initial appearance of the pre-assembled edibles 2 in the shape and appearance is not changed during transport. Thus, the edible holder 1 is able to maintain the edibles 2 in the predetermined and desired position during transport, so that the pre-assembled arrangement is ready to display "as is" upon delivery and arrival at the end point location for display.

FIGS. 1, 1A-B, 2B, 3A, and 3C show the invention 1 in use with an edible 2 in a pre-assembled and arranged fashion such that the edible 2 is in the form of a natural looking flower. The edible holder 1 comprises parts or elements that include: a cup 10, a dowel pin 11, and a rod 20. The rod 20 may be affixed against or to a base or foundation 5, such that the rod 20 is secured or resting against the base 5. In one embodiment, the rod 20 extends upward and supports the cup 10 holding an edible 2. The rod 20 is configured so as to maintain the edible 2 above the base or foundation 5. In one embodiment, the rod 20 models a floral stem. Thus, the edible 2 looks like a flower so that in combination the rod 20 and cup 10 containing the edible 2 resemble a natural floral arrangement.

Continuing with FIGS. 1-3D, the invention 1 features cup 10 comprising a bottom surface 15, a sidewall surface 16, and an open top 10a and top rim 14, with the cup bottom surface 15 having a center point 17 and a cup perimeter where the cup bottom surface 15 and sidewall surface 16 are joined. The cup 10 also having a cup centerline 10b that extends perpendicularly upward from and proximate the cup bottom surface 15 center point 17 and wherein the vertical distance of said sidewall surface 16 between said cup bottom surface 15 perimeter and said open top 10a defines the height of said sidewall 16. See FIGS. 2 and 3.

In addition, the cup 10 sidewall surface 16 has a configuration adapted to enable the sidewall 16 to support and hold the edible 2 in a pre-arranged presentation display prior to and during transport of the edible 2 for display at the final destination. The cup 10 attaches to the rod 20, and thus in one embodiment, the cup 10 may be positioned via the rod 20 in a desired appearance for display. See FIGS. 1-2A, 11A-16D, 20-21, and 24-27.

The invention further comprises a dowel pin 11 that extends upward into the cup 10 along the cup centerline 10b. See FIGS. 2 and 3D. The invention 1 also includes a rod 20 that comprises a top end 22, a bottom end 23 and a centerline 25 therebetween, wherein the rod top end 22 is in contact with the cup 10 bottom surface 15 at a point is proximate the bottom surface center point 17. The rod 20 has a configuration to be secured to a base 5 to feature the edible holder 1 in an upright position, or for the rod 20 to be laid parallel to a horizontal surface such as a table or box in order to feature the rod 20 in a horizontal position while the cup 10 maintains the edible 2 in an upright position. See FIGS. 1, 2A-B, 8, 12, and 24-27. The rod 20 also has a configuration adapted to enable said rod 20 to support said cup 10 when the rod centerline 25 and the cup centerline 10b intersect with an included angle that is in the range of 0-90 degrees. FIGS. 1A, 2A-B, 4A-b, 10, 11A-D, and 15-18F. In addition, the height of the cup 10 sidewall surface 16 is such as to enable the cup sidewall 16 to support the edible 2 for the pre-assembly of the edible 2 into a specified shape having a desired initial appearance at an initial location, which pre-assembled edible arrangement can then be transported to a final destination in such a manner that the initial appearance of the edible 2 is not changed during transport. See FIGS. 1, 2, 8, 12, and 24-25.

FIGS. 1-3D show one embodiment of the invention 1 in use. To use the edible holder 1, the individual user will place the edible 2 into the holder 1 such that the edible 2 is placed into the cup 10. See also, FIGS. 1A and 1B. The individual pushes the edible 2 down into the cup 10 thereby piercing the edible 2 bottom surface via the dowel pin 11 that then extends into the inner surface 3a of the edible 2. This configuration allows the dowel pin 11 to assist in supporting and positioning the edible 2 within the cup 10 and for arrangement. In one embodiment, the edible 2 bottom surface sits proximate the cup 10 bottom surface 15. In addition, the inner surface 18 of the cup sidewall surface 16 is configured and adapted to secure and maintain the edible 2 to be arranged and formed at an in initial location for carrying and transport, and ready for final display of the edible 2 arrangement at a final destination. See FIGS. 1A and 1B. With the edible 2 in place, the holder 1 and edible 2 appear to have an organic and natural form, resembling that of a real-life floral arrangement. See FIG. 1.

Alternatively, to use the edible holder 1, the individual may first position the edible holder 1 by adjusting the cup 10 and rod 20, and then insert the edible 2 into the cup 10. In either style of placement of the edible 2, the individual may alter the positioning of the holder 1 and edible 2 to take on the specific shape and desired arranged appearance. In furtherance of the purpose and scope of this invention, this positioning generally is conducted at the initial location to prepare the arrangement prior to transporting, delivery and display of the arrangement at the final destination. Thus, the edible holder 1 maintains its pre-assembled shape and initial appearance in such a manner that the initial appearance of the edible 2 is not changed during transport, however, minor adjustments to the edible 2 presentation may also be made upon arrival to the destination if needed.

In one embodiment, the edible holder 1 comprises a rod 20, wherein the rod has a configuration that is further adapted to enable the rod 20 to be flexible. See FIGS. 1A-B, and 10-11. In another embodiment, the rod 20 has a rigid configuration. In another preferred embodiment, the cup 10 comprises a sidewall surface 16 having a slit 30 that extends downward from proximate the cup top rim 14. The slit 30 has a configuration adapted to allow the individual's fingertips 80 to contact the sidewall 4 of the edible outer surface 3a via the open slit 30 and access the edible 2. The slit 30 thereby allows the individual via the fingertips 80 to remove the edible 2 from the cup 10 by applying a slight force and lifting the edible 2 in the upward direction. This access through the opening of the slit 30 prevents the individual from having to dig or manipulate the individual's fingertips 80 into the top portion 2*a* of the edible 2 deteriorating the construction integrity of edible 2 or dirtying the individual's hands 81 with edible pieces or frosting that is typically applied to the top portion 2*a* of the edible 2, while the individual removes the edible 2 from the cup 10. See FIGS. 7-12, and 15-17.

Figure 19A:
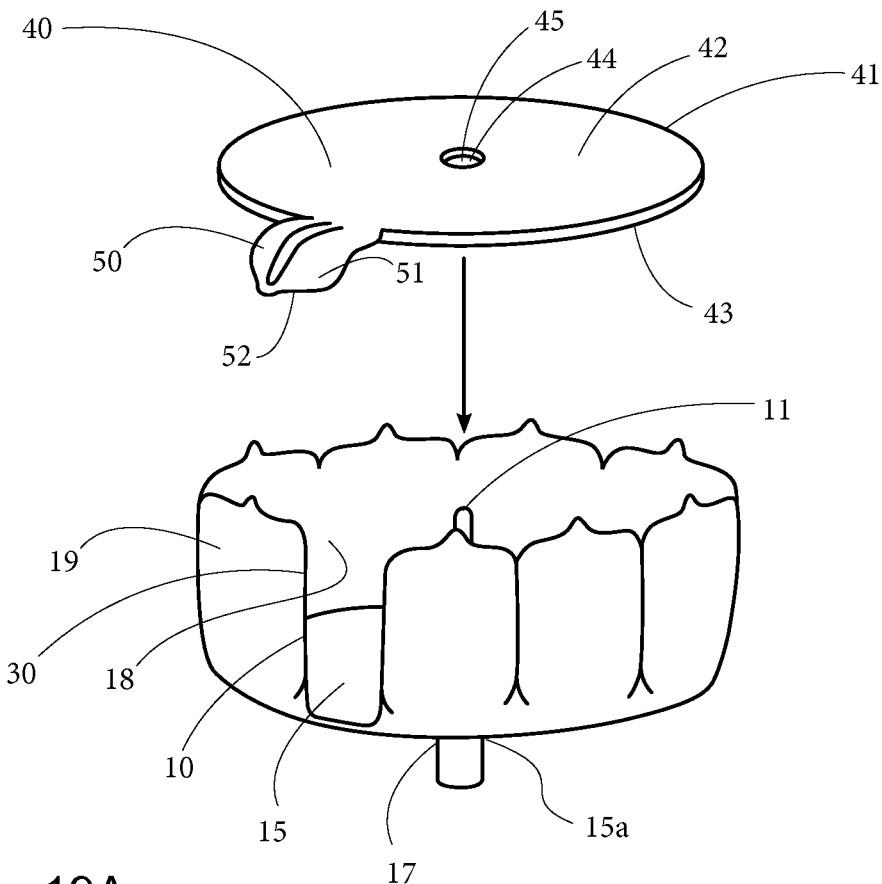
FIG. 19A is a perspective view that illustrates a preferred embodiment of the present invention, the holder for edibles being shown prior to use, without the edible in place, and featuring the cup, where the cup sidewall extends up the edible side surface and also features a slit that extends downward from proximate the cup top rim, the dowel pin proximate the cup bottom surface, and the movable plate separate and apart from the cup. This embodiment also features the plate having a bored hole for the extension of the dowel pin.
Figure 19B:
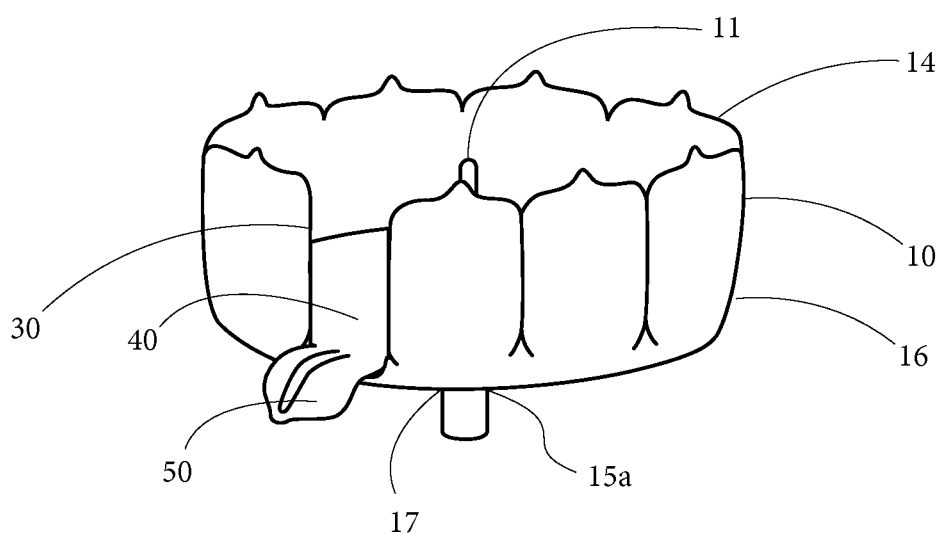
FIG. 19B is a perspective view that illustrates a preferred embodiment of the present invention, the holder for edibles being shown prior to use, without the edible in place, and featuring the cup, where the cup sidewall extends up the edible side surface and also features a slit that extends downward from proximate the cup top rim, the dowel pin proximate the cup bottom surface, and the movable plate having a bored hole inserted and seated within the cup and the dowel pin extending upward through the plate bored hole. The moveable plate having a finger rest extended radially through the cup slit, such that an individual may lift the plate with the seated edible in and out of the cup via moving the finger rest.
Figure 20:
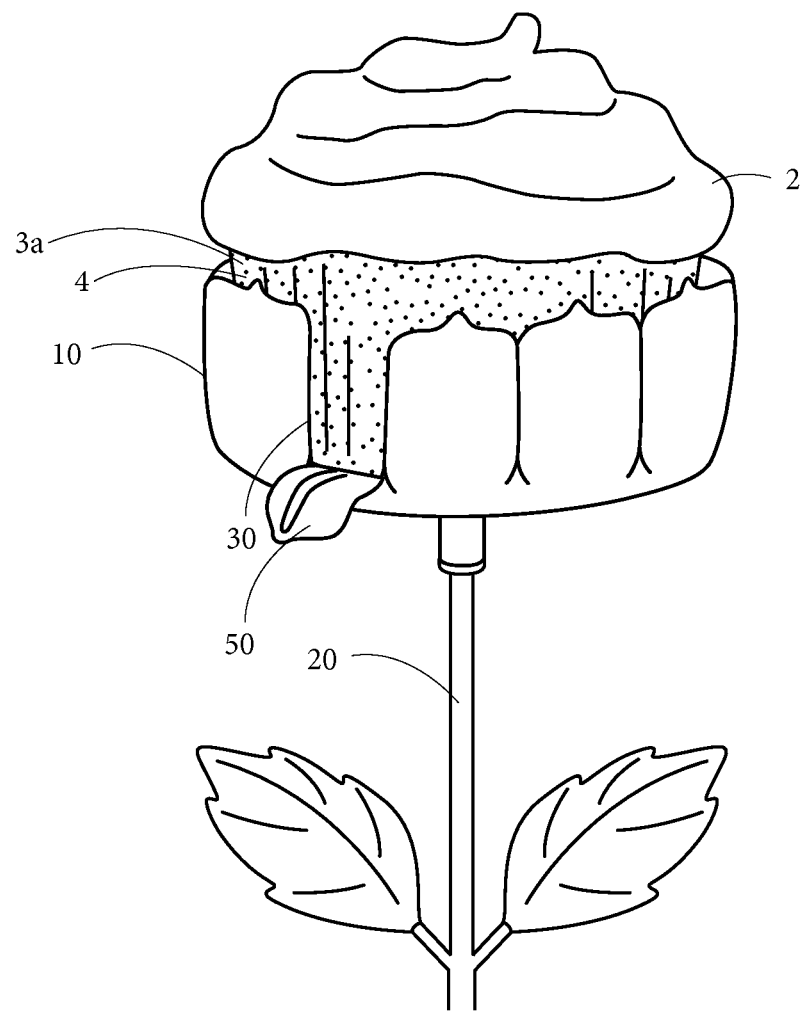
FIG. 20 is a perspective, elevational view that illustrates a preferred embodiment of the present invention, the holder for edibles being shown in use, with the edible, and featuring the cup, where the cup sidewall extends up the edible side surface and also features a slit that extends downward from proximate the cup top rim, and the movable plate inserted and seated within the cup. The moveable plate having a finger rest extended radially through the cup slit, such that an individual may lift the plate with the seated edible in and out of the cup by moving the finger rest upward.
Figure 20A:
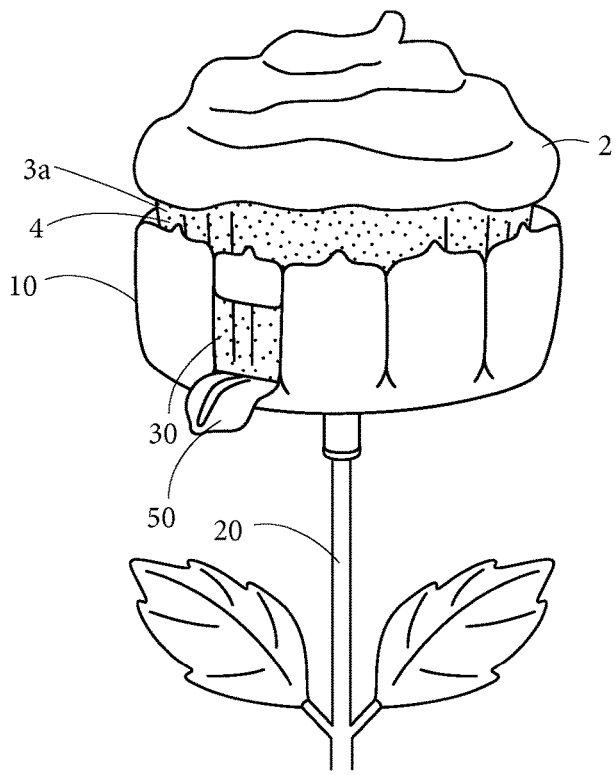
FIG. 20A is a perspective, elevational view that illustrates a preferred embodiment of the present invention, the holder for edibles being shown in use, with the edible, and featuring the cup, where the cup sidewall extends up the edible side surface and also features a slit that extends downward from proximate the cup top rim, and the movable plate inserted and seated within the cup. The moveable plate having a finger rest extended radially through the cup slit, such that an individual may lift the plate with the seated edible in and out of the cup by moving the finger rest upward. This embodiment features a continuous cup top rim with the edible in the seated position within the cup.
Figure 20B:
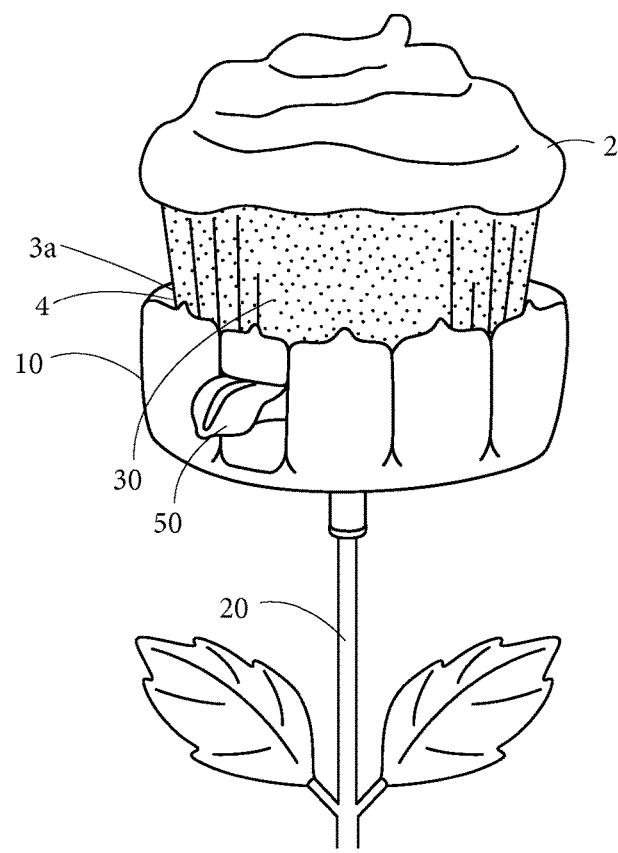
FIG. 20B is a perspective, elevational view that illustrates a preferred embodiment of the present invention, the holder for edibles being shown in use, with the edible, and featuring the cup, where the cup sidewall extends up the edible side surface and also features a slit that extends downward from proximate the cup top rim, and the movable plate inserted and seated within the cup. The moveable plate having a finger rest extended radially through the cup slit, such that an individual may lift the plate with the seated edible in and out of the cup by moving the finger rest upward. This embodiment features a continuous cup top rim with the edible and moveable plate in the raised position.
Figure 21:
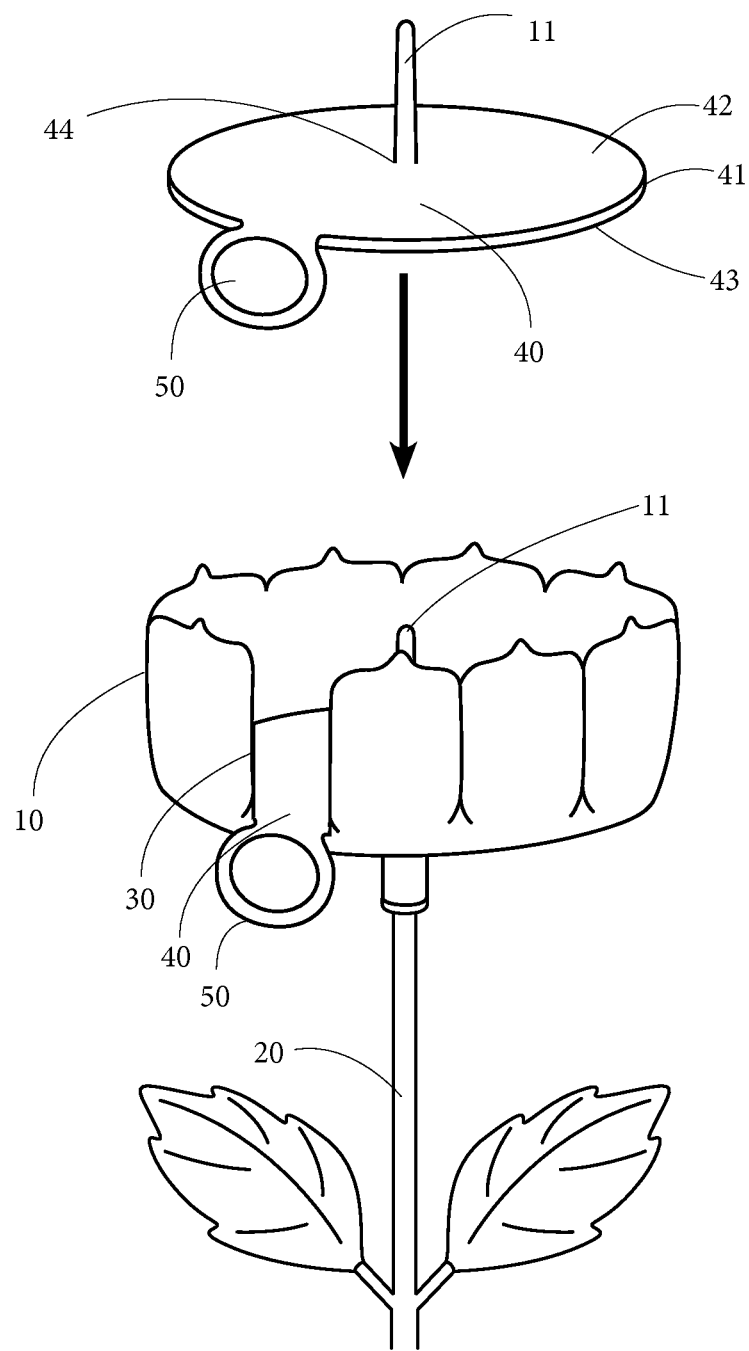
FIG. 21 is a perspective view that illustrates another preferred embodiment of the present invention, the holder for edibles being shown prior to use, without the edible, and featuring the cup, where the cup sidewall extends up the edible side surface and also features a slit that extends downward from proximate the cup top rim, the dowel pin located on the moveable plate bottom surface. The moveable plate sits proximate the cup bottom surface when inserted and seated within the cup and in use, and features a finger rest that extends radially through the cup slit, such that an individual may lift the plate with the seated edible in and out of the cup by moving the finger rest, and the cup connected to the rod.

The present invention 1 further comprises a moveable plate 40 so as to allow an individual to remove the edible 2 from the cup 10. In one embodiment, the moveable plate 40 has a plate center point 44 and plate perimeter 41. See FIGS. 19-21. The moveable plate 40 has a configuration adapted to allow the plate 40 to be temporarily placed within the cup 10 so that the plate 40 is also adjacent to the cup bottom surface 15. In addition, the moveable plate 40 features a plate finger 50 that extends radially outwards from the plate 40 perimeter 41 through the cup slit 30 beyond the sidewall surface 16 of the cup 10. The plate finger 50 has a configuration adapted to allow the finger 80 of the individual to contact the plate finger 50, and thereby move the plate 40 via a force applied with an individual's finger 80 on the underside 52 of the plate finger 50, upwardly and downwardly within the slit 30. In one embodiment, the cup sidewall is surface 4 has a slit 30 that extends downward from proximate the cup top rim 14. See FIGS. 19-21. FIG. 19A depicts the plate 40 having the finger rest 50 being inserted into the cup 10, and FIG. 19B shows placement of the plate 40 and finger rest 50 once inserted into cup 10. Continuing on, FIG. 20 depicts this form of the invention in use with the edible 2 inserted into said cup 10 and placed on the plate 40. In addition, FIG. 21 identifies one embodiment of the present invention having a plate 40 and finger rest 50. In this particular embodiment, plate 40 is also configured having a dowel pin 11 extending from the plate 40. Another embodiment features, plate 40 having a bored hole 45 proximate the plate center point 44, with the dowel pin 11 extending from the bottom cup 10 surface 15. Still yet, another embodiment features the dowel pin 11 extending from the rod 20 through a bored hole 13 in the cup 10 bottom surface 15 and a bored hole 45 in the plate 40 proximate the center point 44. Still, yet another embodiment of the present invention features a cup 10 having a continuous cup top rim 14. In this particular embodiment, the moveable plate 40 and finger rest 50 are operational in combination with the cup slit 30. See FIGS. 20A and B. Another embodiment features the plate 40 having a sidewall lip that extends upward from the plate 40 bottom surface and has a purpose of keeping the edible 2 seated on the plate 40 as an individual removes the plate upward away from the cup 10 bottom surface 15.

Also, in keeping with the purpose and scope of this invention, the cup sidewall 16 may be of various heights.

In another preferred embodiment, the rod 20 of the edible holder 1 has a rod centerline 25 that extends between the rod top end 22 and rod bottom end 23. The invention further comprises a cup-rod connector 24 that connects the rod top end 22 and the cup bottom surface 15. See FIGS. 15-18F. In one embodiment, the rod 20 extends into the cup 10 and the top end 22 of the 20 functions as the dowel pin 11. Another embodiment features the rod 20 connecting to the bottom surface 15 of the cup 10, such that there is no separate connecting element 24, but the contact between the rod and cup 10 is the connecting element 24. Yet, another embodiment features a separate connecting element 24 between the cup 10 and the rod 20. The cup-rod connector 24 has a configuration adapted to allow the cup 10 to be oriented with respect to the rod 20 so that the cup centerline 10*b* and the rod centerline 25 intersect at a desired angle within a desired range of angles. See FIGS. 2A-B, 4A-B, and 15-18F. In one embodiment, the cup-connector 24 portion affixed to the rod 20 is inline with the rod 20 centerline 25, and the cup-connector 24 portion affixed to the cup 10, is inline with the cup 10 centerline 10*b*. See FIG. 15.

In another embodiment, an individual user may angle the cup 10 via positioning of the cup-rod connector 24. See FIGS. 15-17A-D, and 18A-F. In one embodiment, the desired range of angles may be of any angle between 0 degrees and 90 degrees. See FIGS. 15-17A-D, and 18A-F. Thus, in this embodiment, the cup-rod connecter 24 has a configuration adapted to allow the cup 10 to be temporarily and variably oriented with respect to the rod 20 such that the cup centerline 25 intersects at an angle that is within a desired range of angles. See FIGS. 18A-F. Thus, the angle between the cup 10 and rod 20 may be adjusted with the cup-rod connector 24.

Figure 23A:
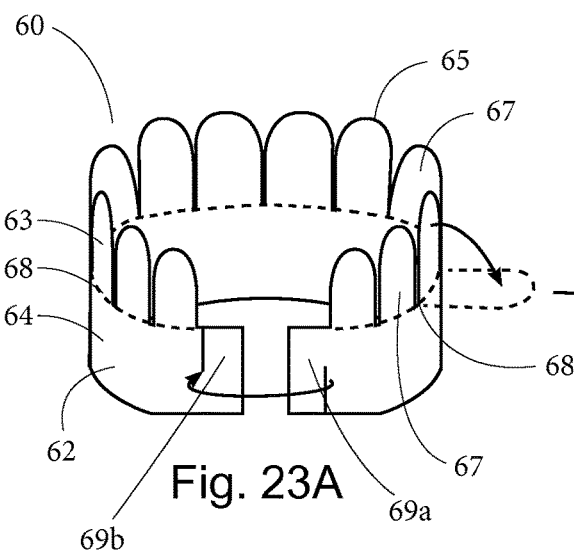
FIG. 23A is a perspective view that illustrates the ornamental collar, the collar being formed prior to attachment to the holder cup for decoration.
Figure 23B:
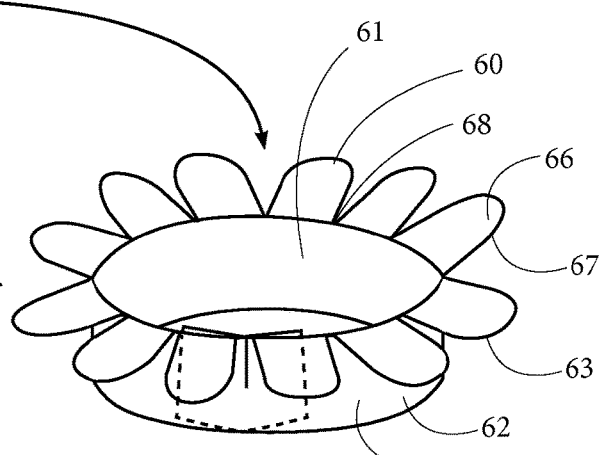
FIG. 23B is a perspective view that illustrates the ornamental collar, the collar having been formed and ready for attachment to the holder cup for decoration. In this embodiment, the collar is formed to fit around the cup surface and sit proximate to the cup.
Figure 23C:
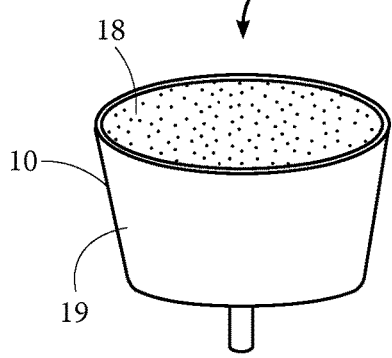
FIG. 23C is a perspective view that illustrates a preferred embodiment of the holder cup, being shown prior to use, without the edible in place, prepared to receive the ornamental collar to be attached to the holder cup for decoration.
Figure 23D:
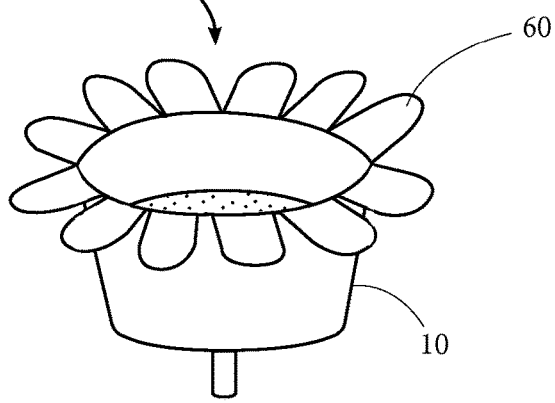
FIG. 23D is a perspective view that illustrates a preferred embodiment of the holder cup, and shows the ornamental collar, the collar formed and attached to the holder for edibles, prior to use without the edible in place. In this embodiment, the attachment is formed to fit around the cup surface and sit proximate to the cup for decoration.
Figure 24A:
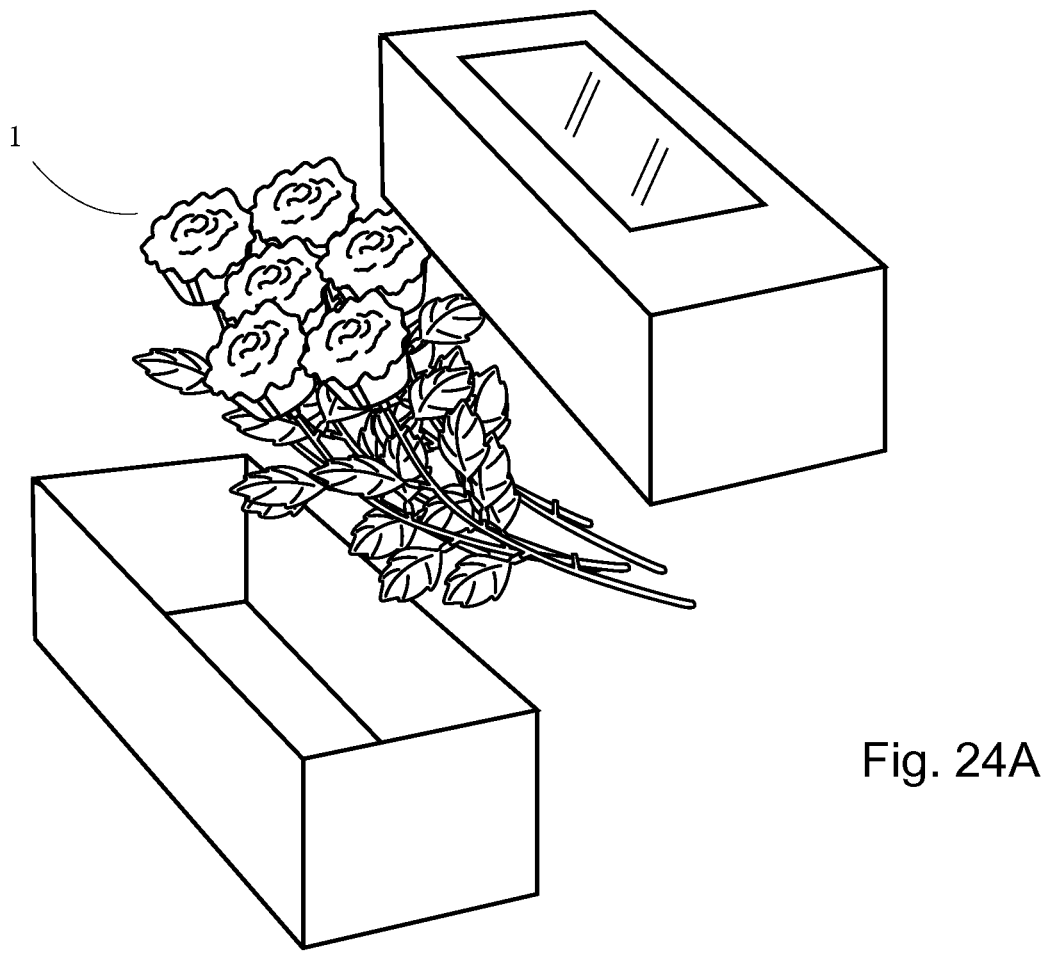
FIG. 24A is a perspective, elevational view that illustrates a pre-assembled edible form at an initial location for transport and final display arrangement. A preferred embodiment of the present invention is featured in a horizontal display position with the edible upright, for example, in a box comprising a top and bottom portion and having the ability to open and close, and featured in the open position where the invention is being placed inside of the box.
Figure 24B:
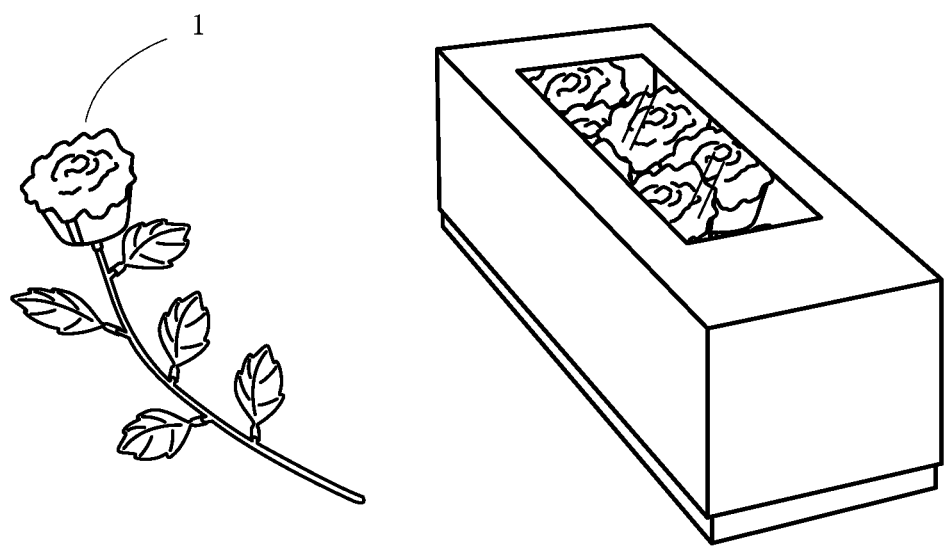
FIG. 24B is a perspective, elevational view that illustrates a pre-assembled edible form at an initial location for transport and final display arrangement. A preferred embodiment of the present invention is featured in a horizontal display position with the edible upright, for example, a box comprising a top and bottom portion and having the ability to open and close, and featured in the closed position, with the invention placed inside of the box and displayed in a final form modeling a natural, boxed floral arrangement.
Figures 25A, 25B:
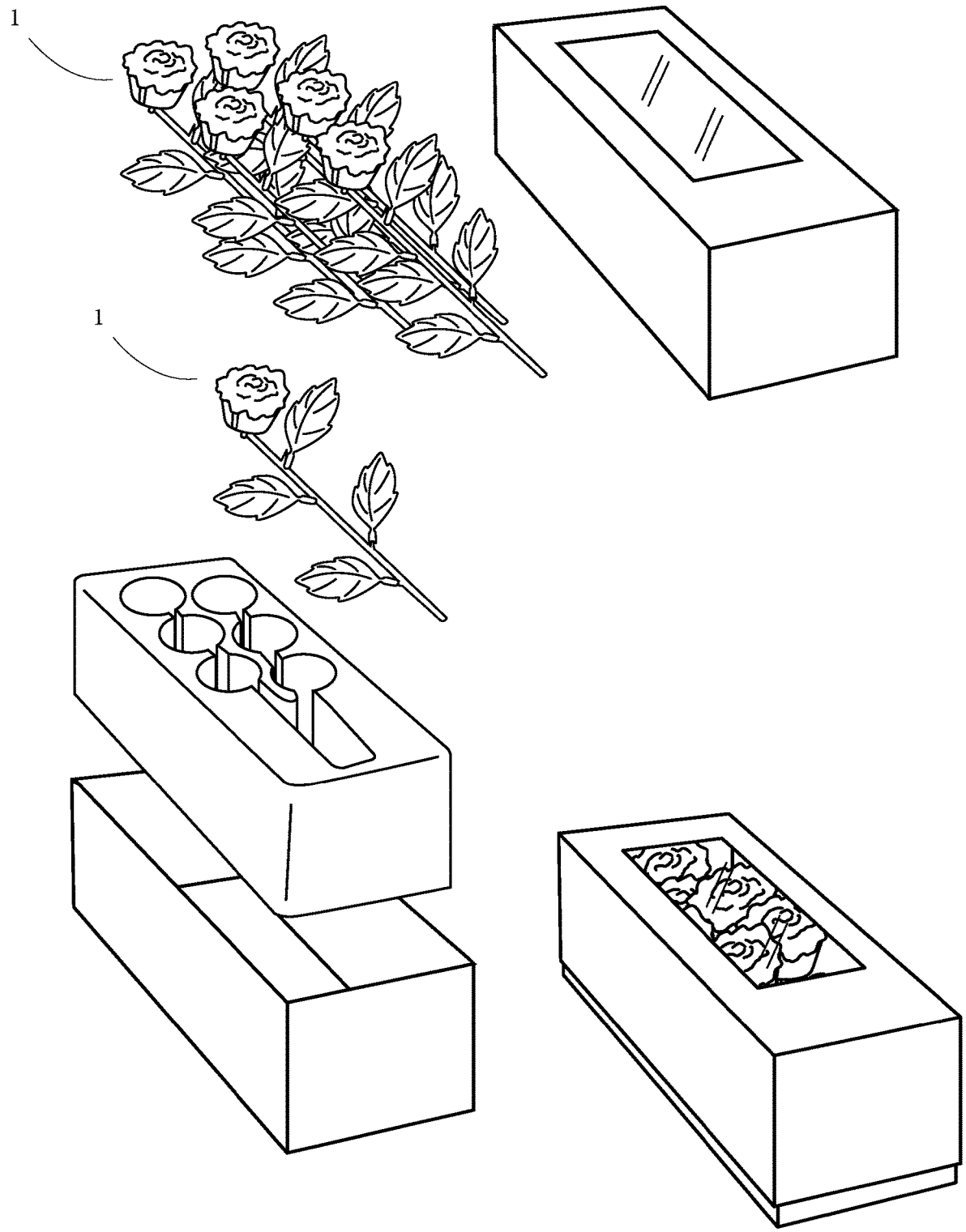
FIG. 25A is a perspective, elevational view that illustrates a pre-assembled edible form at an initial location for transport and final display arrangement. A preferred embodiment of the present invention is featured in a horizontal display position with the edible upright, for example, in a box comprising a single unit having the ability to open and close, and featured in the closed position with the invention having a rod featured in the horizontal position and the edible substantially perpendicular to the rod, ready to be placed inside of the box.
FIG. 25B is an elevational view that illustrates a pre-assembled edible form at an initial location for transport and final display arrangement. A preferred embodiment of the present invention is featured in a horizontal display position with the edible upright, for example, a box comprising a top and bottom portion and having the ability to open and close, and featured in the closed position where the invention has been placed inside of the box for transport and final display, and modeling a natural boxed floral arrangement.

In yet another preferred embodiment, the present invention further comprises a decorative collar attachment 60 having a configuration adapted to be seated proximate the cup sidewall surface 4 to enable the cup 10 to display an edible 2 in a cup 10 having a featured having an ornamental element proximate the cup 10 or side surface 3*a* of the edible 2 so as to enhance the aesthetic overall appearance of the edible arrangement. In one example, the edible 2 may appear to have flower petals surrounding the perimeter of the edible 2. See FIG. 23D.

Figure 22:
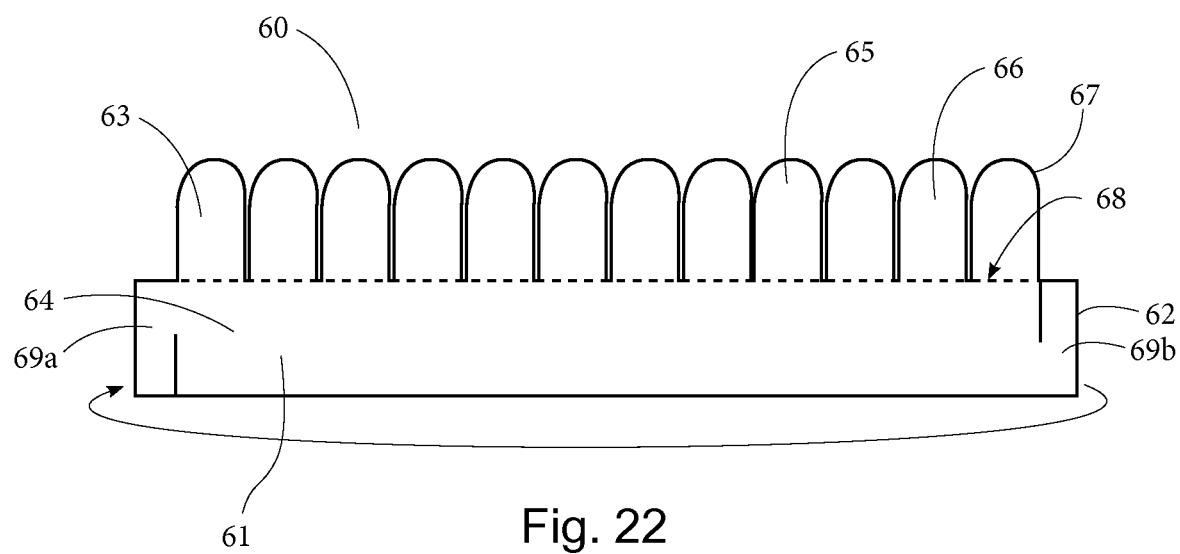
FIG. 22 is a side view that illustrates a preferred embodiment of an ornamental collar to be attached to the holder for edibles. In this embodiment, the ornamental collar attachment is in an open position and may be pliable and formed to fit around the holder cup surface and sit proximate to the cup for decoration.

FIG. 22 depicts one embodiment of the decorative collar 60 as shown, prior to attachment to the edible holder 1. Here, the collar 60 is shown having an inner surface 61 and outer surface 62, a top portion 63 and bottom portion 64, and collar decorative edging 65. In addition, the collar 60 also a top surface 66 and bottom surface 67, a first end 69*a* and a second end 69*b*. Still further, another embodiment features perforated edging 68 to create a malleable approach to forming the aesthetic features that the collar 60 seeks to create, such as the appearance of natural looking flower petals along the cup 10 top perimeter.

Still further, FIG. 23A-D depict one embodiment of the decorative collar attachment 60, where an individual may take the collar attachment 60 and form it to be inserted into cup 10. Here, an individual may take the ends 69*a* and 69*b* of the collar 60 and curve them inwards to attach and form a continuous circle proximate the cup 10. In one embodiment, the collar 60 has decorative edging 65, that is further accentuated by bending the edging 65 via a perforated edge 68, such that the edging extends over the cup rim 14 and is perpendicular to the cup 10 sidewall 16.

The decorative collar 60 and the attachment means of the first end 69*a* and second end 69*b*, may be made or connected to the cup 10 or wrapped to connect each end 69*a*, 69*b* by any suitable connecting means of the releasable or permanent type without departing from the scope of the invention. For example, the decorative collar 60 could be easily adhered to adjoin the cup 10, or could be glued, sewn, taped, used in combination with elastic or affixed by other means. In addition, the decorative collar 60 may be affixed to the cup 10 by way of permanent embodiment or be of one continuous structure and part of the cup 10. It should be understood by those skilled in the art that the decorative collar 60 is not meant to be limiting, and other embodiments exist within the scope of the invention.

Figure 26:
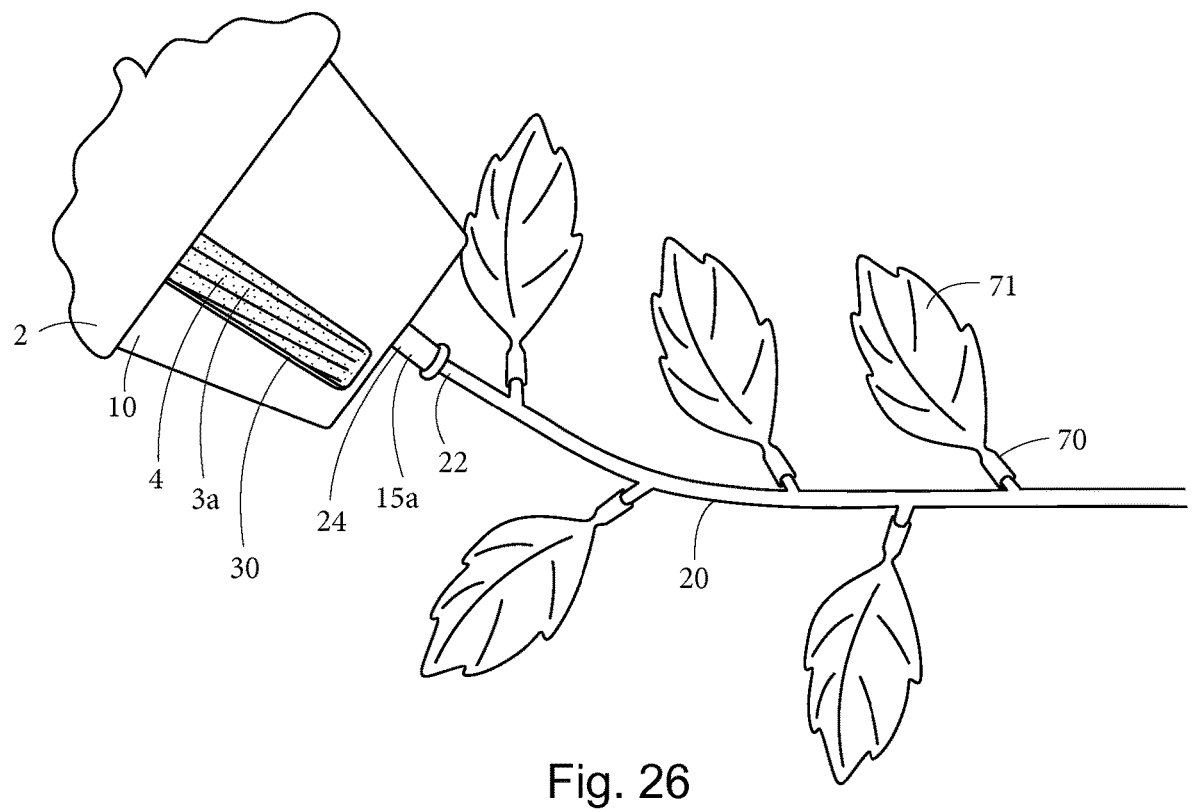
FIG. 26 is a side view that illustrates a preferred embodiment of the present invention in the horizontal position, the holder for edibles shown in use, with the desired edible in place and positioned in an upward direction, where the cup sidewall extends up the edible side surface and also features a slit that extends downward from proximate the cup top rim, and also features the rod having a configuration in the horizontal position.
Figure 27:
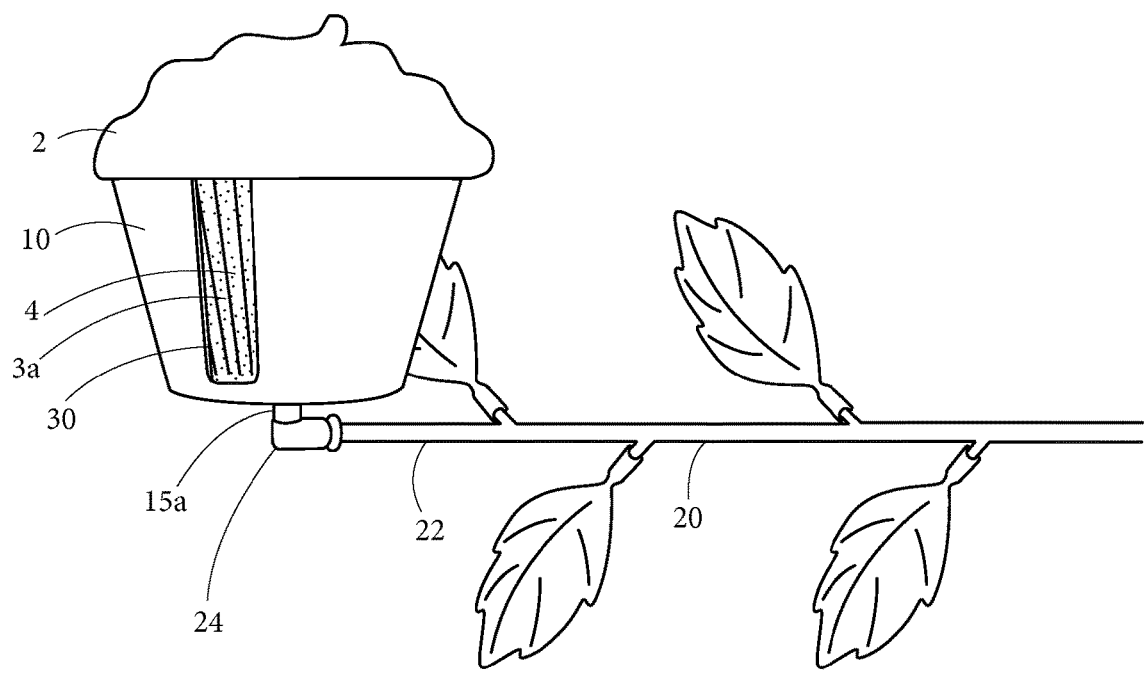
FIG. 27 is a perspective, side view that illustrates a preferred embodiment of the present invention in the horizontal position, the holder for edibles shown in use, with the desired edible in place and positioned in an upward direction, where the cup sidewall extends up the edible side surface and also features a slit that extends downward from proximate the cup top rim, and also features the rod having a configuration in the horizontal position.

Still further, the present invention 1 may also be utilized for a pre-arranged form display in the horizontal position. In one embodiment, the edible holder 1 is featured such that the edible is an upright or vertical position, while the rod 20 is in the horizontal position. One embodiment features the edible holder 1 and edible 2 displayed in the horizontal position as a boxed floral arrangement with the pre-assembled edibles 2 in an upright position. See FIGS. 24A and 24B. In addition, the edible holders 1 may be placed for horizontal display in a molded form to keep the holder positioned in a pre-assembled and arranged form. See FIGS. 25A and 25B. The edible holders 1 may be pre-assembled with edibles 2 and displayed in a horizontal arrangement with the cup 10 positioned upright as shown in FIGS. 26 and 27.

The edible holder 1 components may be made of any suitable material. For example, the cup 10 may be made of plastic, PVC, molded material, polymer material, pre-formed material, wood, metal, or the like material in order to achieve the desired function. In addition, the dowel pin 11 and rod 20 for example, may be made of plastic, PVC, polymer, molded material, pre-formed material, wood, metal, wire gauge, or the like material in order to achieve the desired function. It should be understood that other is types of surface materials or textures could be used without departing from the scope of the present invention. These materials, like all of the materials listed herein, are listed as examples and should not be interpreted as being limiting to the materials used in making the invention.

FIGS. 1, 1A, and 1B-3D show the edible holder 1 in use as an individual inserts the edible 2 into place and into the cup 10 through the cup open top 10a or similarly, as the individual is removing the edible 2 from its seated position within the cup 10. FIGS. 1, 1A, and 1B show a perspective, side view of a preferred embodiment of the present invention 1 and further details a rod 20 where the top end 22 is in contact with the cup 10 bottom surface 15 and has a configuration adapted to enable the rod 20 to support the cup 10 when the rod centerline 25 and the cup centerline 10b intersect that is in the range of 0-90 degrees. In one embodiment, the cup 10 sidewall surface 16 having a slit 30 that extends downward from proximate said cup 10 top rim 14, wherein the slit 30 has a configuration adapted to allow the fingertips 80 of an individual to access the edible 2 and remove it from the cup 10. Thus, the edible 2 may be inserted into and removed from the cup 10. It should be understood that the rod 20 of the edible holder 1 is featured as being positioned with the bottom end 23 of the rod 20 inserted and affixed into a display base 5 while supporting and maintaining the cup and edible in a pre-arrangement form. The rod 20 may be affixed to a display base 5 of any suitable connecting, coupling, or attachment means without departing from the scope of the present invention. Moreover, the edible holder 1 may be affixed to a base 5 or box, tabletop, basket, or other foundation or the like. See FIGS. 1, 12, 24A-B, and 25A-B. It should be noted that in one embodiment, the rod 20 may be positioned horizontally with the rod 20 main body portion 21 proximate a base 5, box, or foundation. See FIGS. 24A-B, 25A-B, and 26-27. In addition, while only one rod 20 and cup 10 are featured, in another embodiment, the invention may be used with a rod 20 supporting more than one cup 10 and edible 2.

Figure 2A:
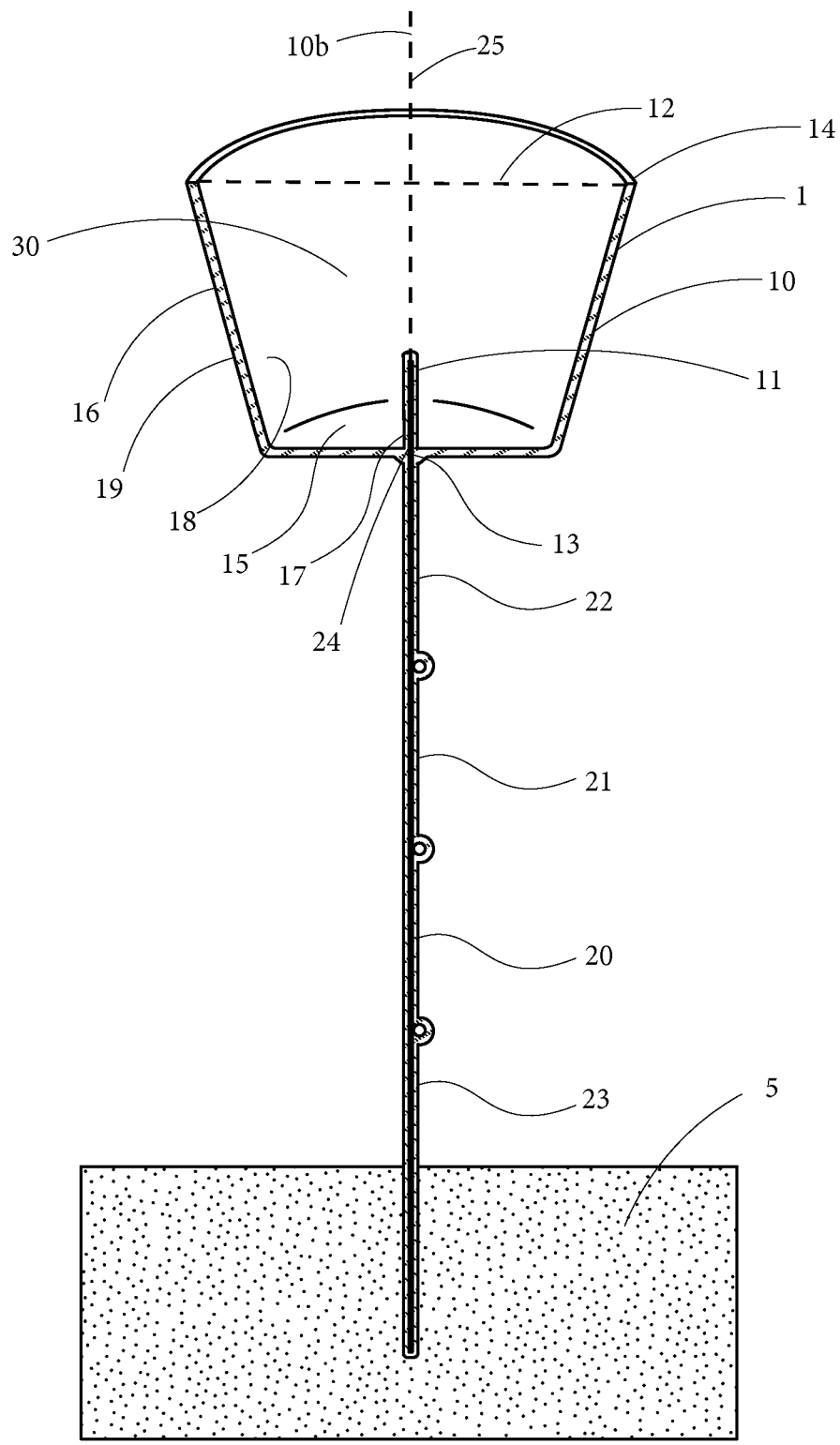
FIG. 2A is a sectional side view that illustrates a preferred embodiment of the present invention, the holder for edibles shown prior to use, without the desired edible in place, where the cup sidewall extends upward from proximate the cup bottom surface, and also features the dowel pin, and rod, and having a configuration in an upright and vertical position.
Figure 2B:
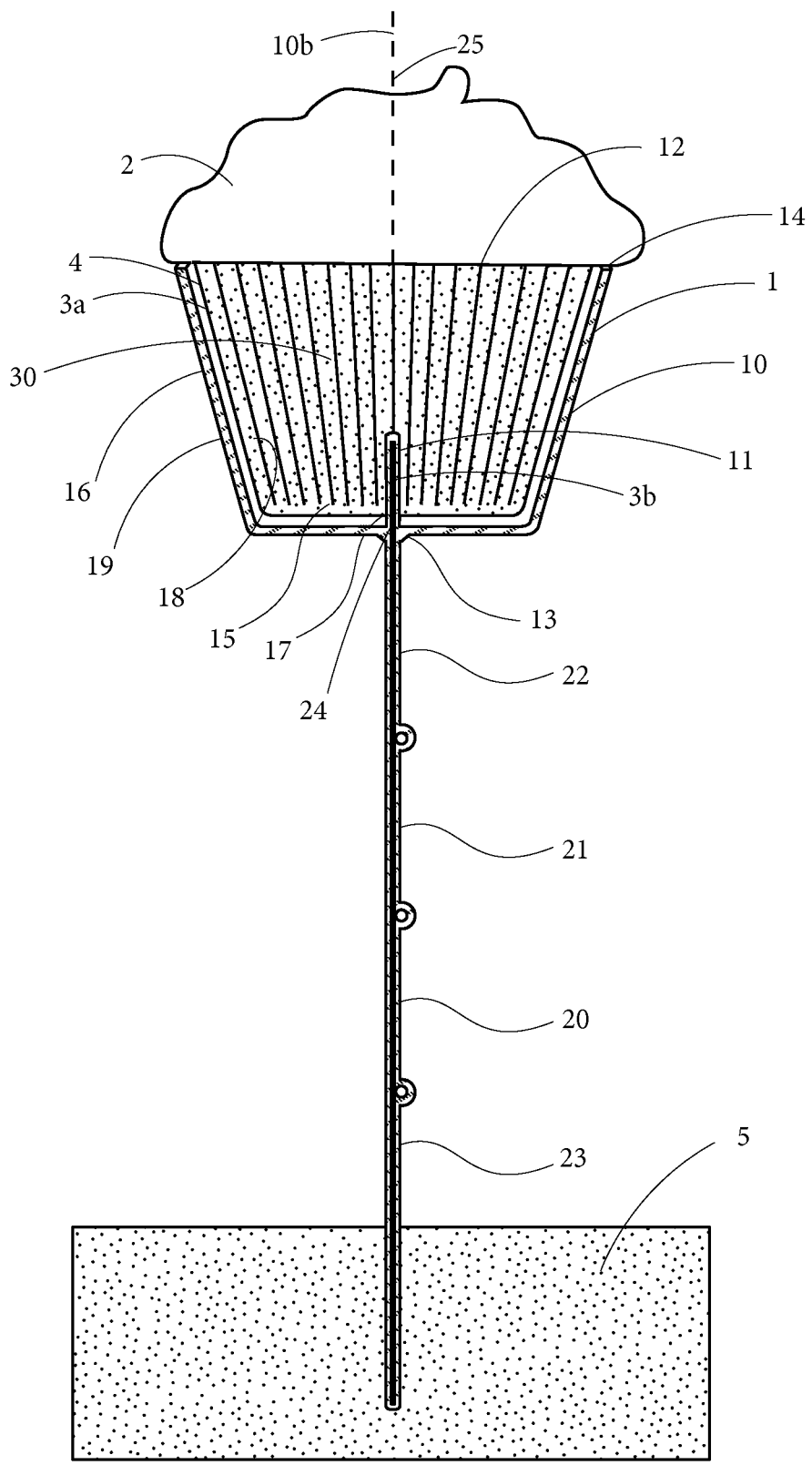
FIG. 2B is a sectional side view that illustrates a preferred embodiment of the present invention in an upward position, the holder for edibles shown in use, with the desired edible in place, where the cup sidewall extends upward from proximate the cup bottom surface up the edible side surface, and also features the rod, having a configuration in an upright and vertical position.
Figure 3C:
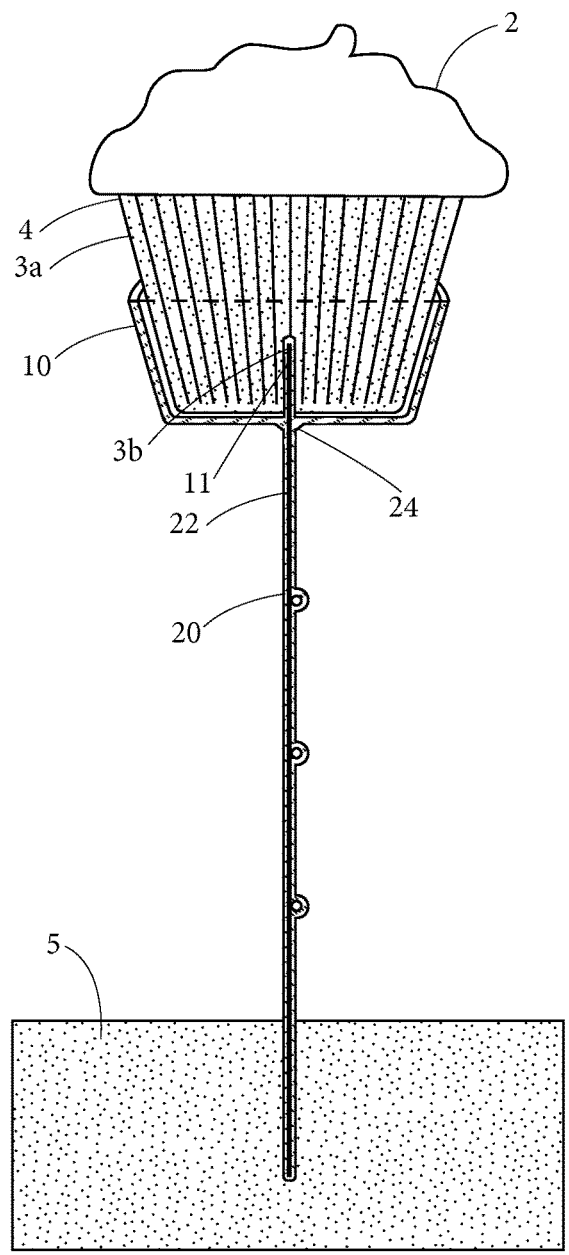
FIG. 3C is a sectional side view that illustrates a preferred embodiment of the present invention, the holder for edibles shown in use, with the desired edible in place, where the cup sidewall extends upward from proximate the cup bottom surface and the sidewall height is approximately one-third of the way up the edible side surface, and also features the dowel pin and rod, and having a configuration an the upright and vertical position.
Figure 3D:
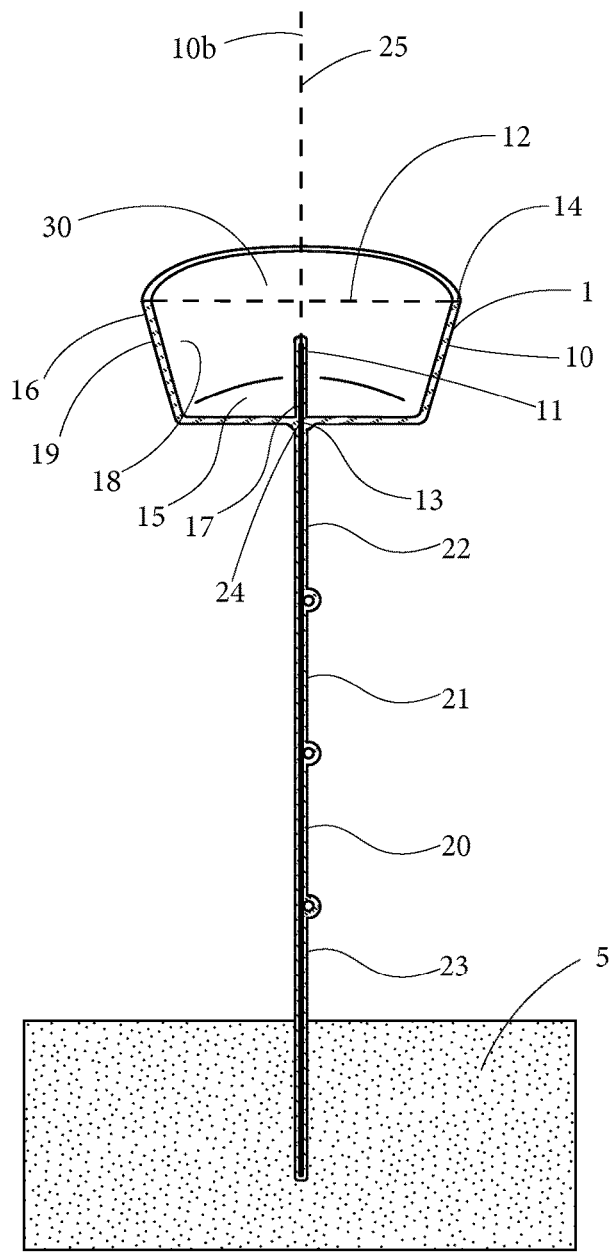
FIG. 3D is a sectional side view that illustrates a preferred embodiment of the present invention, the holder for edibles shown prior to use, without the desired edible in place, where the cup sidewall extends upward from proximate the cup bottom surface and the sidewall height is approximately one-third of the way up the edible side surface, and also features the dowel pin and rod, and having a configuration in an upright and vertical position.

FIGS. 2A and 2B provide sectional side views of the edible holder invention 1. FIG. 2B features the cup 10 in use with the edible 2 in place; and FIG. 2A shows the present cup 10 without the edible 2 in place, where the edible 2 has not yet been inserted into the cup 10 through the open top 10a of the cup 10. In both FIGS. 2A and 2B, the cup 10 has a bottom surface 15, a bottom surface center point 17, a cup sidewall surface 16 and a cup open top 10a. The cup bottom surface 15 has a cup perimeter where the bottom surface 15 and sidewall surface 16 are joined, and wherein the vertical distance up the sidewall surface 16 between the perimeter and said open top 10a defines the height of said sidewall 16. In addition, the cup 10 also has a cup centerline 10b that extends perpendicularly upward from and proximate the bottom surface centerpoint 17.

The edible holder 1 also features a dowel pin 11 that extends upward into the cup 10 and along the cup centerline 10b. As described herein, the dowel pin 11 pushes through the edible 2 bottom surface and within the edible 2 and supports the edible 2 when arranged in a desired position. In this particular embodiment, the rod 20 extends through a bored hole 13 in the bottom surface 15 of the cup 10 and also acts as the dowel pin 11 that extends upward into the cup 10 and along the cup centerline 10b. Thus, the top end 22 of the rod 20 is considered the cup-rod connector 24 that connects the cup 10 and rod 20. The rod 20 may protrude anywhere from the top portion of the rod 20, and the rod 20 continuing to extend past the cup 10. In another possible embodiment, the rod 20 top end 22 contacts the bottom surface of the cup 10, and the rod bottom end 23 is inserted into a base 5. These configurations are not intended to be limiting and should be understood by those skilled in the art that other embodiments may be used without departing from the scope of the present invention.

Continuing with FIGS. 2A and 2B, the details of the cup sidewall 16 are further depicted. FIG. 2B shows the invention 1 in use with the edible 2 seated in the cup 10, having a sidewall proximate the cup 10 bottom surface 15 that the extends up the side surface 3a of the edible 2, with the dowel pin 11 extended into the edible 2. The edible holder 1 cup 10 sidewall 16 extends downward from proximate the cup top rim 14. The height of the sidewall surface 16 assists in maintaining the edible 2 in the desired position and supports the edible 2 in an upright position. In another embodiment, the sidewall 16 extends the full length of the edible side surface wall 3a. See FIG. 2A-2B. Another embodiment features the sidewall 16 extends approximately midway up the sidewall surface 4 of the edible 2. See FIGS. 3A-B. In still another embodiment the cup sidewall 16 extends approximately one-third of the height of the sidewall surface 4 of the edible 2. See FIGS. 3C-D. The height of the cup sidewall 16 is such that the height of the cup sidewall surface 16 enables the cup sidewall 16 to support said edible 2 for the pre-assembly of the edible 2 into a specified shape having a desired initial appearance at an initial location, which pre-assembled edible 2 can then be transported to a final destination in such a manner that the initial appearance of the edible 2 is not changed during transport. Thus, the present invention enables the arrangement to arrive in its pre-assembled appearance upon arrival to the end point location and ready for display. It should be noted that other embodiments or variations of the cup 10 sidewall 16 configurations exist such that the purpose and scope of the invention is carried out.

Figures 4A, 4B:
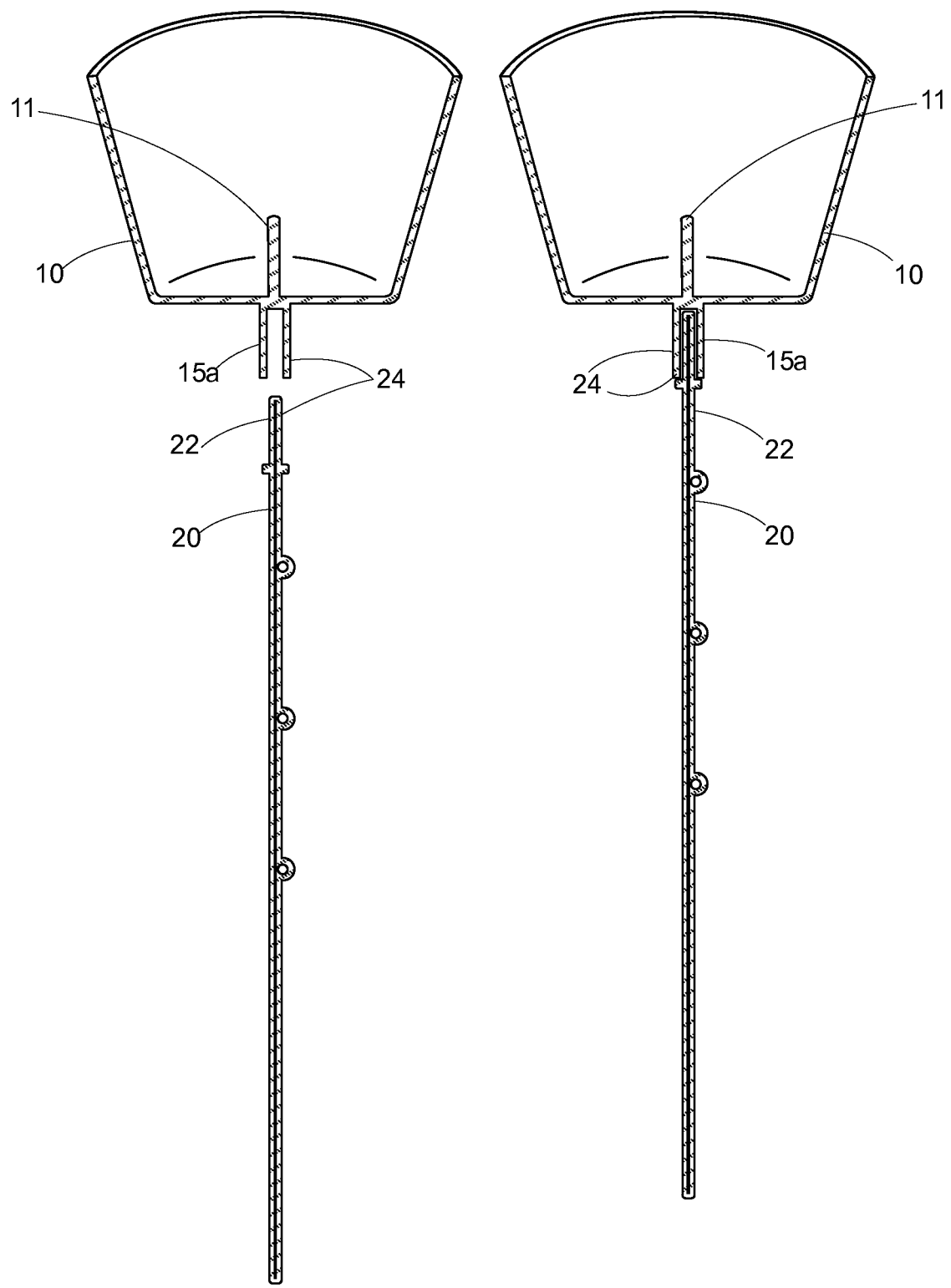
FIG. 4A is a sectional side view that illustrates a preferred embodiment of the present invention, the holder for edibles being shown prior to use, where the cup sidewall extends upward from proximate the cup bottom surface, and this preferred embodiment also features the dowel pin, rod, and the connector element between the cup and the rod being unengaged.
FIG. 4B is a sectional side view that illustrates a preferred embodiment of the present invention, the holder for edibles being shown prior to use, where the cup sidewall extends upward from proximate the cup bottom surface, and this preferred embodiment also features the dowel pin, rod, and the connector element between the cup and the rod being engaged.

FIGS. 4A and 4B provide more details of the construction of a connection element 24 between the rod top end 22 and the cup bottom surface 15 at a point proximate the bottom surface center point 17. In one embodiment, the edible holder 1 features a cup 10 having a rod collar 15a, such that the rod top end 22 contacts the cup bottom surface 15 via attachment with the collar 15a. The rod collar 15a connects the rod 20 to the cup 10 with a detachable, releasable type where the cup 10 and rod 20 are separated as shown in FIG. 4A and then joined in FIG. 4B. It should be understood by one skilled in the art that the connector element 24 may be of any shape or form such that it achieves the desired purpose of the present invention without departing from the scope of the present invention. However, in another embodiment, a permanent contact between the rod 20 and cup 10 is utilized without departing from the scope of the present invention.

Figure 5A:
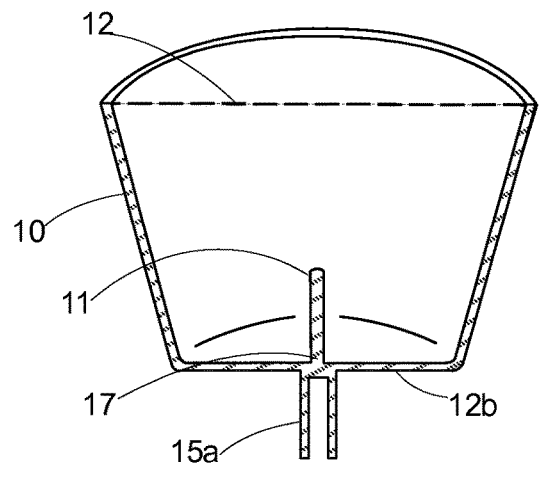
FIG. 5A is a sectional side view that illustrates a preferred embodiment of the present invention, the holder cup being shown prior to use without the edible in place, and featuring the cup, dowel pin, and connector element.
Figure 5B:
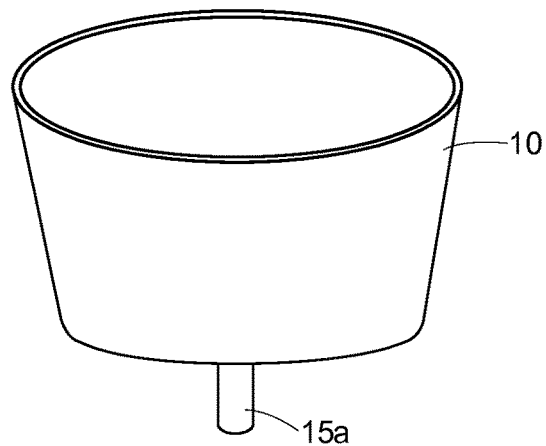
FIG. 5B is a perspective, side view that illustrates a preferred embodiment of the present invention, the edible holder cup being shown prior to use without the edible, and featuring the cup in place, and connector element.
Figure 5C:
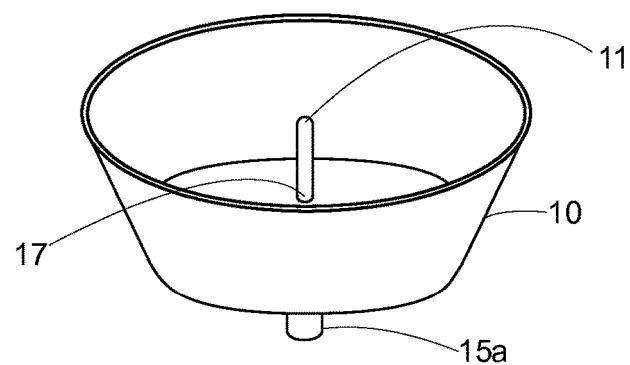
FIG. 5C is a elevational view that illustrates a preferred embodiment of the present invention, the holder cup being shown prior to use without the edible in place, and featuring the cup, dowel pin, and connector element.

In addition, FIGS. 5A-5C, 6A-C, and 9A-C, demonstrate the details of the edible holder 1 cup 10 shown separate and apart from the rod 20. Here, the rod collar 15a and dowel pin 11 are featured, along with the construction details of the cup sidewall 16 as shown extending upward and is of a height to support the edible 2 surface sidewalls 4 and maintain the edible 2 within the cup 10 in the desired arrangement position prior to and during travel. In addition, FIGS. 9A-C feature the cup 10 of the edible holder 1 as shown in FIGS. 5A-C and further configured having a slit 30 which is described in more detail herein.

Figure 6A:
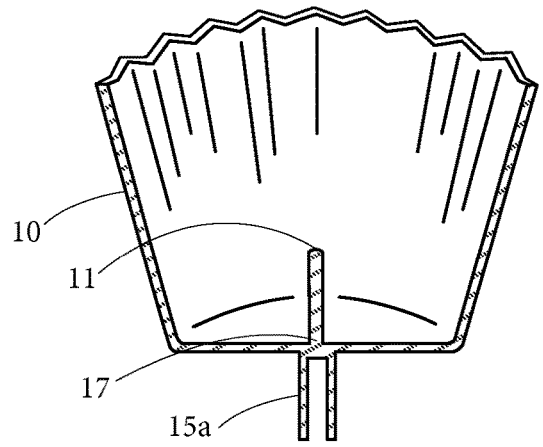
FIG. 6A is a sectional side view that illustrates another preferred embodiment of the present invention, the holder cup being shown prior to use without the edible in place, and featuring the cup, dowel pin, and connector element.
Figure 6B:
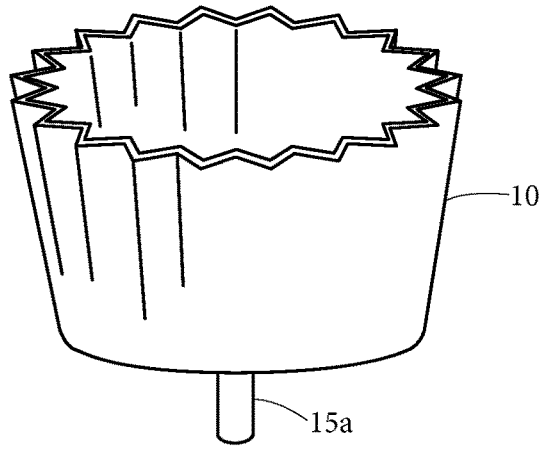
FIG. 6B is a perspective, side view that illustrates another preferred embodiment of the present invention, the holder cup being shown prior to use without the edible in place, and featuring the cup and connector element.
Figure 6C:
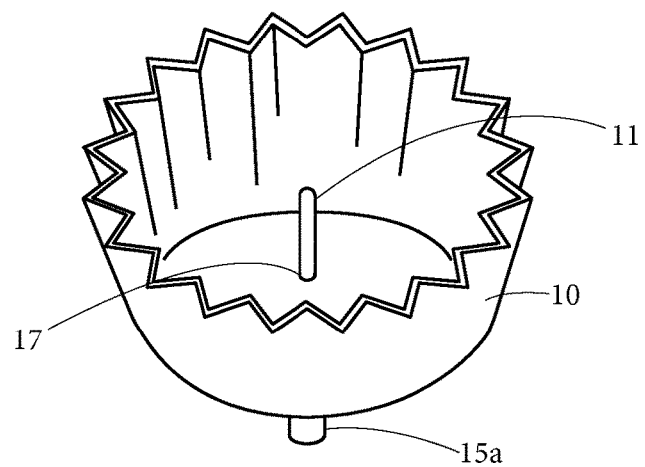
FIG. 6C is a perspective, elevational view that illustrates another preferred embodiment of the present invention, the holder cup being shown prior to use without the edible in place, and featuring the cup, dowel pin, and connector element.

The preferred shape of the cup 10 is cylindrical, however, it should be understood by one skilled in the art that the cup 10 may be of any shape in order to achieve the desired purpose of the present invention and without departing from the scope of the present invention. As shown in FIGS. 6A-C, for example, the cup 10 may take a patterned cylindrical form. Other cup shapes include but are not limited to a square, or any shape, so long as the cup 10 may hold the edible 2 and the rod 20 supports the cup 10 for pre-arrangement, transport and delivery while maintaining the edible 2 in the desired position.

Figure 7:
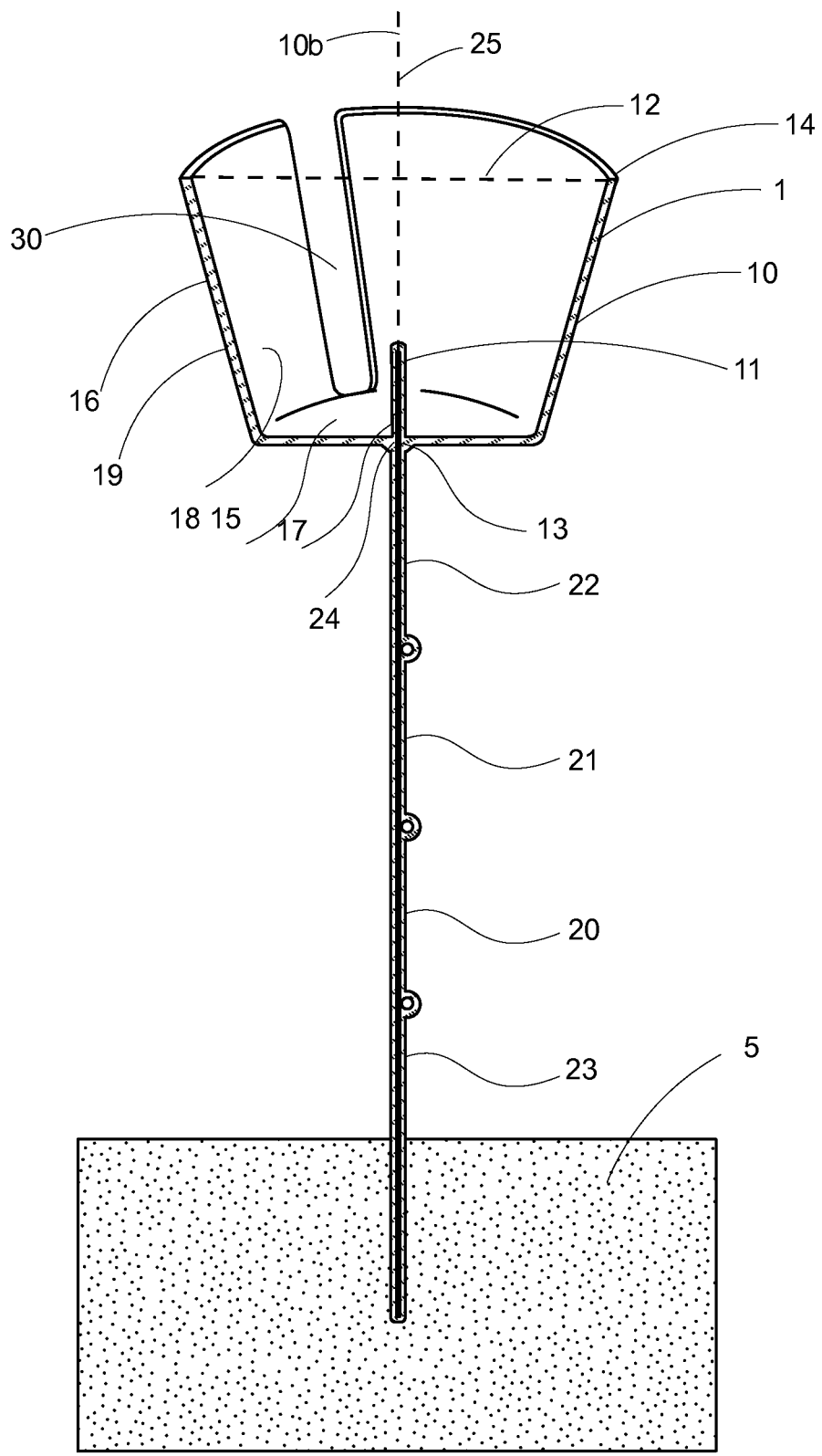
FIG. 7 is a sectional side view that illustrates a preferred embodiment of the present invention, the holder for edibles being shown prior to use without the edible, and featuring the cup, dowel pin and rod, where the cup sidewall also features a slit that extends downward from proximate the cup top rim, and having a configuration in an upright position.
Figure 8:
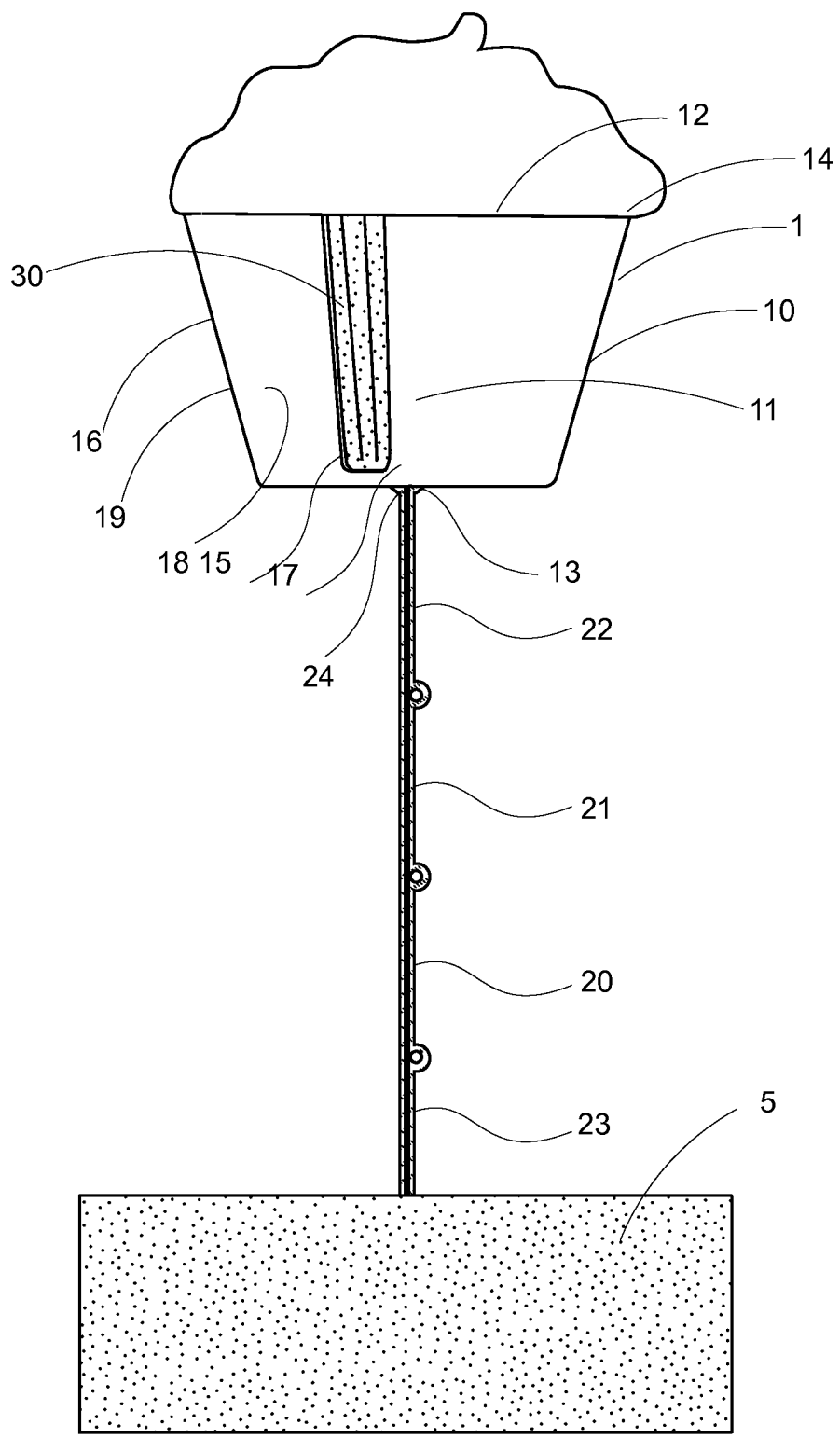
FIG. 8 is a side view that illustrates a preferred embodiment of the present invention in an upright position, the holder for edibles shown in use, with the desired edible in place, where the cup sidewall also features a slit that extends downward from proximate the cup top rim, and also features the rod, having a configuration in an upright position.
Figure 10:
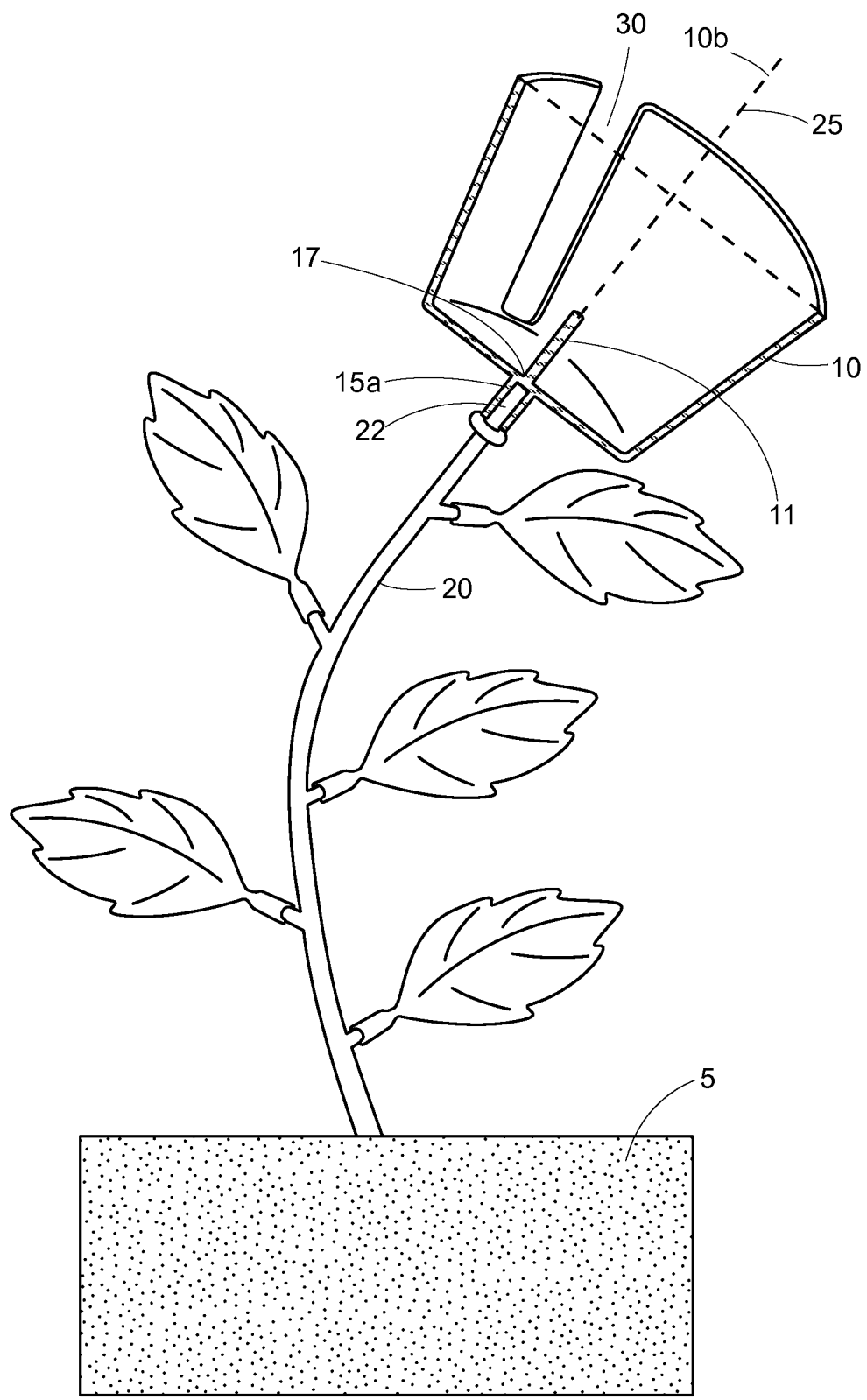
FIG. 10 is a sectional side view that illustrates another preferred embodiment of the present invention, the holder for edibles being shown prior to use without the edible in place, and featuring the cup, dowel pin, and connector element, where the cup sidewall also features a slit that extends downward from proximate the cup top rim. This embodiment features the rod having a configuration adapted to be flexible and enabled to support the cup at an angled position and maintain the edible in the desired position.

FIGS. 7 and 8 identify another embodiment of the present invention, exhibiting the same embodiment components as featured in FIGS. 2 and 3 and described in detail herein, and further feature a slit 30 in the cup 10 sidewall 16. FIG. 7 shows a preferred embodiment of the present invention in an upright position, the edible holder 1 shown prior to use, and FIG. 8 shows the invention with the desired edible 2 in place. In this embodiment, the cup sidewall 16 features a slit 30 that extends downward from proximate the cup top rim 14, and also features the rod 20, having a configuration in the upright position. In preferred embodiments, the sidewall surface 16 is perpendicular or approximately perpendicular to the cup bottom surface 15. The slit 30 has a configuration adapted to allow the fingertips 80 of an individual to access the outer surface 3a sidewall 4 of the edible 2 through the slit 30 and remove the edible 2 from the cup 10. In a preferred embodiment, the slit 30 has a configuration that is open and unobstructed.

Figure 11A:
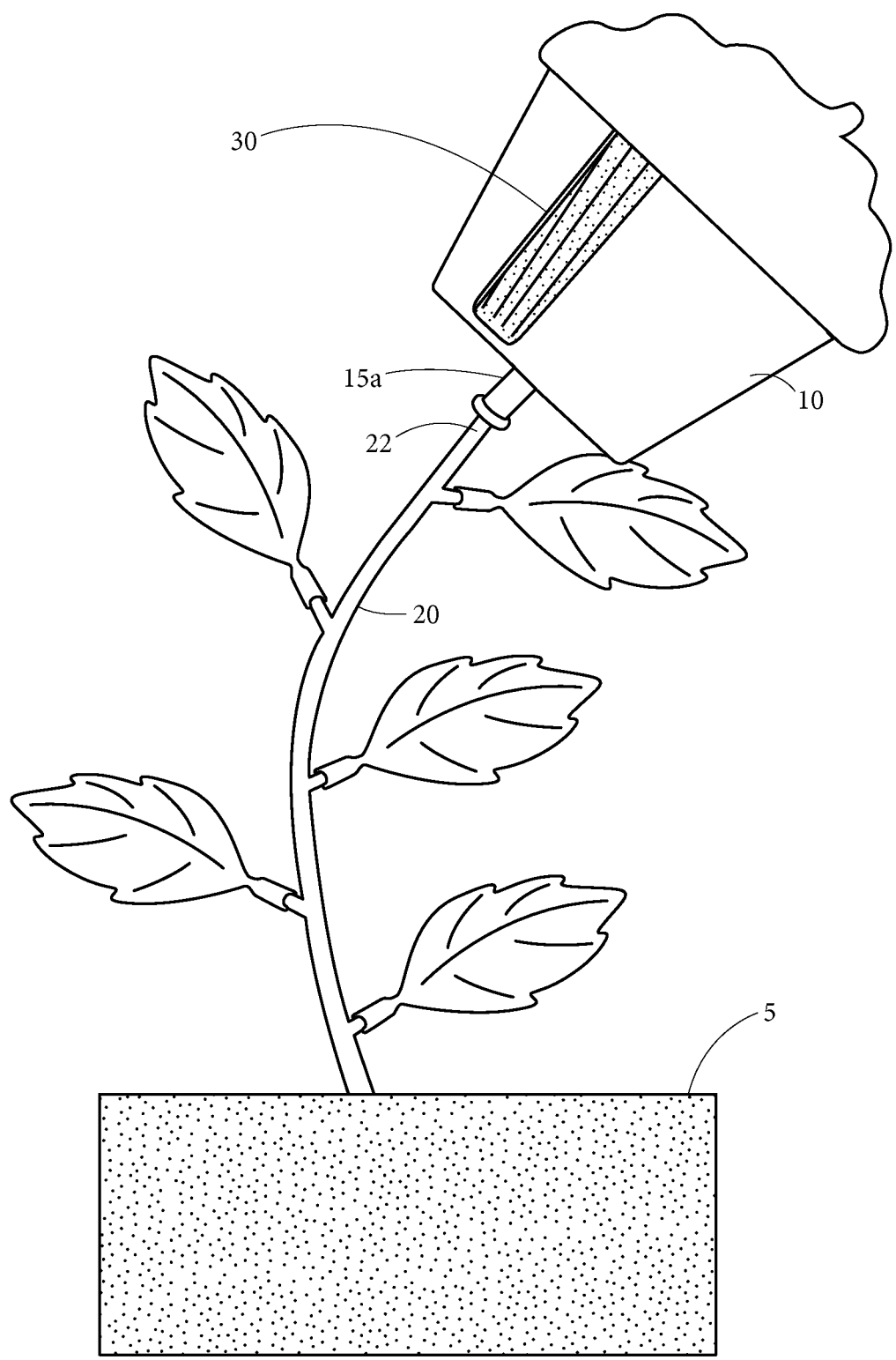
FIG. 11A is a side view that illustrates another preferred embodiment of the present invention, the holder for edibles being shown in use with the edible, and featuring the cup and connector element, where the cup sidewall also features a slit that extends downward from proximate the cup top rim. This embodiment features the rod having a configuration adapted to be flexible and enabled to support the cup at an angled position and maintain the edible in the desired position.
Figure 11B:
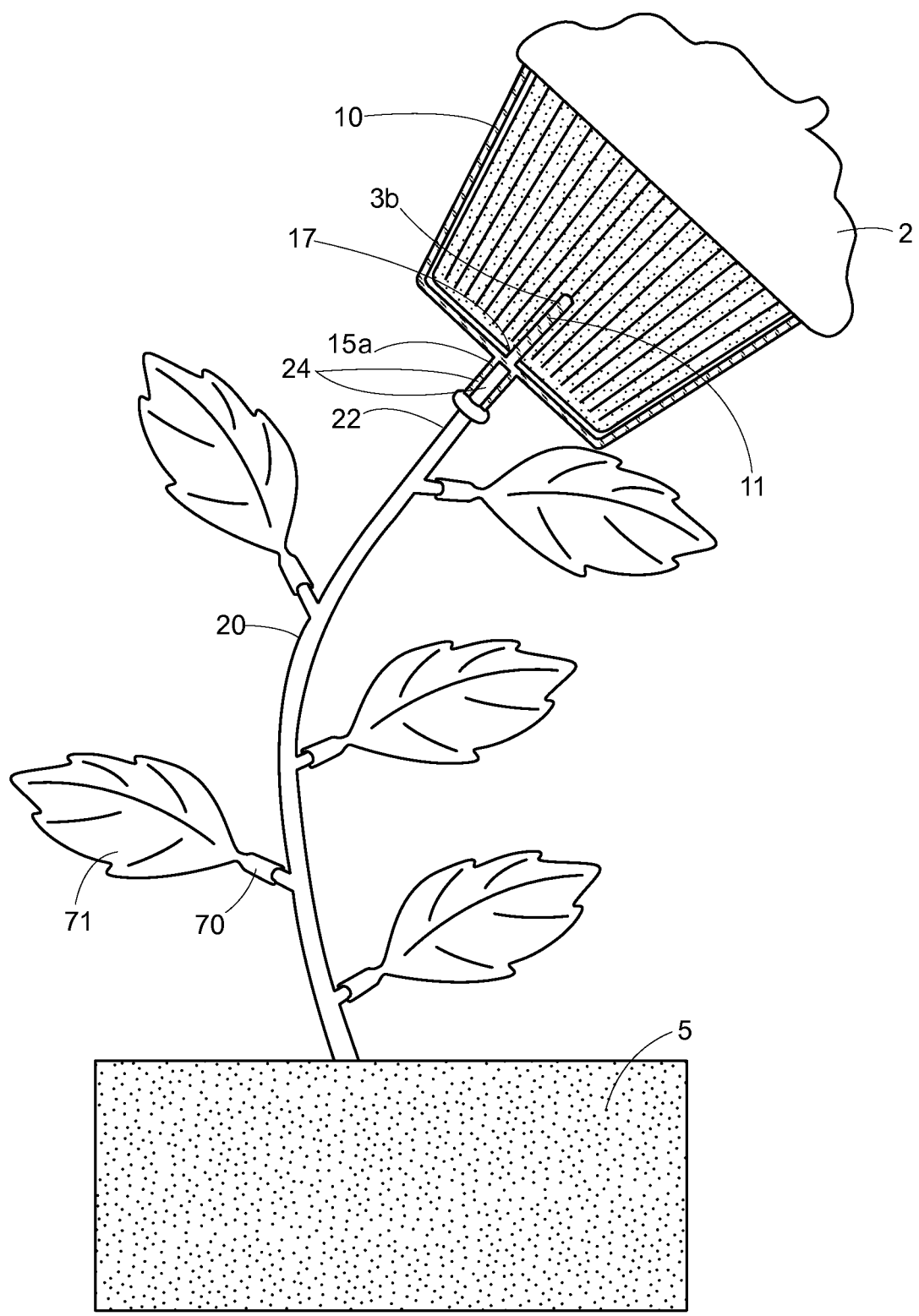
FIG. 11B is a sectional side view that illustrates another preferred embodiment of the present invention, the holder for edibles being shown in use with the edible, and featuring the cup and connector element, where the cup sidewall also features a slit that extends downward from proximate the cup top rim. This embodiment features the rod having a configuration adapted to be flexible and enabled to support the cup at an angled position and maintain the edible in the desired position.
Figure 11C:
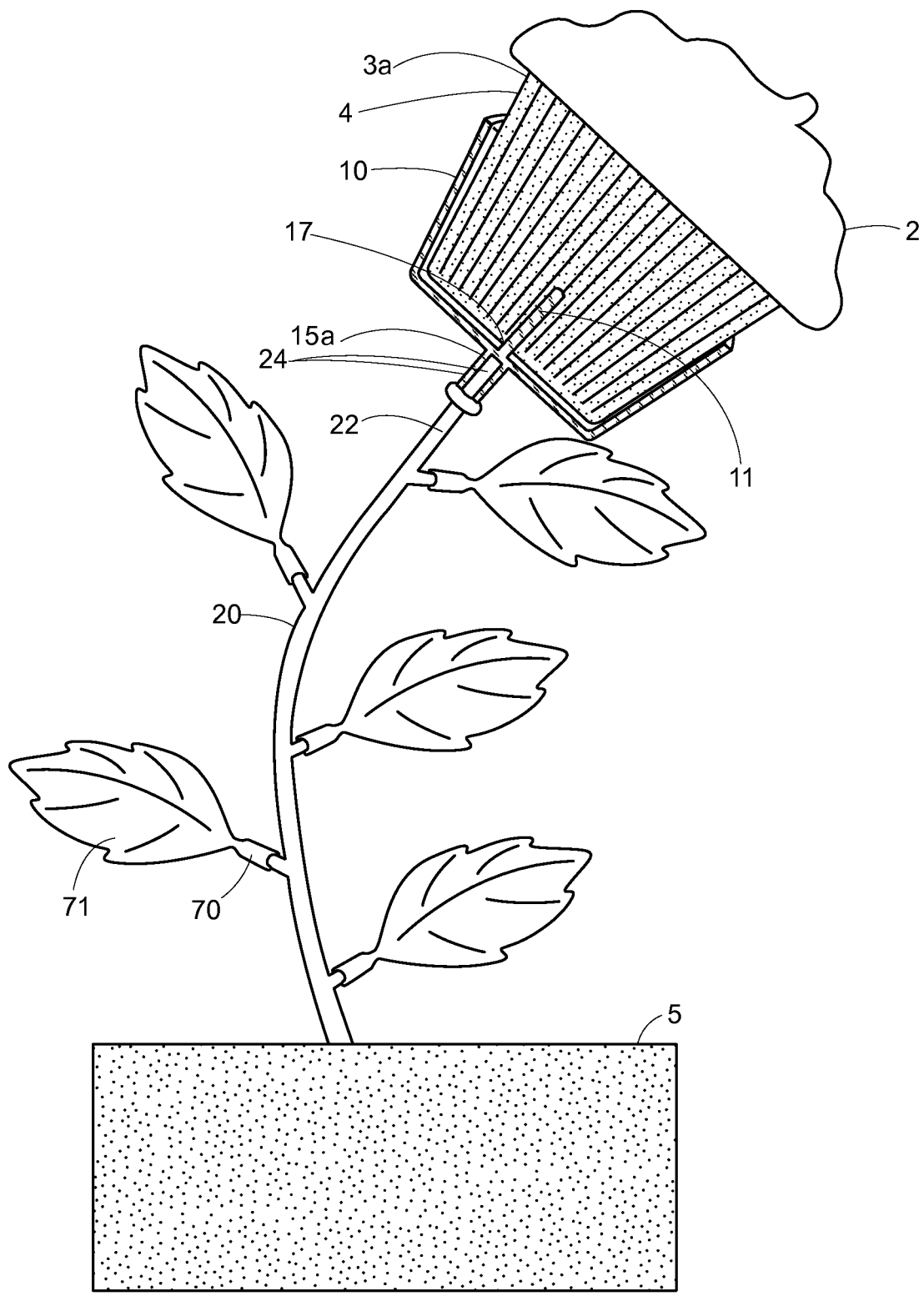
FIG. 11C is a sectional side view that illustrates another preferred embodiment of the present invention, the holder for edibles being shown in use with the edible, and featuring the cup, where the cup sidewall extends approximately one-half of the way up the edible side surface and also features a slit that extends downward from proximate the cup top rim, and connector element. This embodiment features the rod having a configuration adapted to be flexible and enabled to support the cup at an angled position and maintain the edible in the desired position.
Figure 11D:
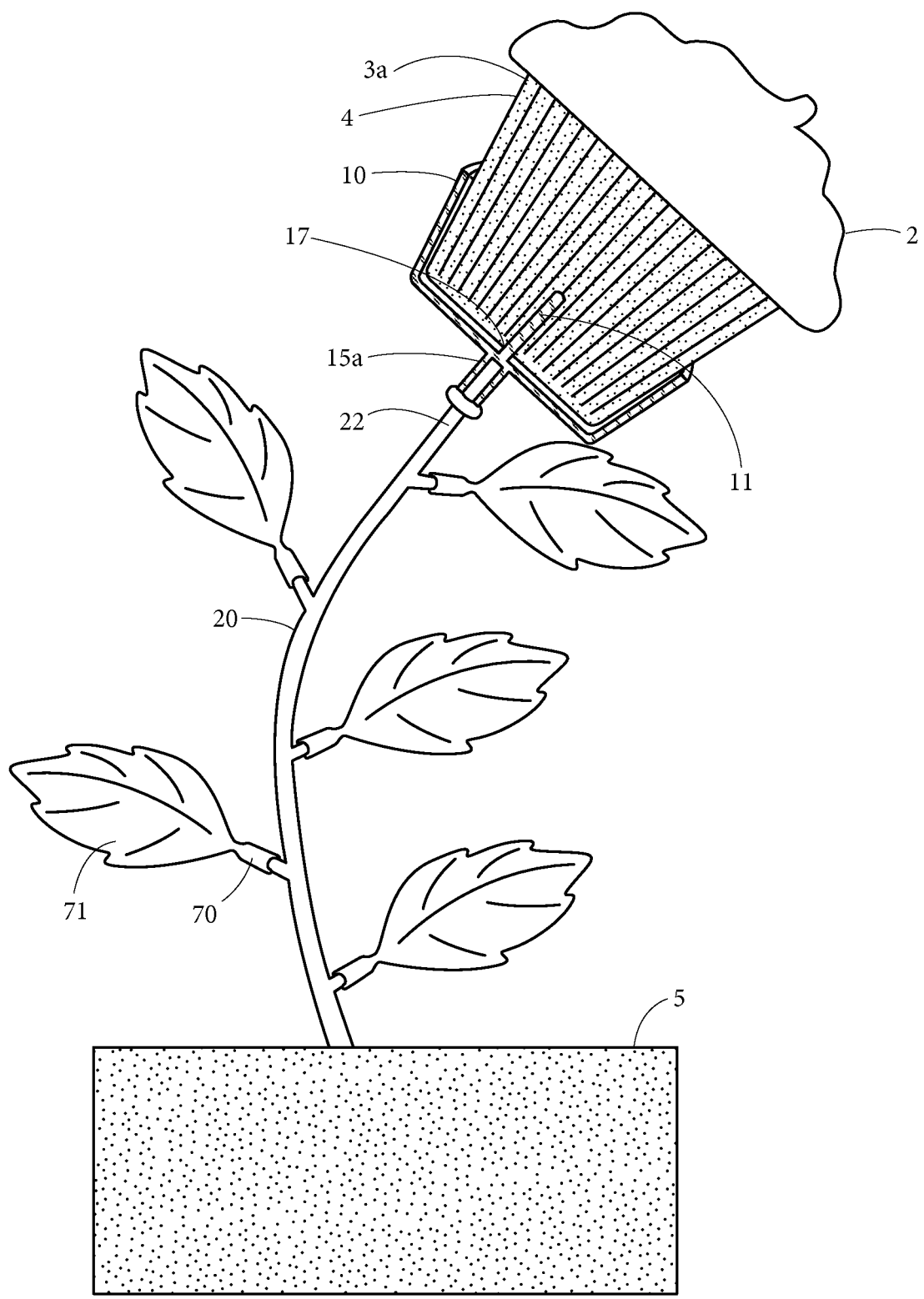
FIG. 11D is a sectional side view that illustrates another preferred embodiment of the present invention, the holder for edibles being shown in use with the edible, and featuring the cup, where the cup sidewall extends approximately one-third of the way up the edible side surface and also features a slit that extends downward from proximate the cup top rim, and connector element. This embodiment features the rod having a configuration adapted to be flexible while maintaining the edible within the cup at an angled position.

FIG. 11B features another preferred embodiment of the present invention, the cup 10 sidewall 16 proximate the cup 10 bottom surface 15 extends up the sidewall of the surface of the edible 2 as shown in FIG. 11B. Other embodiments feature the cup sidewall 16 that extends approximately half the length of the sidewall surface 4 of the edible 2, and another embodiment that features the cup sidewall 16 that extends approximately one-third the length of the sidewall surface 4 of the edible 2 respectively. See FIGS. 11C and D, respectively.

Figure 12:
FIG. 12 is a perspective view that illustrates a preferred embodiment of the present invention used in a pre-assembled edible form at an initial location, featuring a plurality of holders for edibles placed in a basket base to model a natural floral arrangement with edible holders positioned in an organic state. The holders for edibles maintain the edibles in a free flowing and natural form to mimic the curvature and positioning of real flowers. Using the present invention, an individual may assemble and set the holders and edibles in a final display form at an initial location, prior to transportation and delivery, such that the basket of edibles is delivered at the destination "as is" in final arrangement form upon arrival such that the initial appearance of the edibles is not changed during transport.

FIG. 12 depicts one example of the edible holder 1 in a pre-arranged "as is" display arrangement. This embodiment features the edible holders 1 with the edibles 2 in place. This arrangement is compiled at an initial arrangement location and may then be transported and delivered "as is" to a final destination for display or presentation. Thus, use of the edible holders 1 does not require any further assembly or substantive position upon arrival to the destination. In this embodiment, the rod 20 of the edible holder 1 is attached to a base 5 seated within a basket 5. The display features a plurality edible holders 1, such as the individual edible holders 1 featured in FIGS. 2B and 11A, and, thus, placed in a combined arrangement to model a natural floral arrangement positioned in an organic state while maintaining the edibles in free flowing and natural form to mimic the curvature and positioning of real flowers.

Figures 13A, 13B, 13C:
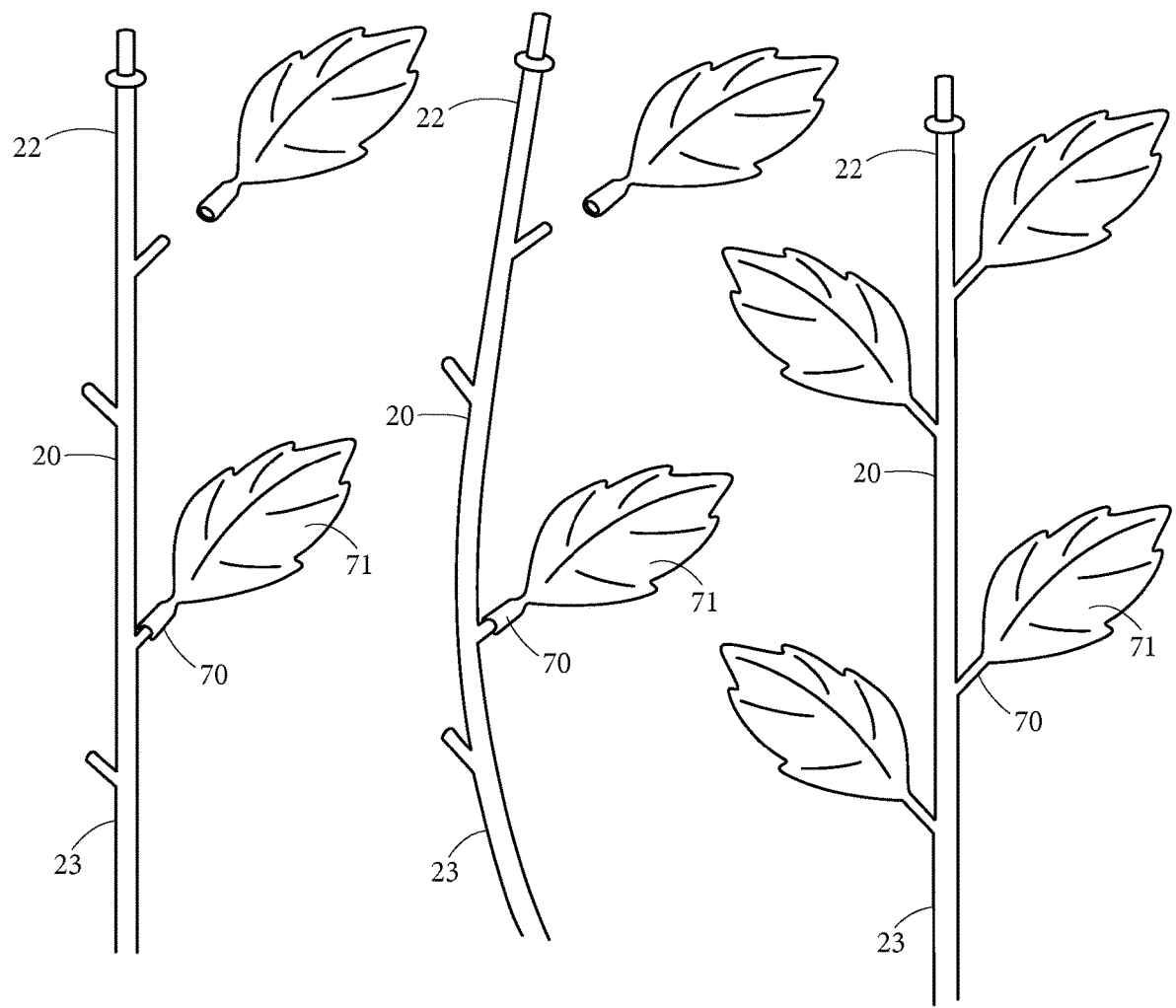
FIG. 13A is a side view that illustrates a preferred embodiment of the rod of the present invention positioned in the upright direction, and having elements to reflect a natural life-like state of the stem of a flower or other greenery when used in combination with the present invention.
FIG. 13B is a side view that illustrates a preferred embodiment of the rod of the present invention having a configuration that is further adapted to enable the rod to be flexible and support the edible cup of the present invention for transport and display of the edible. For example, in this Figure the rod is positioned and has a flexible curvature, and also features attachments for leaf elements to reflect a natural life-like state of the stem of a flower or other greenery.
FIG. 13C is a side view that illustrates a preferred embodiment of the rod of the present invention positioned and having leaf elements attached to the rod to reflect a natural life-like state of the stem of a flower or other greenery when used in combination with the present invention.

FIGS. 13A, 13B, and 13C portray various embodiments of rod 20 of the present invention 1. In certain embodiments, the rods 20 model the stems of real flowers such that an expressive and life-like floral arrangement may be displayed. The rod 20 may be vertical as seen in FIGS. 13A and 13C. In addition, one embodiment of the present invention 1 features a flexible and semi-rigid rod 20 that may be straight or positioned having a curvature. Another embodiment features the rod 20 as a permanent rigid rod in a select position, having a straight or curved configuration. See FIG. 13B. Each of the rods 20 of the present invention have a configuration adapted to enable the rod to support the cup 10 for the pre-arrangement of edibles 2 in a desired final form for transport and display of the pre-arranged edibles 2 at a final destination. These examples should not be construed as limiting. It understood by those skilled in the art that other combinations and variations fit within the scope of the present invention. However, it should be understood by one skilled in the art that the rod 20 may be of any shape so as to be consistent within the scope and purpose of the present invention. One possible embodiment of the present invention has a wire gauge of 8-14, or the like material in order to achieve the desired function for a rod 20 having a configuration adapted to enable the rod 20 to support the cup 10 for pre-arrangement of edibles 2 in a desired form for transport and final display at a select destination.

In one embodiment, the rod 20 is colored or fashioned to reflect the natural colors of floral or foliage stems so as not to detract from the visual appearance of the overall life-like display. The coloring of the rod 20 may be of any desired color and may be achieved in a variety of ways, such as permanent embodiment coloring, temporary coloring by means of removable tape, or by any comparable means. Similarly, the rod 20 may model the natural state of a flower or floral arrangement stems and thus, the rod 20 may contain additional appendages, such as leaves, which are featured in FIGS. 13A-13C. These rod attachments 70 may be affixed to rod 20 with any suitable connecting, coupling or attachment means without departing from the scope of the present invention.

Figure 14:
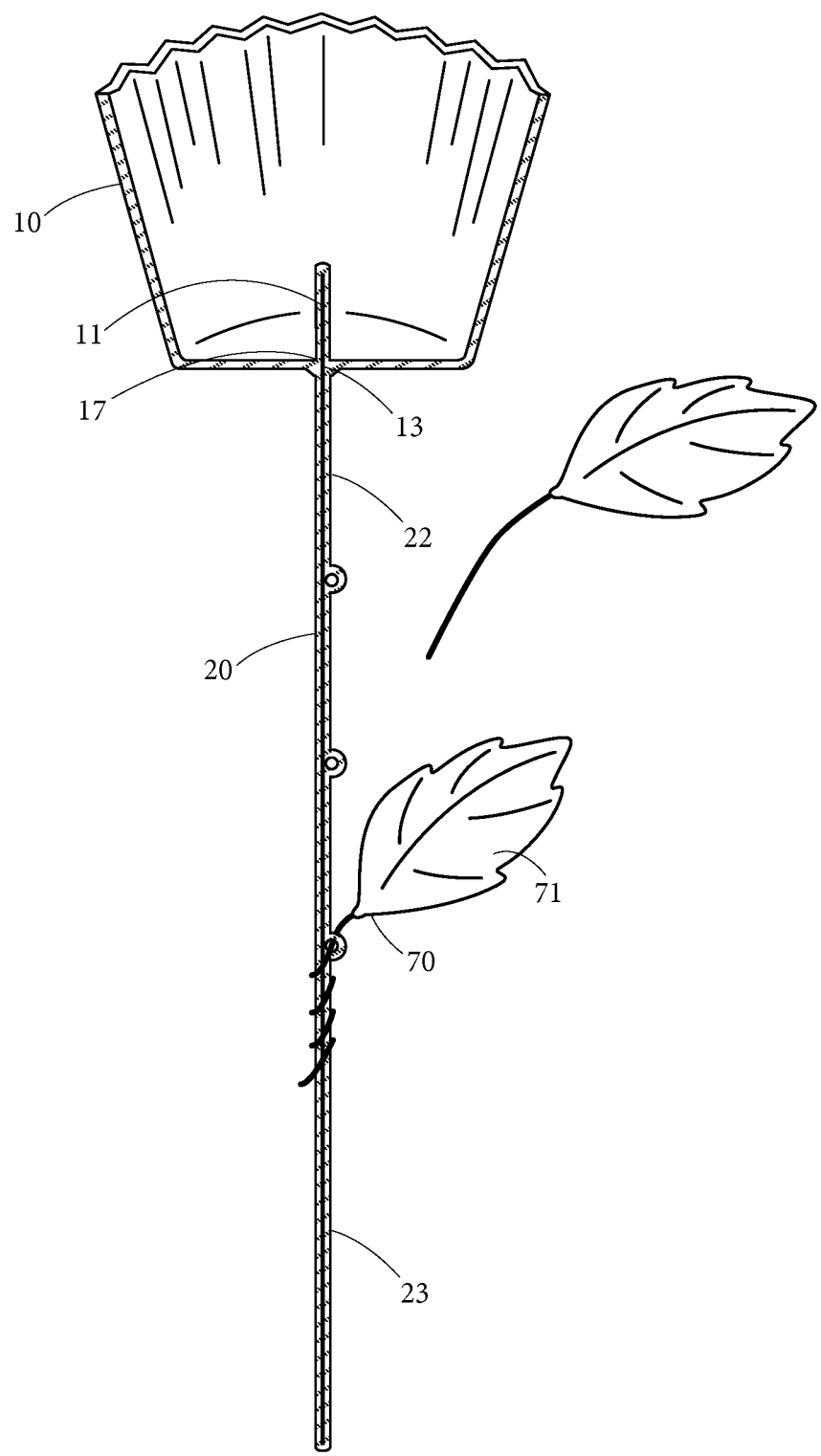
FIG. 14 is a sectional side view that illustrates a preferred embodiment of the present invention, the holder for edibles being shown prior to use without the edible in place, and featuring the cup, dowel pin, and rod. This Figure also features another preferred embodiment of the cup having a designed shape and a rod having leaf attachments to reflect a natural life-like state of the stem of a flower or other greenery when used in combination with the present invention.

For example, the leaves 71 may be of a male input-female outlet connection construction or may take the form of a continuous permanent embodiment with the rod 20. For example, FIGS. 13A and 13B show the leaf attachments having separate attachment means, whereas FIG. 13C depicts leaves of a continuous and permanent embodiment. Still further, FIG. 14 shows another embodiment of a rod 20 having a configuration adapted to receive rod attachments 70 in the form of leaves 71, which are threaded and secured to the rod 20 via a hole and loop system. Note that the rod attachments 70 may take the form of leaves 71, or any other shaped attachment and should not be construed as being limited to one form.

Figure 15:
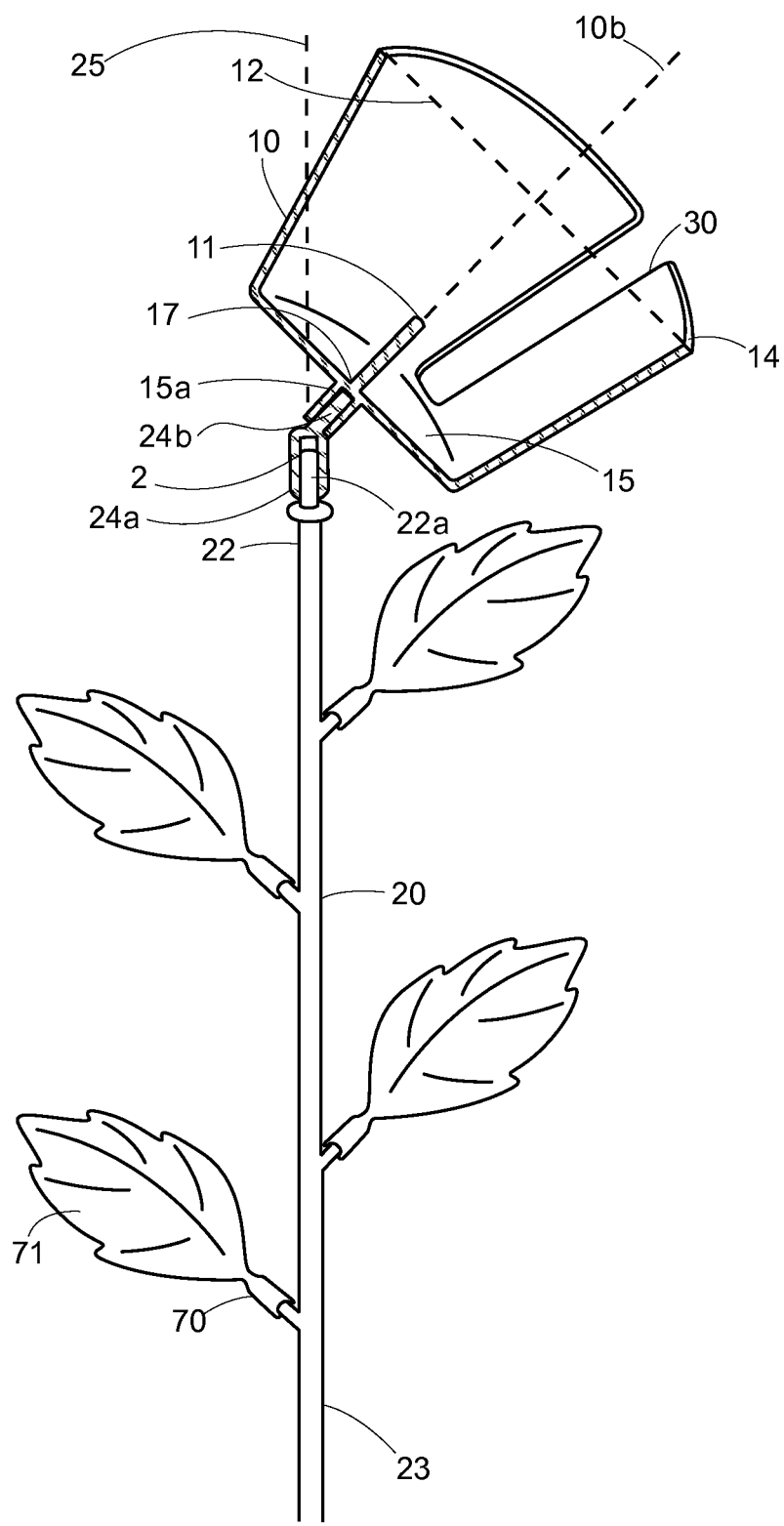
FIG. 15 is a sectional side view that illustrates another preferred embodiment of the present invention, the holder for edibles being shown prior to use without the edible in place, and featuring the cup, dowel pin, and cup-rod connector element, where the cup sidewall also features a slit that extends downward from proximate the cup top rim. This embodiment of the connector allows the user to position the cup to a desired angle while maintaining the edible angled in such position. In one embodiment, the rod is positioned in the upright direction as seen here.

In addition, FIG. 15 relies on the construction details provided in earlier figures, but further demonstrates another embodiment of the present invention. As shown in FIG. 15, another embodiment of the present invention is an edible holder 1 having a configuration such that the cup 10 is angled in order to position the edible 2 in a desired arrangement. This embodiment has a configuration wherein the rod 20 has a rod centerline 25 that extends between the rod top end 22 and bottom end 23, and the edible holder 1 further comprises a connector 24 that affixes the rod top end 22 and the cup bottom surface 15. In addition, the invention has a configuration adapted to allow the cup 10 to be oriented with respect to the rod 20 at a pre-formed or variable angle so that the cup centerline 10b intersects with the rod centerline 25 at an angle that is within a desired range of intersection angles. One embodiment features the present invention having a pre-formed or variable angle via a connector element 24. See FIGS. 15-18F.

Whereas FIG. 15 shows the construction details of the edible holder 1 prior to use without an edible 2 in place, FIGS. 16A-D further show the edible holder 1 in use, with the edible 2 seated within the cup 10 and positioned at a desired angle via the cup-rod connector 24 in order to form a desired shape or appearance. With the angled positioning, the edible holder 1 is able to maintain the edible 2 in the desired appearance. The rod 20 supports the cup 10 containing the edible 2 when the centerline 25 of the rod 20 and the centerline 10b of the cup 10 intersect. The angle may be in a range of 0-90 degrees. The rod 20 has a configuration adapted to enable the rod 20 to support the cup 10, and, thereby edible 2, prior to and during transport in a pre-arranged desired form and ready for final display without additional assembly at the arrival destination.

Figure 16A:
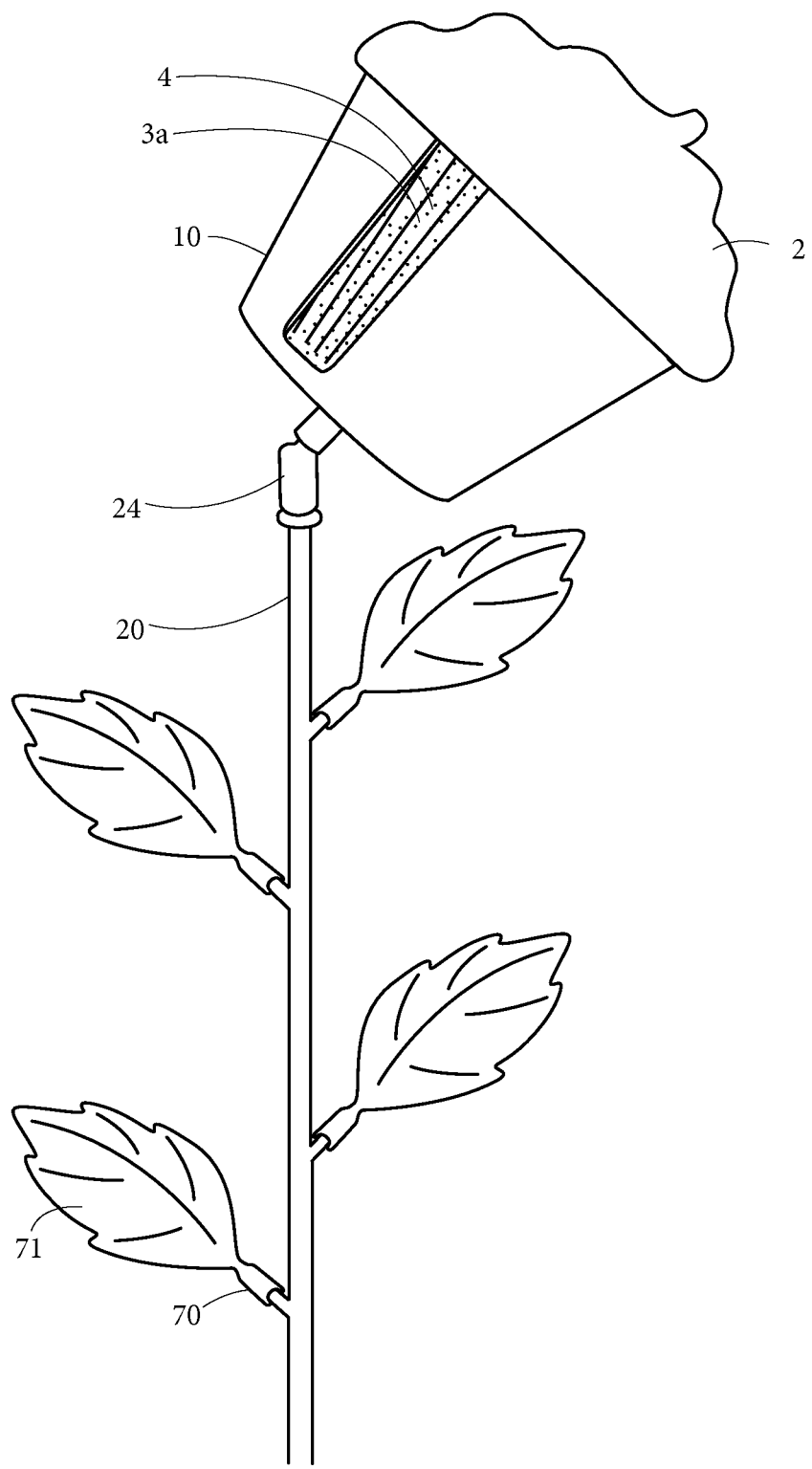
FIG. 16A is a side view that illustrates another preferred embodiment of the present invention, the holder for edibles being shown in use with the edible, and featuring the cup and cup-rod connector element, where the cup sidewall also features a slit that extends downward from proximate the cup top rim. This embodiment of the connector allows the user to position the cup to a desired angle while maintaining the edible angled in such position. In one embodiment, the rod is positioned in the upright as seen here.
Figure 16B:
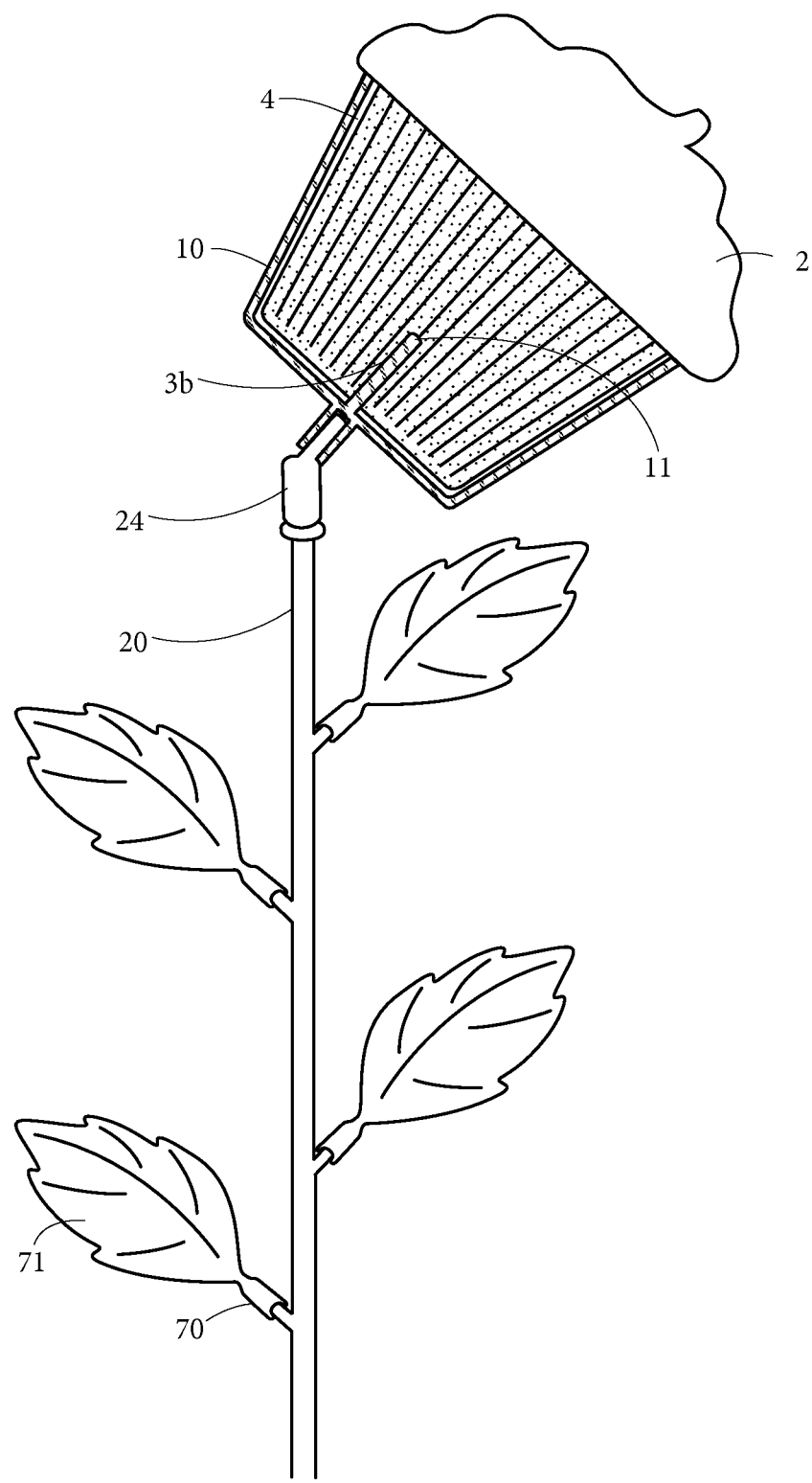
FIG. 16B is a sectional side view that illustrates another preferred embodiment of the present invention, the holder for edibles being shown in use with the edible, and featuring the cup and cup-rod connector element, where the cup sidewall also features a slit that extends downward from proximate the cup top rim. This embodiment of the connector allows the user to position the cup to a desired angle while maintaining the edible angled in such position. In one embodiment, the rod is positioned in the upright direction as seen here.
Figure 16C:
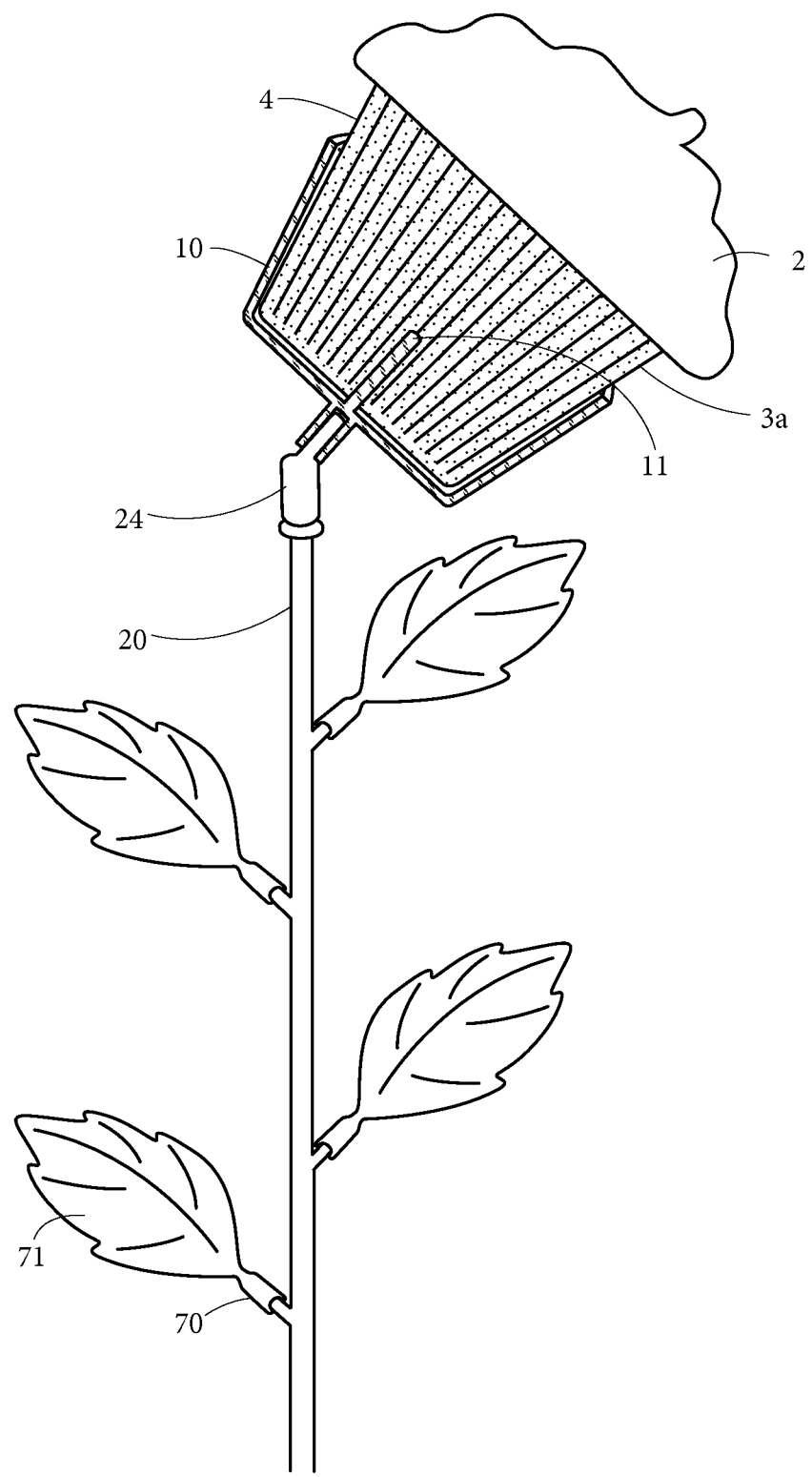
FIG. 16C is a sectional side view that illustrates another preferred embodiment of the present invention, the holder for edibles being shown in use with the edible, and featuring the cup and cup-rod connector element, where the cup sidewall also features a slit that extends downward from proximate the cup top rim. This embodiment of the connector allows the user to position the cup to a desired angle while maintaining the edible angled in such position. In one embodiment, the rod is positioned in the upright direction as seen here.
Figure 16D:
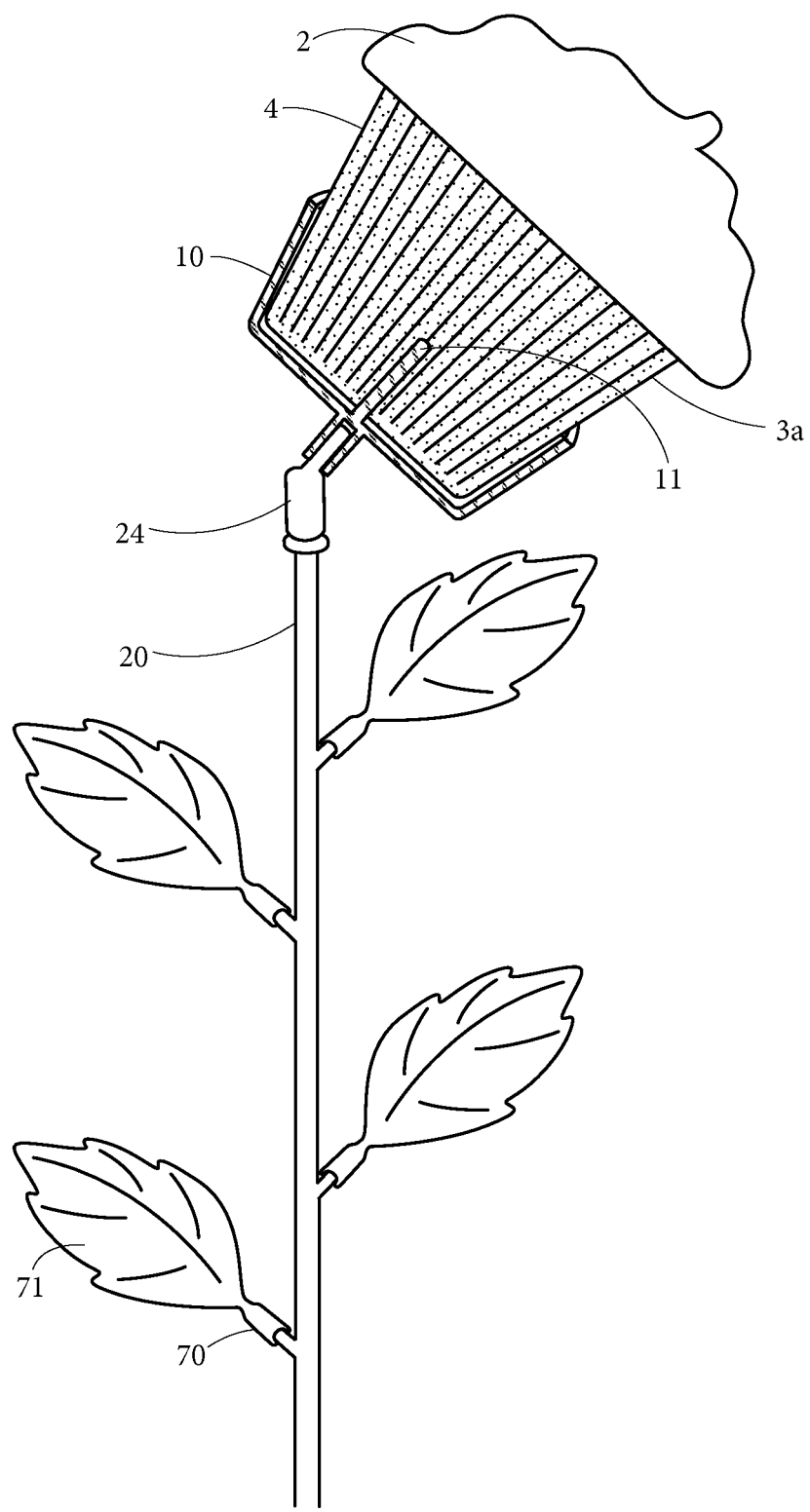
FIG. 16D is a sectional side view that illustrates another preferred embodiment of the present invention, the holder for edibles being shown in use with the edible, and featuring the cup and cup-rod connector element, where the cup sidewall also features a slit that extends downward from proximate the cup top rim. This embodiment of the connector allows the user to position the cup to a desired angle while maintaining the edible in such position. In one embodiment, the rod is positioned in the upright direction as seen here.

As shown in FIGS. 16A-D, the edible 2 is supported by the rod 20, dowel pin 11, cup 10, and cup sidewall 16, and like FIGS. 2A-3D, various constructions of the cup sidewall 16 are demonstrated. See in FIGS. 16A-D. In FIGS. 16A-B, the cup sidewall 16 proximate the cup bottom surface 15 extends the full length of the edible sidewall 4. In another embodiment, the sidewall 16 extends approximately half the length of the sidewall surface 4 of the edible 2. See FIG. 16C. In still another embodiment the cup sidewall 16 extends approximately one-third of the length of the sidewall surface 4 of the edible 2 respectively. See FIG. 16D.

FIGS. 15-18A-F provide more construction details of possible embodiments of the rod connector 24. In one embodiment, the cup-rod connector 24 is a permanent fixture between the cup and the rod 20, while in another preferred embodiment the cup-rod connector 24 may be of the temporary-releasable type where the cup 10 and rod 20 are temporarily joined or removeably mounted. FIGS. 17A-D.

Figure 17A:
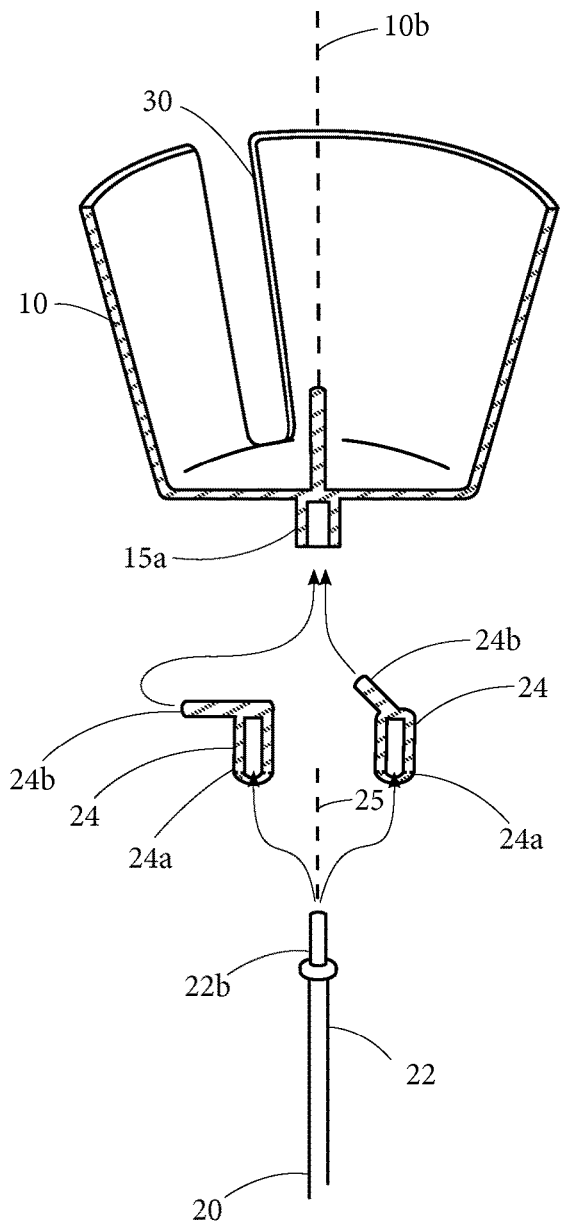
FIG. 17A is a side view that illustrates another preferred embodiment of the present invention, the holder for edibles being shown prior to use without the edible in place, and featuring the cup, dowel pin and cup-rod connector element, where the cup sidewall also features a slit that extends downward from proximate the cup top rim. This cup-rod connector embodiment features a separate cup-rod connector piece having a male end and female outlet. In this embodiment, the rod features a male top end and is to be connected with the female outlet of the connector piece. The male end of the connector piece is to be received by the female outlet connector on the cup. The cup-rod connector element may be configured at a variety of angles. This embodiment features a cup-rod connector element to position the cup at a 45-degree angle from the rod to feature the edible at that same angle while the rod may be positioned at a multitude of angles. In another possible embodiment, the cup-rod connector element could position the cup in a 90-degree angle to feature the cup in an upright position while the rod may be laid on a horizontal plane.
Figure 17B:
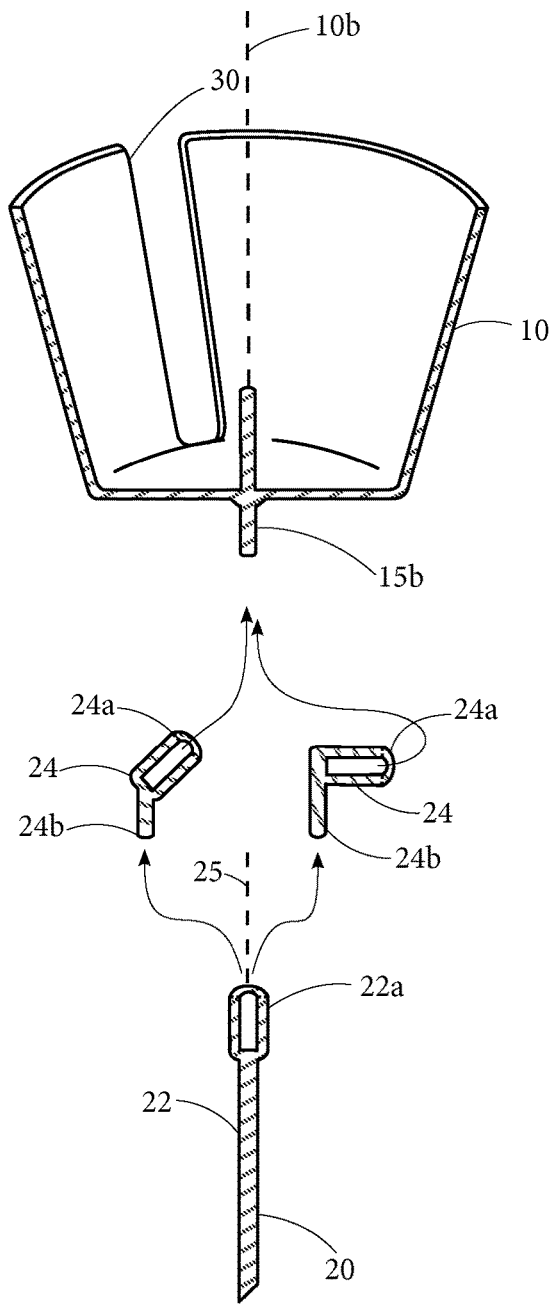
FIG. 17B is a side view that illustrates another preferred embodiment of the present invention, the holder for edibles being shown prior to use without the edible in place, and featuring the cup, dowel pin and cup-rod connector element, where the cup sidewall also features a slit that extends downward from proximate the cup top rim. This cup-rod connector embodiment features a separate cup-rod connector piece having a male end and female outlet. In this embodiment, the rod features a female top end has a configuration to be connected with the male outlet of the connector piece. The female outlet of the cup-rod connector piece has a configuration to receive the male end connector on the cup. This embodiment features a cup-rod connector element to position the cup in a 90-degree angle from the intersection of the cup and rod centerlines and features the cup in an upright position while the rod may be laid on a horizontal plane; and also depicts a cup-rod connector element to position the cup at a 45-degree angle from the intersection of the cup and rod centerlines and features the cup and edible at that same angle while the rod may be positioned at a multitude of angles.
Figures 17C, 17D:
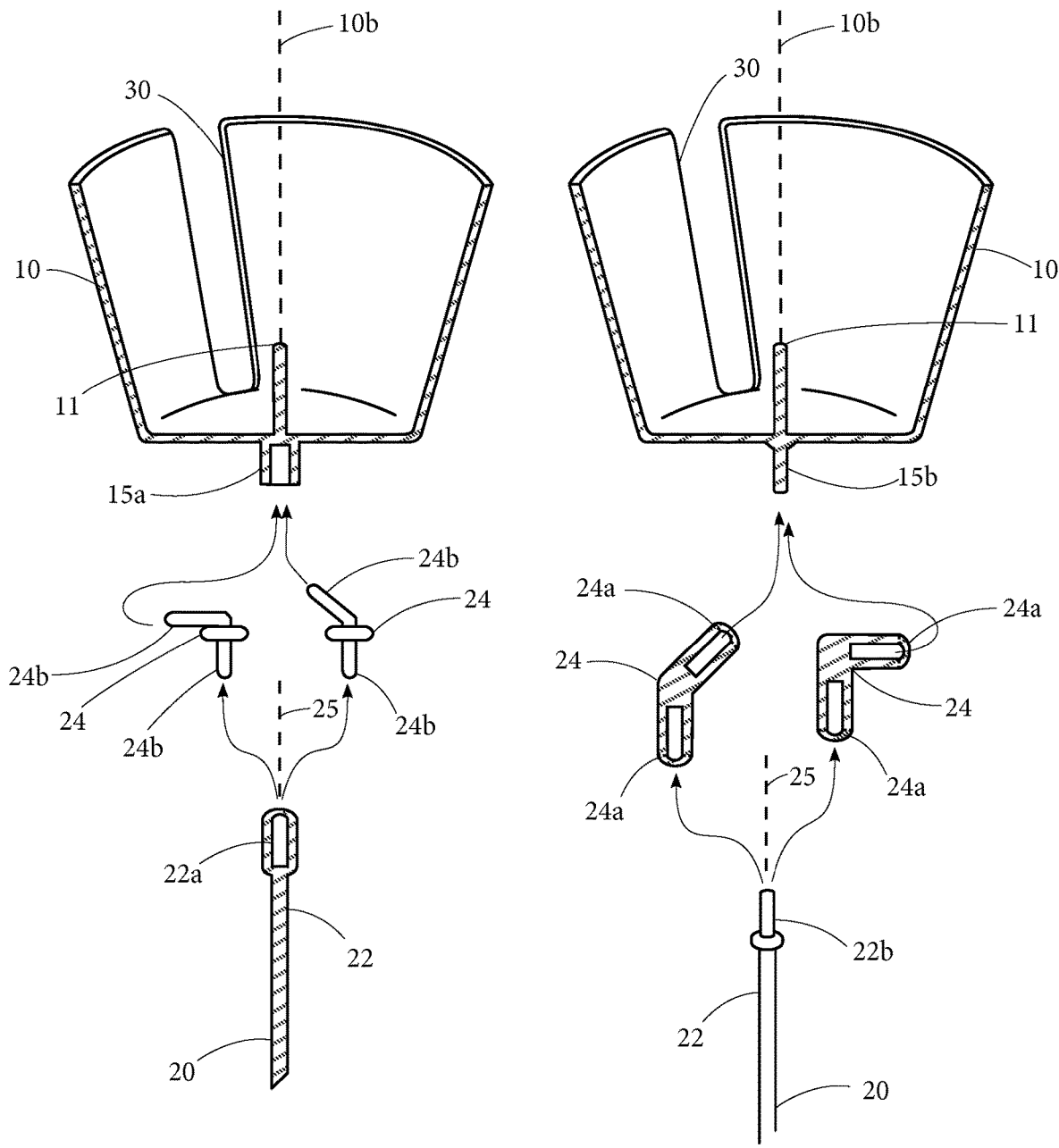
FIG. 17C is a perspective, side view that illustrates another preferred embodiment of the present invention, the edible holder being shown prior to use without the edible in place, and featuring the cup, dowel pin and cup-rod connector element, where the cup sidewall also features a slit that extends downward from proximate the cup top rim. This cup-rod connector embodiment features a separate cup-rod connector piece having dual male ends. In this embodiment, the rod features a female outlet and has a configuration to be connected with the male end of the connector piece. The second male end of the cup-rod connector piece has a configuration to be received by the female outlet connector on the cup. This embodiment features a cup-rod connector element to position the cup in a 90-degree angle from the intersection of the cup and rod centerlines and features the cup in an upright position while the rod may be laid in a horizontal plane; and also depicts cup-rod connector element to position the cup at a 45-degree angle from the intersection of the cup and rod centerlines and features the cup and edible at that same angle while the rod may be positioned at a multitude of angles.
FIG. 17D is a perspective, side view that illustrates another preferred embodiment of the present invention, the holder for edibles being shown prior to use without the edible, and featuring the cup, dowel pin and cup-rod connector element, where the cup sidewall also features a slit that extends downward from proximate the cup top rim. This cup-rod connector embodiment features a separate cup-rod connector piece having dual female outlets. In this embodiment, the rod features a male top end and is to be connected with the female outlet of the cup-rod connector piece. The second female outlet of the cup-rod connector piece is to be used in connection with the male end cup-rod connector on the cup. This embodiment features a cup-rod connector element to position the cup in a 90-degree angle from the intersection of the cup and rod centerlines and features the cup in an upright position while the rod may be laid in a horizontal plane; and also depicts cup-rod connector element to position the cup at a 45-degree angle from the intersection of the cup and rod centerlines and features the cup and edible at that same angle while the rod may be positioned at a multitude of angles.

FIGS. 15, and 17A-B demonstrate the rod connector 24 comprising a male part and a female outlet in order for the rod 20 to contact the cup 10. Continuing with FIGS. 17A-D, here these figures detail the construction and configuration of a separate cup-rod connector 24 piece used in the present invention. The rod 20 features a male top end 22b to be connected with the female outlet 24a of the connector piece 24. The male end 24b of the connector piece 24 is to be received by the female outlet connector collar 15a of the cup 10. See FIGS. 17A-B. The cup-rod connector 24 may also be comprised of two male ends as shown in FIG. 17C and used to contact the female outlet 22a of the rod 20 and female outlet of cup 15a. Similarly, the cup-rod connector may also be comprised of two female ends 24a as shown in FIG. 17D and used to contact the male outlet 22b of the rod 20 and male outlet of cup 15b. Examples of cup-rod connectors 24 in the 45-degree and 90-degree positions may be seen in FIGS. 17A-D.

Figure 18A:
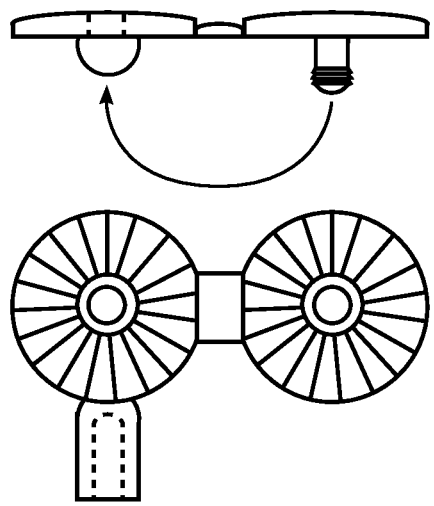
FIG. 18A is a perspective top view and open side view that illustrates another preferred embodiment of the cup-rod connector element of the present invention. This embodiment of the cup-rod connector element allows the user to adjust the positioning of the cup and edible to a variety of angles. The cup-rod connector element may feature a combination of male end and female outlets to connect the adjustable element to the cup and rod.
Figure 18B:
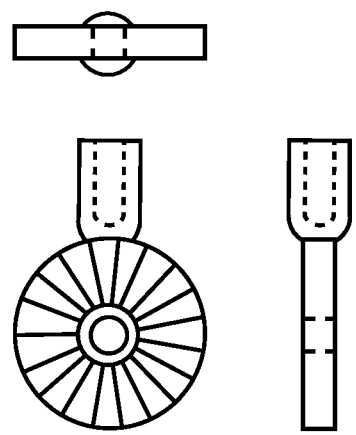
FIG. 18B is a perspective top view and side view that illustrates another preferred embodiment of the angle adjuster and cup-rod connector element of the present invention. This embodiment of the connector element in combination with the angle adjuster allows the user to adjust the positioning of the cup and edible to a variety of angles. The connector element may feature a combination of male end and female outlets to connect the adjustable element to the cup and rod.
Figure 18C:
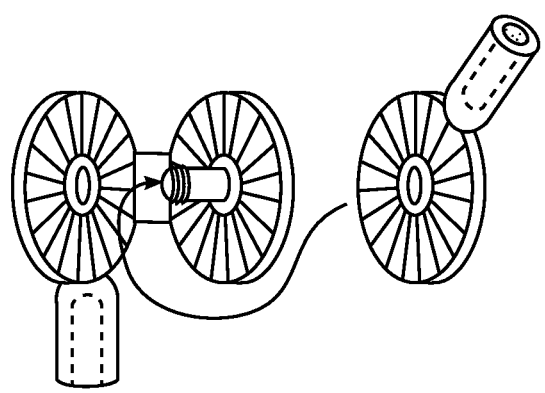
FIG. 18C is an elevational view that illustrates another preferred embodiment of the cup-rod connector element of the present invention. This embodiment of the cup-rod connector element allows the user to adjust the positioning of the cup and edible to a variety of angles via a separate adjustable cup-rod connector piece. The cup-rod connector element may feature a combination of male end and female outlets to connect the adjustable element to the cup and rod. In this embodiment, the angle adjuster is being inserted into the cup-rod connector element prior to rotating and angle positioning. This embodiment features two female outlets on the cup-rod connector element and angle adjuster.
Figure 18D:
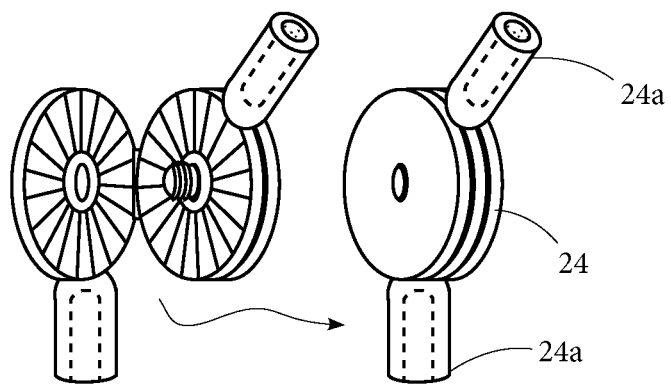
FIG. 18D is an elevational view that illustrates another preferred embodiment of the cup-rod connector element of the present invention. This embodiment of the cup-rod connector element being able to adjust angles and allowing the user to adjust the positioning of the cup and edible to a variety of angles via a separate adjustable cup-rod connector piece. The cup-rod connector element may feature a combination of male end and female outlets to connect the adjustable element to the cup and rod. In this embodiment, the cup-rod connector element is able to rotate and position the cup to a desired angle. This embodiment features two female outlets on the cup-rod connector element.
Figures 18E, 18F:
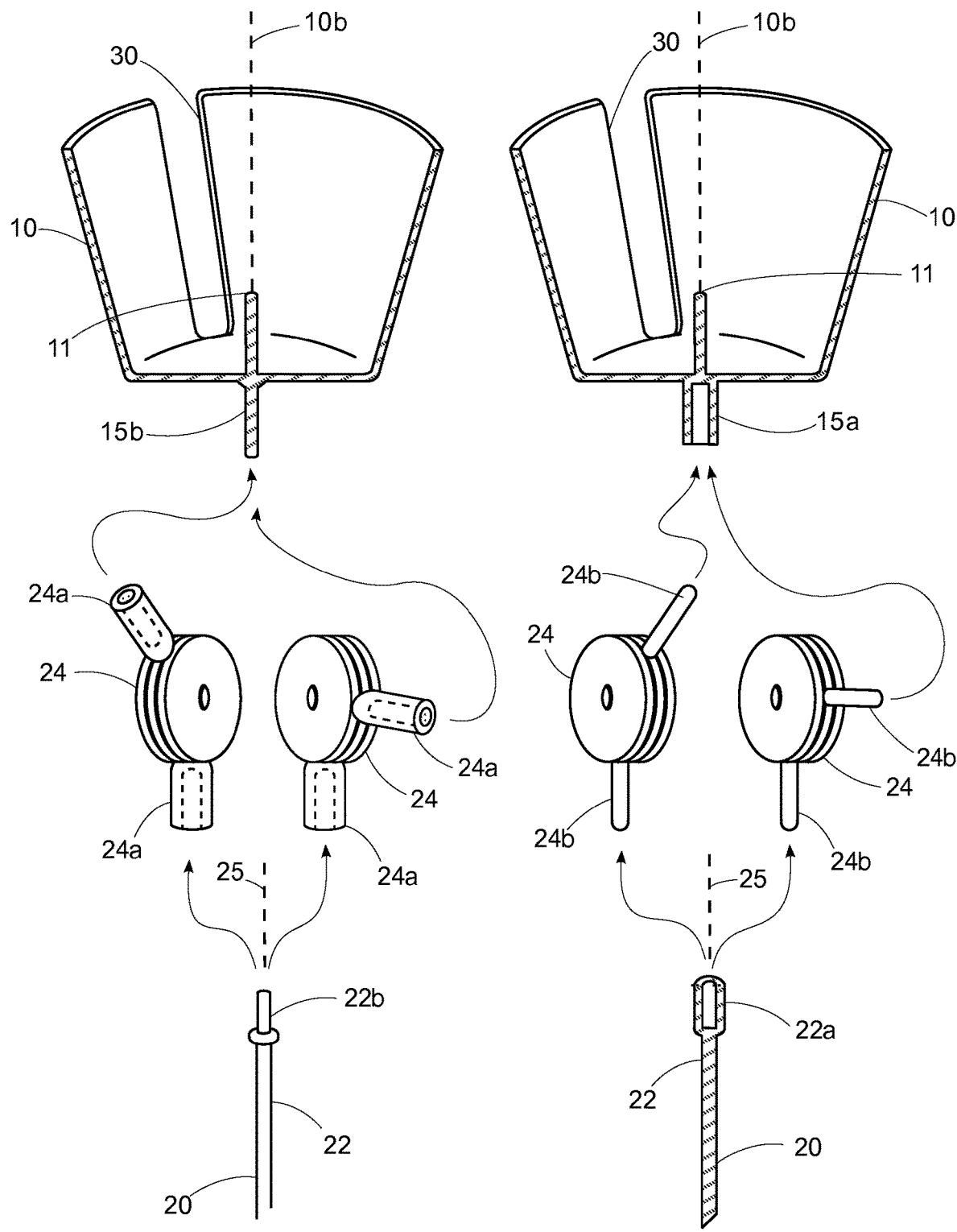
FIG. 18E is an elevational view that illustrates another preferred embodiment of the present invention, the holder for edibles being shown prior to use without the edible in place, and featuring the cup, dowel pin and cup-rod connector element, where the cup sidewall also features a slit that extends downward from proximate the cup top rim. This cup-rod connector embodiment features a separate adjustable cup-rod connector piece having a male end and female outlet. In this embodiment, two female outlets are to be connected with the male ends of the cup and rod. This embodiment of the cup-rod connector allows the user to adjust the positioning of the cup and edible to a variety of angles. The cup-rod connector elements in this embodiment are featured as having approximately a 90-degree angle and a version having approximately a 45-degree angle.
FIG. 18F is a perspective view that illustrates another preferred embodiment of the present invention, the holder for edibles being shown prior to use without the edible, and featuring the cup, dowel pin and cup-rod connector element, where the cup sidewall also features a slit that extends downward from proximate the cup top rim. This cup-rod connector embodiment features a separate adjustable cup-rod connector piece having two male ends. In this embodiment, two male ends are to be connected with the female outlets of the cup and rod. This embodiment of the cup-rod connector allows the user to adjust the positioning of the cup and edible to a variety of angles. The cup-rod connector elements in this embodiment are featured as having approximately a 90-degree angle and a version having approximately a 45-degree angle.

FIGS. 18A-18D depict another embodiment of the cup-rod connector 24 being a separate connection piece and joining the cup 10 and rod 20 such that the cup-rod connector 24 has a configuration adapted to allow the cup 10 to be temporarily and variably oriented with respect to the rod 20 so that the cup centerline 10b intersects the rod centerline 25 at an angle that is within a desired range of intersection angles. Thus, the angle between the cup 10 and rod 20 may be adjusted with the connector element 24. In FIG. 18E, the cup-rod connector 24 features a separate connector piece having two female outlets 24a that will connect to a male end 15b on the cup 10 and rod 20. In addition, this particular embodiment features a connector element 24 that may be configured at a variety of adjustable angles, so that the cup 10, to which the connector 24 attaches, may be rotated or adjusted from 0 degrees to 90 degrees. Thus, the positioned and tilted cup 10, thereby positions the seated edible 2 to take on a specified shape and desired appearance, resembling a more organic looking arrangement. For example, this embodiment features a cup-rod connector element 24 to position the cup 10 at a 45-degree angle from the rod 20 to feature the edible 2 at that same angle while the rod 20 may be positioned at a multitude of angles; and the connector element 24 to position the cup 10 in a 90-degree angle to feature the cup 10 in an upright position while the rod 20 may be laid on a horizontal plane. This rotatable embodiment allows the cup 10 to be positioned to a multitude of angles.

Continuing to FIGS. 18E and 18F, these figures depict additional embodiments of the cup-rod connector 24 and demonstrate the intersection and connection between the connector 24 and the cup 10 and rod 20. This assembly between the cup 10 and rod 20 is generally formed prior to inserting the edible 2 into the cup 10. In FIG. 18E, the cup-rod connecter 24 has two female outlets 24a, each of which connected to the male ends 15b, 24b of the cup 10 and rod 20 respectively. FIG. 18F further demonstrates another version of the cup-rod connector 24 having two male ends each of which connect to the female outlets of the cup 10 and rod 20. Thus, with this embodiment of the invention, an individual may place an edible 2 inside of the cup 10, and adjust the cup 10 to the desired position in order for the edible 2 to resemble a life-like organic form, such as a bouquet or vase of flowers in a pre-assembled arrangement for transportation and display. Likewise, the individuals may position the cup 10 first, and then insert the edible 2.

Note, that these particular figures and embodiments are not meant to be limiting or exhaustive in design. Other combinations may include a cup-rod connector 24 having one male end and one female outlet, and variations that may also fall within the scope of the invention without being limiting. Other embodiments of the cup-rod connector 24 may also be utilized with out departing from the scope of the present invention. For example, the rod connector 24 may be affixed to both the cup 10 and the rod 20 either with or without a separate connector element. In another embodiment, the edible holder 1 features a cup-rod connector 24 such that the cup 10 comprises collar 15a for the rod 20 to connect to the bottom surface of the cup 10. Thus, the rod 20 is inserted into the rod collar 15a to form the cup-rod connector 24 without a separate cup-connector piece. See FIGS. 15-21.

In one embodiment, the cup 10 has a defined height comprising the vertical distance between the cup bottom surface 15 perimeter and the cup open top 10a. The height may comprise a certain surface area that enables the cup sidewall 16 to support the edible 2 when the edible holder 1 is in use. In certain embodiments, the ratio of the height of the cup sidewall 16 in relationship to the edible sidewall 4 or outer surface 3a may be in the range of 1:1, 1:2, or 1:3. The cup sidewall 16 extends the side of the edible 2 at a location above the cup bottom surface 15 perimeter. It should be understood that the cup sidewall 16 could be otherwise configured, sized and formed for contacting more or less of the edible 2 so long as the cup sidewall 16 supports the edible 2 for pre-assembly into a specified shape having a desired initial appearance at an initial location, and then the transport of the pre-assembled edible 2 to a final destination in such a manner that the initial appearance of the edible 2 is not changed during the transport.

It also should be understood that the cup-rod connector 24 could be provided with any suitable connecting, coupling or attachment means without departing from the scope of the present invention, for attaching the cup 10 and rod 20. For example, in one embodiment the cup-rod connector 24 connects the cup 10 and rod 20 by a connecting means of the releasable type or of the permanent type without departing from the scope of the invention. In another embodiment, the cup-rod connector 24 is easily adhered to adjoin the cup 10 and rod 20, or could be glued, fused, used in combination with another element, or affixed by other means. Still another embodiment of the present invention features a cup-rod connector 24 as one continuous device and the cup-rod connector 24 is affixed to the cup 10 or rod 20, or both by way of permanent embodiment.

There are many suitable materials from which the present invention can be fabricated and all are considered to come within the scope of the present invention. A major consideration in the selection of such a material is the requirement that it be able to have a configuration adapted to sufficiently enable the rod 20 to support the cup 10 for a pre-arrangement of edibles in a desired final form for transportation and display at a final destination. In order for this to occur, the rod 20 must be able to withstand the weight of an edible 2 at a desired elevation above the base 5. In one embodiment, the rod 20 must be able to be flexible and semi-rigid and having a configuration to withstand the weight of the edible 2 at a desired elevation above the base 5. In another embodiment, the rod 20 must be able to be positioned with the cup 10 in an organic and free flowing form so as to model a life-like arrangement. Experimentation has shown that for one embodiment a material with a wire gauge in the range of 8-14 is sufficient for this task, with preferred materials having a gauge of 8-9.

For example, many types of high quality, wire material, wood, steel, aluminum, plastic, rubber, PVC, molded polymer, pre-formed material, or any like material, have been found to be suitable from which to fabricate the rod 20 of the present invention. The rod 20 may also be coated with plastic resin or other smoothing or coating materials. It should be appreciated by those skilled in the art that any similar material may also be used to fabricate the rod 20.

It was further found that by utilizing a material with such a wire gauge in the range of approximately 8-14, which was kept as small as possible so as to not detract from the appearance of the edible holder 1 and overall presentation of the edible, the rod 20 could effectively distribute the forces being imposed by the cup 10 and edible 2 in order to have a configuration adapted to enable said rod 20 to support the cup 10 and edible 2 for desired pre-arrangement, transport and final display of the edible 2. In addition, in one embodiment, the edible holder 1 has a configuration further adapted to enable the rod 20 to be flexible and support the cup 10 and edible 2 in carrying out the scope and objective of this invention.

Other embodiments may also be configured to fall within the scope of the present invention. The fabrication materials and configuration yield multi-purpose edible holders 1 that are easily used and manufactured, and will provide aesthetically pleasing novelty edible arrangements, relatively trouble-free in operation.

Experimentation was conducted to determine the optimal size and positioning of the cup 10, dowel pin 11, and rod 20 and cup sidewall 16, slit 30, moveable plate 40, finger 50, and decorative collar attachment 60. These actions provided for an adequate configuration and functionality to create a natural looking and free flowing arrangement where an edible 2 is supported and maintained in the pre-assembled form during transport of the pre-assembled edible 2 to a final destination in such a manner that the initial appearance of the edible 2 is not changed during transport.

In one preferred embodiment, the cup 10 is fabricated such that the cup 10 is substantially circular and cylindrical in shape and the cup 10 would have dimensions that vary according to the size of the edible 2.

In certain preferred embodiments of the edible holder 1, the dimension ranges are as follows:

The cup sidewall 16 height ranges from 0.5 in. to 2 in, and the cup diameter 12 ranges from 1.5 in. to 2.75 in. depending on the cupcake or edible 2 size selected, respectively. For example, in some embodiments, such as the small version, the edible holder 1 cup sidewall 16 height having a range of approximately 0.5 in-1 in. with a top diameter 12 having a range of approximately 1.5 in.-1.75 in, and a bottom diameter 12b 1 in.-1.5 in. In the regular version, the edible holder 1 cup sidewall 16 height having a range of approximately 0.75 in.-1.75 in. with a top diameter 12 having a range of approximately 2.25 in.-2.5 in, and a bottom diameter 12b of 1.5 in.-2.5 in. In the large version, the edible holder 1 cup sidewall 16 height having a range of approximately 1.5 in-2.5 in. with a top diameter 12 having a range of approximately 3.25 in.-3.5 in. and bottom diameter 12b of 2 in.-3 in. In some embodiments, the cup sidewall 16 is angled with the bottom cup surface 15. In other embodiments, the cup sidewalls 16 are perpendicular with the cup 10 bottom surface 15, thus the top diameters 12 and bottom diameters 12b would be substantially similar.

In another embodiment, the edible holder 1 features a square-shaped cup 10, having the following dimensions: Cup sidewalls 16 may vary in sizes such as 2 in, 2.5 in, and 3 in. in length and width. The cup sidewalls 16 in these examples may be 1.5 in. But, it should be understood that the shapes and dimensions referenced herein are examples of embodiments and should not be interpreted as limiting. The cup 10 dimensions may be sized to certain measurement specifications as with the purpose and scope of the present invention.

In another preferred embodiment of the present invention, the dimensions of the cup slit 30 are as follows: the width of the cup slit 30 is 0.75 in., and the length of the cup slit 30 in one embodiment is a 0.5 in. shorter than the height of the cup. Another embodiment features the cup slit 30 length extending the height of the cup sidewall 16.

In one embodiment, the dimensions of the rod 20 had a range of approximately 8-14 gauge wire, or width having a range of approximately 0.0625 in.-0.25 in. The length of the rod 20 may vary. In one embodiment, rod 20 lengths may be in the range of approximately 1 in.-36 in. However, rod 20 widths and lengths may extend well beyond these ranges depending on the arrangement, so long as the edible is supported in the arranged fashion in keeping with the scope and purpose of the invention.

The dimensions of the dowel pin 11 length extending from the bottom surface of the cup having a range of approximately 0.25 in.-2 in. depending on the size of the cup 10, sidewall 16, and edible 2. However, the dowel pin 11 length is not limited and the length may vary and extend beyond this range depending on the size of the edible 2 and cup 10. In addition, in one embodiment, the dowel pin 11 has the width dimensions of a common household wooden toothpick. However, the width may be much thicker or thinner depending on the size of the cup 10 and edible 2 so long as the scope and purpose of this invention are upheld. It should be understood that the length and width of the dowel pin 11 will vary depending on the size of the edible holder 1 and accompanying edible 2.

The fabrication materials yield an edible holder 1 that is easily cleaned and will provide effective use in carrying out the scope and purpose of this invention. It should be understood, however, that the cup 10, rod 20, and dowel pin 11 may be of many shapes, sizes, lengths, and widths without departing from the scope of the present invention.

Advantages of the present invention include an holder 1 for edibles 2 that allows for the pre-assembly of edibles 2 prior to and during transport, and the final display of the edibles 2 so that the desired shape and initial appearance of the edibles 2 is maintained during transport until delivery of the edible 2 arrangement at the final destination. The holder 1 may take on a more natural, organic, and free flowing form for purposes of positioning the edible 2 for presentation and may be oriented in a variety of angles.

The foregoing is considered as illustrative only of the principles of the present invention. Further, since numerous modifications and changes will readily occur to those skilled in the art, it is not desired to limit the invention to the exact construction and utilization shown and described herein. Accordingly, all suitable modifications and equivalents may be resorted to, falling within the scope of the invention that is illustratively set forth in the following representative claims to the present invention.

I claim:

1. A holder for pre-assembling, transporting, and displaying an edible that has a boundary surface whose integrity needs to be preserved during transport, said holder comprising:
  a cup having a bottom surface, a sidewall surface and an open top that has a rim,
  wherein said cup bottom surface having a center point and a cup perimeter where said cup sidewall and bottom surfaces are joined,
  wherein said cup also having a cup centerline that extends perpendicularly upward from and proximate said bottom surface center point,
  wherein said cup having a configuration that allows said edible to be placed into said cup through the cup open top in such a manner so as to preserve said integrity of said edible boundary surface,
  a dowel pin that extends upward into said cup and along said cup centerline, and
  a rod having top and bottom ends and a rod centerline therebetween, wherein said rod top end is in contact with said cup bottom surface at a point proximate said bottom surface center point,
  a movable plate having a plate center point and a plate perimeter and a configuration adapted to allow said plate to be temporarily placed within said cup and adjacent said cup bottom surface,
  wherein said cup sidewall surface having a slit that extends downward from proximate said cup top rim,
  wherein said plate having a finger that extends radially outward from said plate perimeter, and
  wherein said finger having a configuration adapted to allow said finger to move upwardly and downwardly within said slit.

2. The combination of an edible and a holder for transporting, and displaying said edible, said combination comprising:
  an edible having an edible sidewall surface and an edible bottom surface,
  a holder comprising:
  a cup having a cup bottom surface, a cup sidewall surface, and an open top surface,
  wherein said cup sidewall surface having a configuration that provides, when said edible is placed within said cup so that said edible bottom surface is proximate said cup bottom surface, a gap between said edible sidewall surface and said cup sidewall surface so as to allow said edible to be temporarily placed within and then removed from said cup,
  a rod having a top end and a bottom end and an outer surface,
  wherein said rod top end is attached to said cup bottom surface,
  said cup sidewall surface having a slit that extends downward from proximate said cup top rim,
  said slit having a configuration adapted to allow the fingertips of an individual to access said edible and remove said edible from said cup,
  a movable plate having a plate center point and a plate perimeter and a configuration adapted to allow said plate to be temporarily placed within said cup and adjacent said cup bottom surface,
  wherein said cup sidewall surface having a slit that extends downward from proximate said cup top rim, and
  wherein said plate having a finger that extends radially outward from said plate perimeter, and wherein said finger having a configuration adapted to allow said finger to move upwardly and downwardly within said slit.

3. The holder as recited in claim 1, wherein said rod having a rod centerline that extends between said ends, said holder further comprising:
  a connector having a configuration adapted to connects said rod top end and said cup bottom surface so as to allow said cup to be oriented with respect to said rod so that said cup centerline intersects said rod centerline at a desired angle.

4. The holder as recited in claim 1,
  wherein said rod having a rod centerline that extends between said ends, and
  said holder further comprising:
  a connector that connects said rod top end and said cup bottom surface and having a configuration adapted to allow said cup to be temporarily and variably oriented with respect to said rod so that said cup centerline intersects said rod centerline at an angle that is within a desired range of intersection angles.

5. The holder as recited in claim 1, further comprising:
  an attachment having a configuration adapted to be seated proximate said cup sidewall surface to enable said cup to display said edibles having a decorative collar.

6. A method of fabricating a holder for pre-assembling, transporting, and displaying an edible that has a boundary surface whose integrity needs to be preserved during transport, said method comprising the steps of:
  providing a cup having a bottom surface, a sidewall surface and an open top that has a rim,
  wherein said cup bottom surface having a center point and a cup perimeter where said cup sidewall and bottom surfaces are joined, wherein said cup also having a cup centerline that extends perpendicularly upward from and proximate said bottom surface center point, wherein said cup having a configuration that allows said edible to be placed into said cup through the cup open top in such a manner so as to preserve said integrity of said edible boundary surface, providing a dowel pin that extends upward into said cup and along said cup centerline, providing a rod having top and bottom ends and a rod centerline therebetween, wherein said rod top end is in contact with said cup bottom surface at a point proximate said bottom surface center point, providing a movable plate having a plate center point and a plate perimeter and a configuration adapted to allow said plate to be temporarily placed within said cup and adjacent said cup bottom surface, wherein said cup sidewall surface having a slit that extends downward from proximate said cup top rim, wherein said plate having a finger that extends radially outward from said plate perimeter, and wherein said finger having a configuration adapted to allow said finger to move upwardly and downwardly within said slit.

7. The method as recited in claim 6, wherein said rod having a rod centerline that extends between said ends, said method further comprising the step of:

providing a connector having a configuration adapted to connect said rod top end and said cup bottom surface so as to allow said cup to be oriented with respect to said rod so that said cup centerline intersects said rod centerline at a desired angle.

8. The method as recited in claim 6, further comprising the steps of:

providing an attachment having a configuration adapted to be seated proximate said cup sidewall surface to enable said cup to display said edibles having a decorative collar.

\* \* \* \* \*